United States Patent [19]
Koropitzer et al.

[11] Patent Number: 5,694,323
[45] Date of Patent: Dec. 2, 1997

[54] MONITORING SYSTEM WITH PARTICULAR APPLICATION TO MONITORING A CASH-BASIS OPERATION

[75] Inventors: Ariel Koropitzer, Anaheim; Eran Viner, Huntington Beach, both of Calif.

[73] Assignee: PerSyst, Inc., Tustin, Calif.

[21] Appl. No.: 418,095

[22] Filed: Apr. 4, 1995

[51] Int. Cl.$^6$ .................................................. G06F 17/60
[52] U.S. Cl. .................... 364/464.1; 235/381; 340/679; 340/825.06; 340/825.35; 364/400; 364/479.06; 364/550
[58] Field of Search ............................ 235/381; 340/506, 340/679, 825.06, 825.07, 825.35, 825.55; 364/130, 400, 403, 406, 464.01, 479, 550, 551.01, 401 R, 402, 479.01, 479.06, 464.1; 395/207, 224

[56] References Cited

U.S. PATENT DOCUMENTS

| | | | |
|---|---|---|---|
| 3,334,340 | 8/1967 | McConnell | 340/538 |
| 3,355,576 | 11/1967 | Childers et al. | 235/381 |
| 3,383,467 | 5/1968 | New et al. | 379/104 |
| 3,428,959 | 2/1969 | Acker | 364/401 R |
| 4,259,548 | 3/1981 | Fahey et al. | 340/506 X |
| 4,284,849 | 8/1981 | Anderson et al. | 340/825.55 X |
| 4,306,293 | 12/1981 | Marathe | 364/557 |
| 4,568,934 | 2/1986 | Allgood | 340/870.02 |
| 4,608,560 | 8/1986 | Allgood | 340/870.07 X |
| 4,672,529 | 6/1987 | Kupersmit | 364/130 |
| 4,675,828 | 6/1987 | Winston | 364/483 |
| 4,752,950 | 6/1988 | Le Carpentier | 379/106 |
| 4,812,994 | 3/1989 | Taylor et al. | 364/464.02 |
| 4,814,996 | 3/1989 | Wang | 364/464.04 |
| 4,831,558 | 5/1989 | Shoup et al. | 364/550 |
| 4,847,756 | 7/1989 | Ito et al. | 395/200.05 |
| 4,933,633 | 6/1990 | Allgood | 324/142 |
| 4,939,634 | 7/1990 | Schroder | 364/141 |
| 4,999,763 | 3/1991 | Ousborne | 364/140 |
| 5,091,713 | 2/1992 | Horne et al. | 235/381 X |
| 5,424,940 | 6/1995 | Ousborne | 364/140 |

Primary Examiner—Edward R. Cosimano
Attorney, Agent, or Firm—Gray, Cary, Ware & Freidenrich

[57] ABSTRACT

The invention enables an operation to be monitored directly by a single person at a monitoring site. Certain predefined activities at one or more operating sites are automatically monitored. Information regarding these activities is conveyed to the monitoring site as directed by the person doing the monitoring. The information collected at the monitoring site is used to describe the status of the operation at a given time or the change in status of the operation over a period of time, and to verify information about the conduct of the operation supplied by third parties to the person monitoring the operation. The operation can be conducted at any number of operating sites and the operating sites can be separated by any distance. The monitoring site can be, and frequently is, geographically remote from the operating sites. Further, the monitoring site can be mobile, without affecting the monitoring capabilities of the invention. The invention is useful in monitoring a variety of commercial operations such as, for example, a chain of restaurants or multiplicity of car washes. Further, the invention is particularly useful in monitoring commercial operations that operate on a cash-basis or that are conducted primarily on a self-serve basis such as, for example, laundromats or arcades. However, the invention can be used to monitor any type of operation.

36 Claims, 23 Drawing Sheets

FIG. 13A

Machine Activation Fee Discounts — 1300

Machine Type — 1310
- ◆ 0 Top Loaders
- ◇ 1 Super 18's
- ◇ 2 Super 20's
- ◇ 3 Super 30's
- ◇ 4 Super 50's
- ◇ 5 Dryers
- ◇ 6 Double Stack
- ◇ (unused)
- ◇ (unused)
- ◇ (unused)

✓ OK   ✗ Cancel

Discounts — 1322

| | Discount #1 — 1323 | | Discount #2 | |
|---|---|---|---|---|
| | 0.00 % | | 0.00 % | |
| | Start | End | Start | End — 1324 |
| Sunday | 00:00 | 23:59 | 00:00 | 23:59 |
| Monday | 00:00 | 23:59 | 00:00 | 23:59 |
| Tuesday | 00:00 | 23:59 | 00:00 | 23:59 |
| Wednesday | 00:00 | 23:59 | 00:00 | 23:59 |
| Thursday | 00:00 | 23:59 | 00:00 | 23:59 |
| Friday | 00:00 | 23:59 | 00:00 | 23:59 |
| Saturday | 00:00 | 23:59 | 00:00 | 23:59 |

1320

Correct Machine Activation Fee Discounts — 1350

Machine Type — 1310

| Name |
|---|
| Top Loaders |
| Super 18's |
| Super 20's |
| Super 30's |
| Super 50's |
| Dryers |
| Double Stack |

Discounts — 1320

Fee: [0.00] — 1322

| | Discount #1 — 1321 [0.00] % — 1323 | | Discount #2 [0.00] % | | — 1324 |
|---|---|---|---|---|---|
| | Start | End | | Start | End |
| Sunday | 00:00 | 00:00 | | 00:00 | 23:59 |
| Monday | 00:00 | 00:00 | | 00:00 | 23:59 |
| Tuesday | 00:00 | 00:00 | | 00:00 | 23:59 |
| Wednesday | 00:00 | 00:00 | | 00:00 | 23:59 |
| Thursday | 00:00 | 00:00 | | 00:00 | 23:59 |
| Friday | 00:00 | 00:00 | | 00:00 | 23:59 |
| Saturday | 00:00 | 00:00 | | 00:00 | 23:59 |

Range To Correct — 1330

| | Date | Time |
|---|---|---|
| From | 02/28/95 | 00:00 |
| To | 02/28/95 | 23:59 |

✓ OK     ✗ Cancel

FIG. 13B

MONITORING SYSTEM WITH PARTICULAR APPLICATION TO MONITORING A CASH-BASIS OPERATION

BACKGROUND OF THE INVENTION

1. Field of the Invention

This invention relates to monitoring the conduct of an operation. The monitoring is typically done remotely and frequently encompasses an operation that is conducted at a multiplicity of geographically separate sites. In particular, the invention relates to monitoring the conduct of a commercial operation and, most particularly, to monitoring the conduct of a cash-basis commercial operation.

2. Related Art

The proprietor of a commercial operation must continually monitor that operation to, for example, verify that all receipts and payments are accounted for properly, ensure that all equipment associated with the operation is working properly, and confirm that each employee is present during assigned working hours. Such monitoring can be very time consuming, particularly where the commercial operation encompasses activity at a large number of sites or at two or more sites that are relatively distant from each other. Thus, a proprietor may not have the time or the inclination, or it may be prohibitively costly, to monitor the commercial operation firsthand. Often, an employee manager or managers are hired to oversee operations at one or more sites. However, the efficacy of the proprietor's monitoring of the operation is then subject to the honesty or competence of the managers, so such a solution is not optimal. Thus, a proprietor is frequently faced with a choice among limiting the expansion of the operation, spending large amounts of time monitoring the operation, or accepting the risks associated with hiring other people to monitor the operation.

Monitoring is even more difficult for a cash-basis commercial operation or for a commercial operation that is conducted primarily on a self-serve basis. Businesses having both of these characteristics, such as laundromats or arcades, are particularly difficult commercial operations to monitor. Frequently, such commercial operations have, at most, a single employee manager to oversee activity at each site. Further, maintenance and other periodic activities may be performed by a traveling employee who is not assigned to work regularly at any particular location. The potential for employee abuse (e.g., stealing cash from the machines, absenteeism) in such situations is great.

Some self-serve cash-basis commercial operations have incorporated the use of a debit card system. In a debit card system, the machines to be operated ("operating machines") are equipped with card readers and are activated using debit cards rather than money. A debit card machine accepts money and issues a debit card which is coded to indicate a cash allowance equal to the amount of money input into the debit card machine. To use a machine, a debit card is inserted into the card reader which checks to determine whether an adequate cash allowance is coded onto the debit card and, if so, deducts an appropriate amount from that cash allowance as payment for activating the machine. While this affords some monitoring over cash collections, the system can still be subverted and the system does not provide information about aspects of the operation other than cash collections.

Some machines for coin-operated laundromats have included a sensing device within the machine that senses and stores information regarding a machine's operation. The information is then read from the sensing device by a hand-held device using an infrared beam. The information is stored in the hand-held device which is then taken back to a monitoring site. The information is transferred from the hand-held device to a computer where the information is stored. The information can then be processed by the computer to provide information regarding operation of the machines at the laundromat. While this system does enable, to some degree, automatic acquisition of information regarding laundromat operation, it does not overcome the problems that necessitate having an employee perform the direct monitoring of the operation. Since employee monitoring is still required, this system does not overcome the problems associated with direct monitoring by an employee rather than the proprietor.

Currently, for coin-operated laundromats, there is no effective system for monitoring cash collections. One method that has been used is to compare the energy usage for the laundromat over a given period of time with an estimated expected energy usage based upon the cash collections for that period of time. Another method for monitoring cash collections is simply to compare the cash collections for an operating site to the cash collections for other comparable operating sites and/or to the historic cash collection data for the operating site. However, neither of these methods are sufficiently accurate, they do not provide information regarding individual machines, and they do not enable monitoring of aspects of the operation other than cash collection.

As mentioned above, another problem with monitoring a commercial operation is ensuring that all equipment associated with the operation is working. Performance of required repairs should also be monitored. Previously, there was no way to know that a machine at an operating site was not operating properly unless the proprietor or an employee visited the site (or was present on a daily basis at the site) and observed that the machine was not operating properly. Moreover, the person observing the inoperative machine often does not have the tools or parts to effect a repair. Consequently, a machine may remain inoperative for an extended period of time until a repair is made. Further, previously, repairs to machines have been tracked using a log book that is filled out manually each time that a repair is made. Such recording is tedious, requiring the manual entry of detailed information regarding the repair. Additionally, the manual recording may not be done consistently, causing the repair record to be incomplete. As a result, machines having chronic problems may not be identified. Moreover, the number of entries can easily become large and may not be organized in a way that allows easy analysis of the repair history of the machines.

It is desirable for a proprietor to be able to monitor a commercial operation (such as a coin-operated laundromat) directly, regardless of the number of sites at which the commercial operation is conducted or the geographical separation of multiple sites. It is also desirable for the site from which the commercial operation is monitored to be mobile, capable of being located at any distance from the sites at which the commercial operation is conducted, thereby enhancing the flexibility of the monitoring. Finally, it is desirable that such a system be capable of monitoring cash collections for the operation, providing information from which the operating condition of the machines associated with the operation can be deduced, and providing at least some information regarding the performance of employees hired to assist in conducting the operation.

SUMMARY OF THE INVENTION

According to the invention, an operation conducted at one or more operating sites can be monitored directly by a single person at a monitoring site. Certain predefined activities at one or more operating sites are automatically monitored. Information regarding these activities is communicated to the monitoring site. The information collected at the monitoring site is used to describe the status of the operation at a given time or the change in status of the operation over a period of time, and to verify information about the conduct of the operation supplied by third parties to the person monitoring the operation.

The operation can be conducted at any number of operating sites and the operating sites can be separated by any distance. The monitoring site can be, and frequently is, geographically remote from the operating sites. Further, the monitoring site can be mobile without affecting the monitoring capabilities of the invention.

The invention is useful in monitoring a variety of commercial operations such as, for example, a chain of restaurants or a multiplicity of car washes. Further, the invention is particularly useful in monitoring commercial operations that operate on a cash-basis or that are conducted primarily on a self-serve basis such as, for example, laundromats or arcades. However, the invention can be used to monitor any type of operation.

When used to monitor a cash-basis operation, a monitoring system according to the invention can be used to monitor the income that should have been received by the operation for particular periods of time. This information can be compared to the actual collections for those periods of time. Significant discrepancies may indicate a problem in the conduct of the operation (e.g., employee or customer stealing) that needs to be addressed. The monitoring system can also be used to monitor the performance of machines associated with the operation so that, for example, high maintenance machines can be identified. The monitoring system also provides information from which at least some aspects of employee performance can be monitored. For instance, the monitoring system provides information from which the proprietor can determine whether a repair person has attempted scheduled repairs and, as noted above, the cash collection information can be used to determine if an employee is stealing from the proprietor. An important aspect of the invention is that all of this information is made easily accessible so that the proprietor can quickly ascertain information regarding whatever particular aspect of the operation is of interest. Another important aspect of the invention is that the invention provides up-to-date information regarding the system operation, enabling the proprietor to immediately identify problems with the operation.

In one embodiment, the invention automatically monitors the operation of one or more laundromats, each of which include a multiplicity of machines. The invention monitors cash receipts at the laundromats and monitors the operation of one or more of the machines at each of the laundromats. The invention is particularly useful for monitoring a multiplicity of laundromats or for monitoring laundromats that are geographically remote from a monitoring site.

The cash receipts monitoring can include determining the amount of cash that should have been deposited in particular machines during a specified period of time. This can be accomplished by, for example, sensing each activation of the machines during the specified period of time. The cash receipts monitoring can also include maintaining information regarding the amount of cash collected from the machines during the specified period of time. The amount of cash collected can be compared to the amount of cash that should have been deposited so that any discrepancies can be identified.

The machine operation monitoring can include sensing openings or closings of a service door on particular machines. The machine operation monitoring can also include monitoring whether particular machines are out of order or not. The out-of-order machine monitoring can be accomplished by sensing and monitoring activations of the machines or by monitoring an out-of-order switch located on the machines. The machine operation monitoring can also include monitoring repairs made to machines. Such monitoring can include, for example, recording the date of each repair, recording the name of the person who performed the repair, and recording a description of the repair.

In another embodiment of the invention for automatically monitoring the operation of one or more laundromats that each include a multiplicity of machines, the invention senses activations of particular machines, openings and closings of a cash vault of particular machines, and openings and closings of a service door or doors of particular machines. As above, in this embodiment, the invention may also be capable of determining whether a machine is out of order or not. Additionally, in a further particular embodiment, the invention monitors a monitoring mechanism included with particular machines that has the capability of monitoring the operation of those machines to obtain information regarding predefined characteristics of those machines. Such predefined characteristics may include, for example, machine malfunctions, identity of repair personnel working on the machine, information regarding the manner in which the machine has been operated, and the price or prices being charged for operation of the machine.

In another embodiment, the invention automatically manages the operation of one or more laundromats by remotely monitoring a first set of predefined aspects of the operation of the laundromats and remotely controlling a second set of predefined aspects of the operation of the laundromats. The remote monitoring can include monitoring cash receipts from machines at the laundromats and monitoring the operation of the machines. The remote controlling can include establishing a price of operation of the machines (or different prices for different time periods during the day), testing the operation of the machines, placing machines out of service when the machines do not perform acceptably well during the testing, and controlling the contents of displays associated with the machines.

In yet another embodiment, the invention automatically acquires data regarding the expected cash receipts at each of one or more laundromats and data regarding the operation of one or more machines at each of the one or more laundromats. The invention includes an option that enables the data to be obtained automatically at each of a multiplicity of predetermined times.

In still another embodiment, the invention monitors, from a monitoring site, the conduct of a cash-basis operation that takes place at one or more operating sites, each of which include a multiplicity of machines. The invention determines, for each of one or more machines at the operating site, the amount of cash that should have been deposited in the machine during a specified period of time and monitors the operation of one or more machines at each operating site. The invention is particularly useful for monitoring a multiplicity of operating sites (especially where each operating site is geographically separated from any other operating site) or for monitoring operating sites that are geographically remote from the monitoring site.

In still another embodiment, the invention monitors the conduct of an operation that takes place at one or more operating sites, each of which include a multiplicity of devices to be monitored. The invention includes: i) a multiplicity of sensors; ii), a multiplicity of internal control units; iii) a multiplicity of site controller units; iv) a first multiplicity of communications devices for transferring data between each of the internal control units and a corresponding one of the site controller units; v) a main controller unit; and vi) a second multiplicity of communications devices for transferring data between each of the site controller units and the main controller unit. At least one sensor is mounted on each machine or device and is adapted to acquire data regarding the operation of the machine or device. At least one internal control unit is mounted on each machine or device and is adapted to receive data from the at least one sensor. At least one site controller unit is located at each laundromat or operating site. Like the immediately previous embodiment of the invention, this embodiment is particularly useful for monitoring a multiplicity of operating sites (especially where each operating site is geographically separated from any other operating site) or for monitoring operating sites that are geographically remote from the monitoring site. The invention is also particular useful in monitoring a commercial operation, especially where the operation is a cash-basis or self-service operation.

In this embodiment, the invention may further include a mechanism for monitoring communications between the main controller unit and the site controller unit and communications between the site controller unit and the internal control unit. This communication monitoring mechanism can include a mechanism for detecting communication conditions (communication conditions including successful communications, communication problems and communication errors) and a mechanism for recording communication conditions.

BRIEF DESCRIPTION OF THE DRAWINGS

FIG. 13A illustrates a Machine Activation Fee Discounts window of an application program of a monitoring System according to the invention.

FIG. 13B illustrates a Correct Machine Activation Fee Discounts window of an application program of a monitoring system according to the invention.

DETAILED DESCRIPTION OF EMBODIMENTS OF THE INVENTION

According to the invention, the activities associated with an operation can be monitored directly by a single person at a monitoring site. The operation can be spread over a number of geographically separate operating sites. The monitoring site can be geographically remote from the operating sites and can even be mobile.

At each operating site, certain predefined activities are automatically monitored. Information regarding these activities is communicated to the monitoring site. This information can be used to describe the status of the operation at a given time or the change in status of the operation over a period of time. This information can also be used to verify that the operation is being properly conducted by third parties working at each operating site.

The invention can be used to monitor any type of operation. However, as will be apparent from the description below, the invention is particularly useful in monitoring a variety of commercial operations such as, for example, a chain of restaurants or a multiplicity of car washes. Further, the invention is especially useful in monitoring commercial operations that operate on a cash-basis or that are conducted primarily on a self-serve basis such as, for example, laundromats or arcades.

Figure 1A:
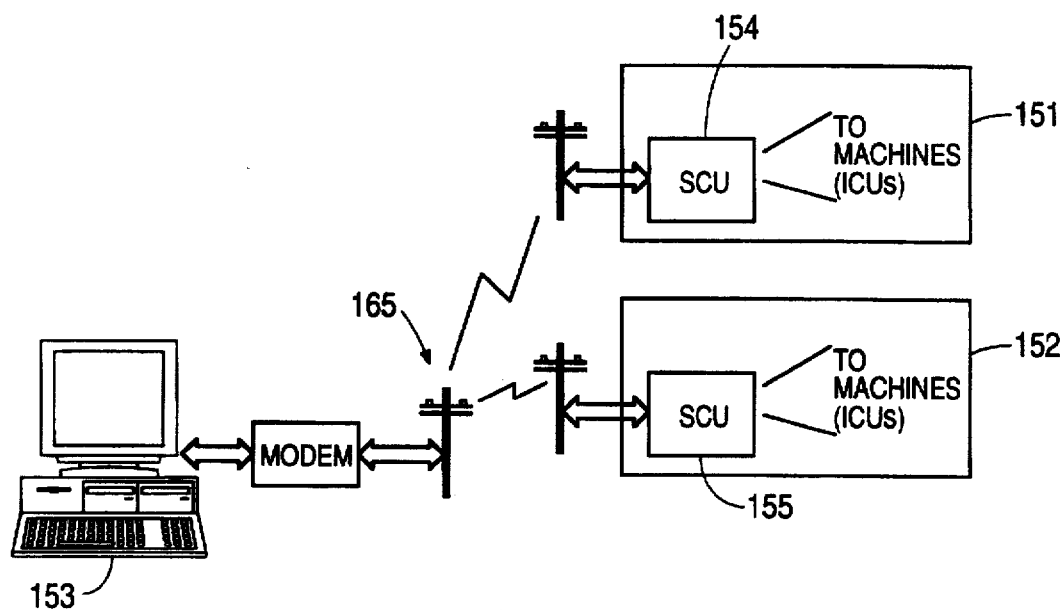
FIGS. 1A and 1B are a simplified representation of a system according to an embodiment of the invention.
Figure 1B:
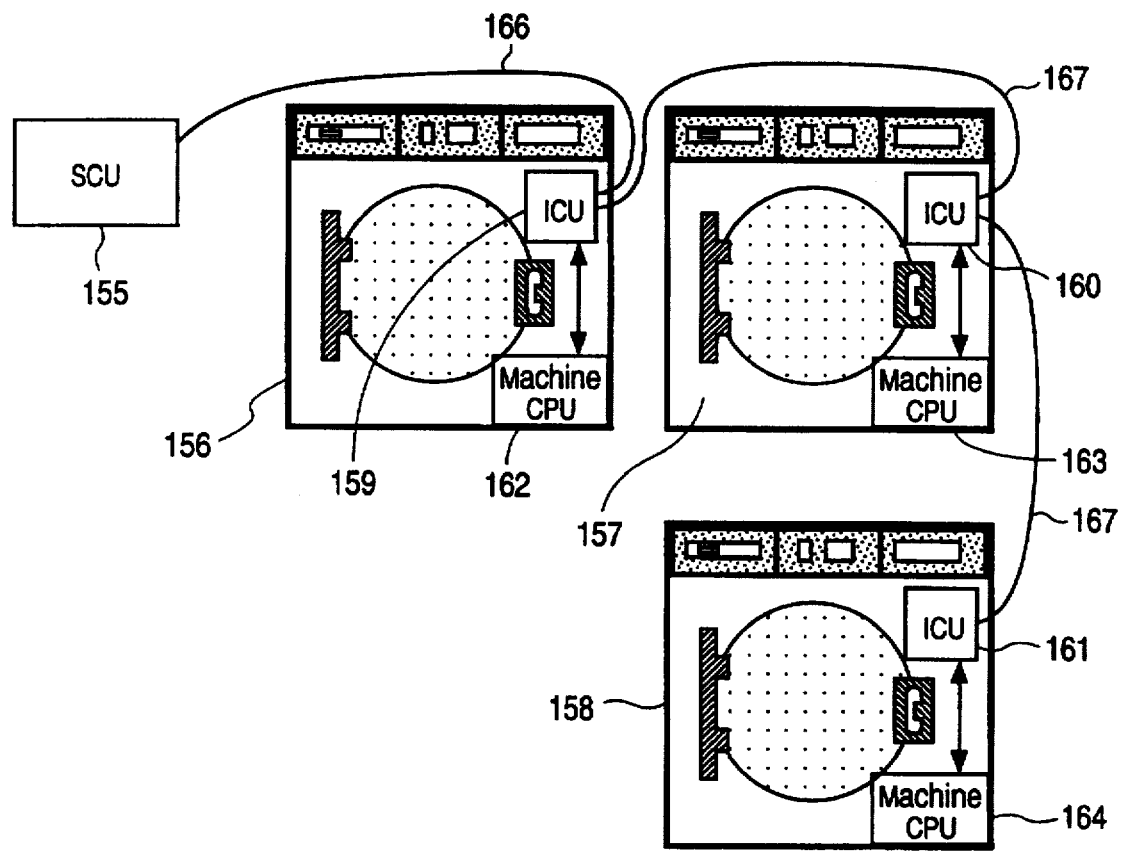

For example, a system according to one embodiment of the invention, shown in FIGS. 1A and 1B, is used to monitor operations at a multiplicity of laundromats, e.g., laundromats 151 and 152 (FIG. 1A). The laundromats can be located anywhere and, typically, are located at sites (operating sites) that are geographically remote from each other and from the site (monitoring site) at which an owner or manager (proprietor) monitors the operations. The system monitors machines, e.g., machines 156, 157 and 158 (FIG. 1B), that are located at each laundromat, such as washing machines, dryers, snack vending machines, soda vending machines, bag vending machines, detergent machines, extractors, money changers and bar code readers. The system can also control aspects of the operation such as automatic door locks, a heating, ventilation and cooling (HVAC) system and lights. Generally, any number of laundromats and any number of machines at each laundromat can be monitored. For example, in one embodiment, up to 200 laundromats can be monitored and, in another embodiment, up to 512 machines at each laundromat can be monitored. The system can be used to monitor many aspects of laundromat operation; however, of particular importance, the system enables the proprietor to monitor cash collections from the laundromats (i.e., identify the amount of cash that should have been collected and compare that amount to the amount that was reported as collected) and monitor performance of each machine in the laundromat (i.e., identify defects or malfunctions in the operation of a machine, as well as monitor the amount of time spent on repairing a machine).

In one embodiment of the invention, shown in FIG. 1A, a system includes a main computer 153 at the monitoring site that communicates with a site computer at each laundromat, e.g., site computers 154 and 155 at laundromats 151 and 152, respectively, via a telephone line. The proprietor uses the main computer 153 to acquire data from the site computers, e.g., site computers 154 and 155, and to issue commands to the site computers to control operations at each laundromat, e.g., laundromats 151 and 152. Each of the site computers, e.g. site computer 155 (FIG. 1B), in turn, communicates with a microcontroller (ICU) installed on each machine, e.g., ICUs 159, 160 and 161 on machines 156, 157 and 158, respectively, at the corresponding laundromat. The microcontrollers are configured to acquire information about the operation of the corresponding machine and to issue commands regarding operation of that machine. In the embodiment shown in FIG. 1B, the microcontrollers are configured to communicate with computers installed on each of the machines, e.g., computers 162, 163 and 164 on machines 156, 157 and 158, respectively. However, as will be clear from the discussion below, not all machines monitored by the invention include such computers.

Figure 1C:
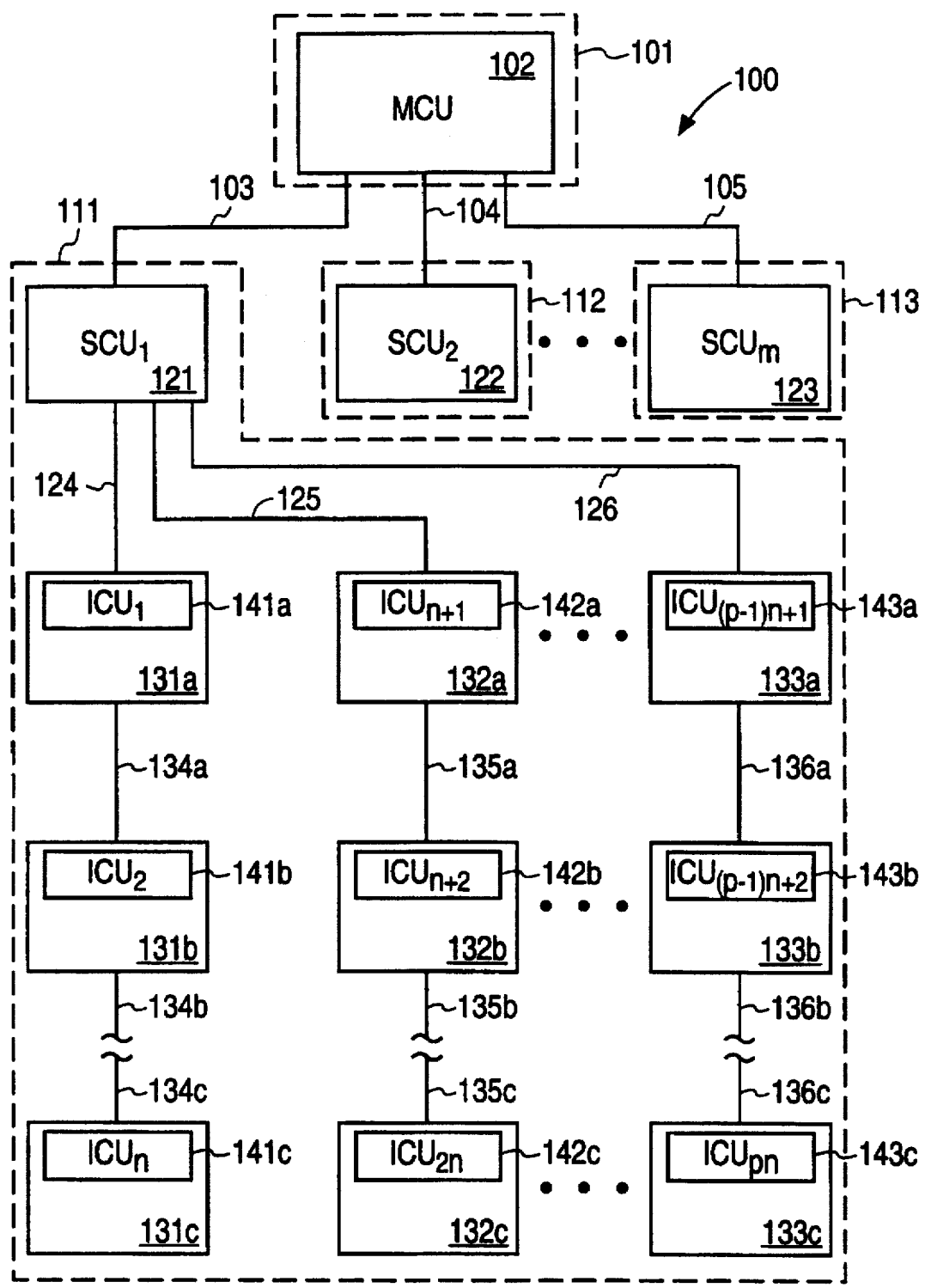
FIG. 1C is a block diagram of a monitoring system according to the invention.

FIG. 1C is a simplified block diagram of a monitoring system 100 according to the invention. The monitoring system 100 is used to monitor operations at a multiplicity of operating sites, e.g., operating sites 111, 112 and 113, from a monitoring site 101. In FIG. 1C, for simplicity, only three operating sites are shown; however the system 100 can be used to monitor any number of operating sites. Each of the operating sites can be, for instance, a coin-operated laundromat. A multiplicity of machines are located at each of the operating sites, e.g., machines 131a, 131b and 131c, machines 132a, 132b and 132c, and machines 133a, 133b and 133c at operating site 111.

In FIG. 1C, for simplicity, the machines at operating sites 112 and 113 are not shown, nor are all of the machines at operating site 111 shown. If each operating site is a laundromat, the machines can be, for instance, various types of washers and dryers, as well as snack machines, detergent machines and soda machines.

The monitoring system 100 includes a main controller unit (MCU) 102, a multiplicity of site controller units (SCUs), e.g., SCUs 121, 122 and 123, designated generally as $SCU_1$ through $SCU_m$, and a multiplicity of internal control units (ICUs), e.g., ICUs 141a, 141b, 141c, 142a, 143b, 142c, 143a, 142b and 143c, designated generally as $ICU_1$ through $ICU_{pn}$. The MCU 102 is located at the monitoring site 101. Each SCU is located at a corresponding one of the operating sites, e.g., SCU 121 is located at operating site 111. Each ICU is located at one of the operating sites and is associated with a corresponding one of the machines located at that operating site, e.g., ICU 141a is associated with machine 131a at site 111.

In the monitoring system 100, the MCU 102 is connected to each SCU, $SCU_1$ through $SCU_m$, by a communication line, e.g., MCU 102 is connected to SCUs 121, 122 and 123 by communication lines 103, 104 and 105, respectively. The communication lines 103, 104 and 105 can be, for example, conventional telephone lines (see, e.g., phone lines 165 in FIG. 1A). In another embodiment, communication between the MCU 102 and $SCU_1$ through $SCU_m$ is implemented using a wireless cellular telephone. Use of telephone lines to connect the MCU 102 to $SCU_1$ through $SCU_m$ enables the MCU 102 to be located at any desired monitoring site. Further, the MCU 102 can be moved easily from one monitoring site to another monitoring site. Additionally, the MCU 102 can be located at a mobile monitoring site such as an airplane or boat.

Each SCU, $SCU_1$ through $SCU_m$, is connected by one or more communication lines to the ICUs at that operating site. In one embodiment of the invention, one or more sets ("strings") of ICUs are connected serially to each SCU (see, e.g., communication lines 166, 167 and 168 connecting ICUs 159, 160 and 161, respectively, in FIG. 1B). In monitoring system 100, $SCU_1$ (SCU 121), located at operating site 111, is connected serially to each of p strings of ICUs. Each string includes n ICUs. Generally, according to the invention, each string can include any number of ICUs and any number of strings of ICUs can be connected to an SCU. In one embodiment of the invention, up to 16 strings can be connected to each SCU 121 and each string can include up to 32 ICUs. In another embodiment, each string can include up to 128 ICUs.

In the monitoring system 100, the SCU 121 is connected to the ICUs 141a, 142a and 143a, i.e., the first ICU in particular strings of ICUs, by communication lines 124, 125 and 126, respectively. Each ICU that is first in a string of ICUs is then connected to the next ICU in the string by a communication line, e.g., ICUs 141a, 142a and 143a are connected to ICUs 141b, 142b and 143b, respectively, by communication lines 134a, 135a, 135a, respectively. These ICUs are, in turn, connected to the next ICU in the string by another communication line, e.g., ICUs 141b, 142b and 143b by communication lines 134b, 135b, 135b, respectively, to subsequent ICUs (not shown). All ICUs in the string are connected in a series in this manner until the last ICU in each string, e.g., ICUs 141c, 142c, 143c, is connected to the previous ICU by a communication line, e.g., communication lines 134c, 135c, 136c, respectively. Each of the communication lines 124, 125, 126, 134a, 134b, 134c, 135a, 135b, 135c, 136a, 136b, 136c can be, for example, conventional six conductor electrical cables.

Connecting the ICUs serially to the SCU, as described above, is particularly advantageous when a monitoring system according to the invention is used to monitor the operation of one or more laundromats. This is because the machines in a laundromat are typically arranged in rows, either along a wall or in aisles on a floor. It is easier to assemble a monitoring system according to the invention by connecting one communication line between the SCU and the ICU on the first machine in a row and an additional communication line between each pair of ICUs of adjacent machines, then it is to connect a communication line directly from the SCU to the ICU on each machine. However, if one of the communication lines in a string of ICUs malfunctions or is disconnected, communication is lost between the SCU and each ICU in the chain after the defective communication line.

Each ICU monitors information regarding operation of the machine associated with the ICU. The operational information can be monitored automatically by the system or only upon the request of a user of the system (as explained in more detail below). Some machines ("smart machines") include a microprocessor which monitors information regarding the operation of the machine. For those machines, the ICU communicates with the machine's microprocessor to obtain information regarding operation of the machine. Other machines (electromechanical or "dumb machines"), do not include a microprocessor: for those machines, the ICU monitors sensors installed on the machine to obtain information regarding operation of the machine. All information obtained regarding machine operation is identified with the time and date at which the described event occurred.

For dumb machines, information can only be deduced by activation of one or more of the sensors. In one embodiment, when a monitoring system according to the invention is used to monitor operation of one or more laundromats, the sensors on dumb machines sense: 1) opening and closing of the cash vault of a machine, 2) opening and closing of the service door or doors of a machine, and 3) activation of a machine. From this sensed information, the monitoring system can determine the amount of cash that should be in the machine based upon the number of activations of the machine after the cash vault was last closed (i.e., after the cash was last removed). The monitoring system also provides information that is useful in monitoring cash collections from the machine (e.g., when and for how long the cash vault is accessed) and service activity (e.g., when and for how long the service door is open) on the machine. Additionally, the monitoring system also monitors a switch that indicates whether the machine is out of order. This switch is activated manually at the operating site. The existence of an out-of-order machine can also be deduced by observing that monitored activations decrease to zero for a period of time.

For smart machines, the information that can be obtained regarding the operation of the machine is limited only by the capabilities of the machine's microprocessor. For example, in addition to all of the above information that can be obtained from the dumb machines, the smart machines may also be able to report: i) whether the machine has malfunctioned and, if so, which part; ii) identifying information regarding the mechanic or mechanics who have worked on a malfunctioning machine (this information is initially input to the smart machine by the mechanic or mechanic) iii) information regarding the manner in which the machine has been operated (e.g., for washing machines, the type of wash cycle and the temperature of the water); and iv) the prices being charged for operation of the machine (which may be dependent on the time of day and on the manner in which the machine is operated).

Monitoring information as described above is useful for a number of reasons. The monitoring of cash collections and the capacity to organize the cash collections in a variety of ways (e.g., by particular machine, by machine type or other groups of machines, by operating site, by calendar period), described in more detail below, eases accounting for income received from conduct of the operation. Monitoring of cash collections can also be useful in identifying characteristics of the operation (e.g., the location of heavily used machines within a laundromat can be identified). The monitoring of service information results in a repair record being automatically kept for each machine, thereby enabling chronically poor performing machines to be identified easily. Additionally, monitoring of service information provides the proprietor with information that can indicate whether or not a repair person has attempted scheduled repairs. Further, information regarding out-of-order machines can be used to more productively schedule repair activities (e.g., if the monitoring system indicates that no machines are out of order at an operating site, the repair person need not visit that operating site).

The monitoring capabilities of the monitoring system according to the invention provide a number of important advantages over previous monitoring methods. All of the information regarding conduct of the operation is made easily accessible so that the proprietor can quickly ascertain information regarding whatever particular aspect of the operation is of interest. The invention also provides completely up-to-date information regarding the system operation, enabling the proprietor to immediately identify problems with the operation. Additionally, any type of machine, made by any manufacturer of any model, can be monitored by the monitoring system of the invention. Moreover, all of the monitoring information can be obtained remotely at the monitoring site, without need for someone actually visit the operating sites.

For smart machines, the ICU can also communicate instructions to the machine regarding operation of the machine. The instructions that can be communicated are limited only by the capabilities of the machine's microprocessor. For example, the price of operating the machine may be specified or modified. Moreover, according to the invention, different prices may be specified for different times of day, enabling promotions such as "happy hours" to be implemented remotely. The ICU may also be used to perform diagnostic tests on the machine or components of the machine. The ICU may be used to place a machine out of service or put the machine back into service. If the machine has an associated display, the contents of the display can be controlled. If equipped with a printing mechanism, the machine can be controlled to print and dispense coupons or custom messages. Like monitoring of operational information, the instructions to the smart machines can be sent automatically by the system or only upon the request of a user of the system (as explained in more detail below).

The capacity to send instructions to smart machines also provides a number of advantages. Instructions regarding machine operation can be implemented easily and instantaneously. The instructions can be implemented from the monitoring site so that it is not necessary for someone to physically go to the operating site. Moreover, instructions can be implemented simultaneously for many or all of the machines at an operating site; instructions need not be entered in each machine separately. Additionally, instructions can be sent to any type of machine, made by any manufacturer of any model.

In order for a system according to the invention to be able to communicate with a smart machine's microprocessor, the smart machine must include a communications device that implements the same communications protocol that is implemented by the ICU mounted on the smart machine. This protocol is explained in more detail below. Without implementation of this communication protocol, a smart machine can only be treated as a dumb machine by the monitoring system.

Figure 2:
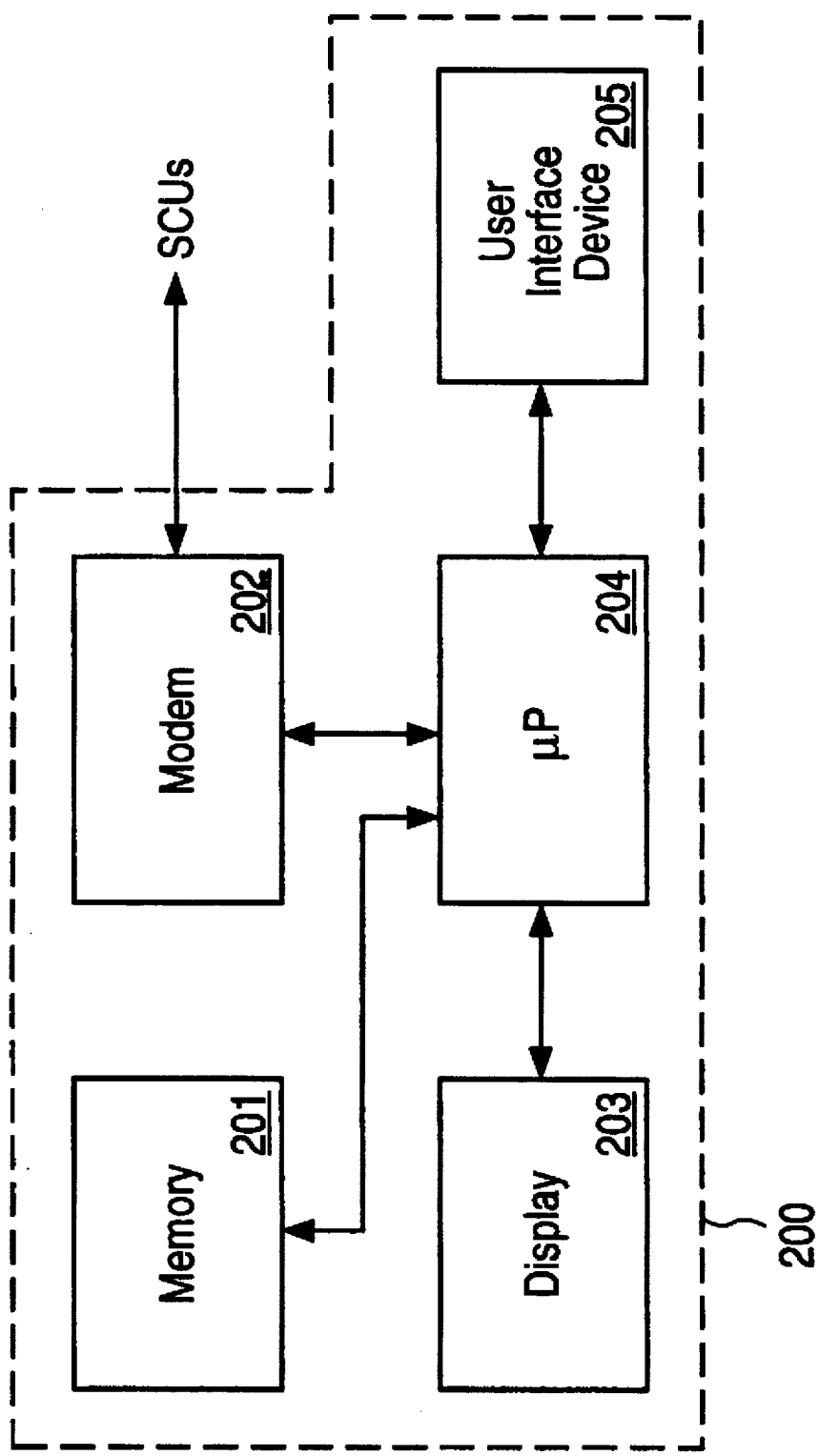
FIG. 2 is a block diagram of a main controller unit for use with a monitoring system according to the invention such as the monitoring system of FIG. 1C.

FIG. 2 is a simplified block diagram of an MCU 200 for use with a monitoring system according to the invention, e.g., monitoring system 100 (FIG. 1C). The MCU 200 includes a memory 201, a modem 202, a display 203, a microprocessor 204 and a user interface device 205. The components of the MCU 200 can be embodied in, for example, a computer such as a desktop or notebook computer. Embodiment of the MCU in a notebook computer is particularly advantageous for enabling the MCU to be moved to various locations thereby making the monitoring site mobile.

The microprocessor 204 controls operation of the MCU 200. The microprocessor 204 can be, for example, a 386DX microprocessor running at 33 megahertz. Other later processors in the x86 series can also be used. Generally, any suitable microprocessor can be used that is compatible with an operating system and application program used to implement the invention.

The memory 201 can include, for example, a random access memory (RAM), a read only memory (ROM), and a floppy or hard disk storage device. The memory 201 is used for storing software used to control the operation of the MCU 200, such as software for controlling operation of the microprocessor 204, modem 202, display 203 and user interface device 205, and application software (described in more detail below) used to implement various characteristics of the monitoring system. The memory 204 also stores the data (described in more detail below) collected from the ICUs after that data is downloaded from the SCUs. Generally, the memory 204 must include sufficient RAM and permanent storage capacity to accommodate the above-described software. Illustratively, a RAM having 4–8 megabytes of storage capacity and a hard disk having 340–540 megabytes of storage capacity are adequate for executing and storing programs for use in controlling operation of the system according to the invention.

The display 203 can be, for example, a computer monitor and/or a printer. The display 203 is used to display data obtained by the monitoring system according to the invention or to display choices for effecting control of the monitoring system, as described in more detail below.

The user interface device 205 can be, for example, a conventional computer keyboard, conventional mouse, conventional trackball, or some combination of those. The user interface device 205 enables a user to input and display data describing the status of the operation being monitored and to effect control of the monitoring system.

The MCU 200 communicates with each SCU through a communication line (e.g., communication line 103, 104 or 105 in FIG. 1C) that is connected to the modem 202 of the MCU 200. Communication from the MCU to the SCU includes, for example, instructions regarding data collection from, and operation of, particular machines (as explained in more detail below) at the operating site. Communication from the SCU to the MCU includes, for example, data from each machine regarding operation of the machine (as explained in more detail below). As described above, the communication line between the SCU and MCU is, in one embodiment, a conventional telephone line. In such an embodiment, the modem 202 is a conventional modem for use in sending and receiving data over telephone lines. The modem 202 is, in one embodiment, a 2400 baud external modem. However, modems having other data transmission rates greater than 2400 baud can also be used. Communication between the MCU and SCU is governed by a standard ZMODEM protocol.

Figure 3:
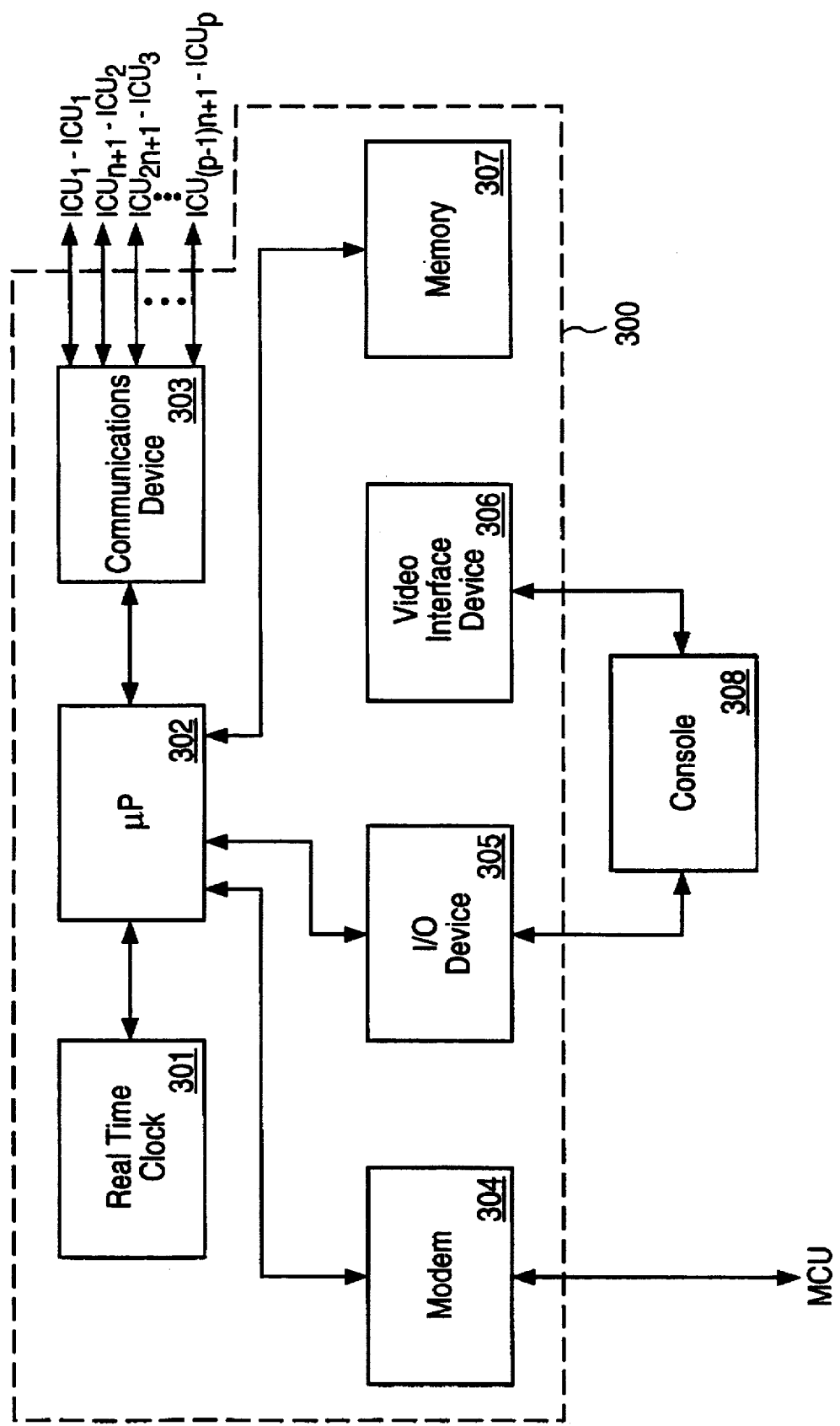
FIG. 3 is a block diagram of a site controller unit for use with a monitoring system according to the invention such as the monitoring system of FIG. 1C.

FIG. 3 is a simplified block diagram of an SCU 300 for use with a monitoring system according to the invention, e.g., monitoring system 100 (FIG. 1C). As described above, an SCU such as SCU 300 is located at each operating site of the operation being monitored. The SCU 300 includes a real time clock 301, a microprocessor 302, a communications device 303, a modem 304, an input/output (I/O) device 305, a video interface device 306 and a memory 307, all of which are encased in a housing.

The communication line between the SCU 300 and the MCU is connected to the modem 304 of the SCU 300. Before allowing communication with the MCU, the SCU 300 must receive an appropriate password (i.e., a password that matches one of the passwords stored in the memory 307) from the MCU. In the embodiment in which the communication line is a conventional telephone line, the modem 304 is a conventional modem for use in sending and receiving data over telephone lines. The modem 304 is, in one embodiment, a 2400 baud modem. However, modems having other data transmission rates greater than 2400 baud can also be used.

Information (e.g., data and instructions as described above) is transferred between the modem 304 and the microprocessor 302. The microprocessor 302 controls the flow of information through the SCU 300 and performs any calculations and processing operations necessary for operation of the SCU 300. The microprocessor 302 can be, for example, a 286 processor or any later processor in the x86 series. However, any suitable microprocessor can be used.

The real time clock 301 is conventional and communicates with the microprocessor 302. The real time clock 301 keeps track of the time of day and date at the operational site at which the SCU 300 is located. Each time that the MCU begins a communication with the SCU 300 (i.e., after each occasion when a proper password is received by the MCU), the MCU checks the real time clock 301 to ascertain the time and date at the operating site and synchronizes the time and date at the monitoring site (i.e., the location of the MCU) to that at the operating site. This is particularly desirable when the monitoring site and the operating site are in different time zones, since much of the information transferred back and forth between the MCU and SCU is associated with a particular date and time.

The microprocessor 302 also communicates with the memory 307. The memory 307 includes a hard disk storage device, a read-only memory (ROM) and a random access memory (RAM). The memory 307 is used for storing software used to control the operation of the SCU 300, such as operating system software for controlling operation of the microprocessor 302, communications software (described in more detail below) for controlling operation of the communications device 303, communications software for controlling operation of the I/O device 305, and communications software for controlling operation of the video interface device 306. The memory 307 also stores software which controls the acquisition of data from the ICUs regarding operation of the machine and sending of commands to the ICUs to control operation of the machine. Additionally, the memory 307 stores information regarding the configuration of machines at the site and the operating status (e.g., out of order) of machines, as well as data collected from the ICUs regarding operation of the machines at the operating site.

The microprocessor 302 also communicates with the communications device 303. The communications device 303 enables communication between the SCU 300 and each of the ICUs at the operational site at which the SCU 300 is located. Communications from the SCU to each ICU includes, for example, instructions regarding data collection from the machine associated with the ICU, operation of the machine and sensor or machine microprocessor testing (as appropriate). Communication from each ICU to the SCU includes, for example, data regarding operation of the machine or the status of the sensors or machine microprocessor. As shown in FIGS. 1C and 3 (and explained in more detail above with respect to FIG. 1C), the SCU 300 is connected to p strings of ICUs, each of which are interconnected in a daisy-chain fashion. Generally, the communications device 303 is conventional; however, the communications device 303 must be capable of multi-drawing (i.e., communicating with multiple devices in a chain).

In one embodiment, the communications device 303 is a standard RS-485 communications board commercially available from, for instance, Quatech in Akron, Ohio. The following parameters may be set for communication over the RS-485: Baud Rate is set to 4800 bps, Parity is set to "None", Data Bits is set to 8, and Stop Bits is set to 1.

As mentioned above, the memory 307 is used for, among other things, storing a communications protocol (SCU-ICU protocol) for governing communication between the SCU 300 and the ICUs. (A similar protocol is stored in a memory in a microcontroller of each ICU; see microcontroller 402 in ICUs 400 and 450 of FIGS. 4A, and 4B, respectively, below.) In one embodiment of the invention, the SCU-ICU protocol is a packet protocol, i.e., information is passed between the SCU 300 and the ICUs in packets that can vary in size. Thus, only as much information as is necessary is passed during each communication between the SCU and an ICU, increasing the efficiency and speed of the communication. Each packet of information includes information that indicates the size of the packet. Further, since the ICUs are connected serially in a daisy-chain fashion, each packet of information includes an address indicating the destination of the information (i.e., SCU or particular ICU) to ensure that the information is received by the proper device. Details of a particular embodiment of the SCU-ICU protocol for enabling communication between the SCU and ICU are given immediately below.

All communications between an SCU and the corresponding ICU's are initiated by the SCU. All commands sent from the SCU ("SCU commands") are two bytes in length. The first byte specifies the address of the ICU to which the command is directed. (Note that the SCU may send a command to all ICUs on a string by using the Command Broadcast option described below.) The second byte contains the actual information to be transmitted to the ICU.

The bits of the first byte of an SCU command have the format given below in TABLE 1:

TABLE 1

| SCU-ICU Protocol, Byte #1 of SCU Command | | | |
|---|---|---|---|
| 7 | 6 | 5 | 4-0 |
| 0 | 0 | CB | Device Address |

Bit 7 is zero, indicating that the command is an SCU command. Bit 6 is also zero, indicating that the byte is the first byte of an SCU command. Bit 5 ("CB") is used to turn the Command Broadcast option on or off: "1" indicates that the command is to be sent to all ICUs on the string. The address of the ICU to which the command is to be sent is designated by bits 0 through 4 ("Device Address"). (Note that 32 unique addresses can be formed with these bits, corresponding to the limitation of 32 ICUs on each string.) The ICU address is specified by an application program, as described below, that controls operation of the monitoring system according to the invention. The bits of the second byte of an SCU command have the format given below in TABLE 2:

TABLE 2

| SCU-ICU Protocol, Byte #2 of SCU Command | | |
|---|---|---|
| 7 | 6 | 5-0 |
| 0 | 1 | Command Code |

Bit 7 is 0 since this is an SCU command. Bit 6 is 1, indicating that the byte is the second byte of an SCU command. Bits 0 through 5 ("Command Code") are used to specify a particular command to the ICU.

TABLE 3 is a table of commands (in hexadecimal notation) that are legal according to this embodiment of the SCU-ICU protocol. Each of these commands is discussed in more detail below.

TABLE 3

| SCU-ICU Protocol, SCU Command Codes | |
|---|---|
| Code (H) | Description |
| 00 | Send Data |
| 01 | Clear Counters |
| 02 | Go Active |
| 03 | Go Inactive |
| 04 | Perform Self Test |
| 05 | Reset |
| 06 | Repeat Last Data |
| 07 | Send Firmware Version |
| 08 | Not Defined |
| 09 | Not Defined |
| 0A-3F | Not Defined |

The "Send Data" command is used by the SCU to periodically interrogate each ICU for new events (e.g., new information regarding operation of the machine on which the ICU is mounted). The length of time between interrogations is a parameter that can be established by the user of the system. Illustratively, the time between interrogations can be approximately one minute; given the typical rapidity with which events occur regarding operation of machines monitored by the system, this is a length of time that generally enables accurate capture of those events. Each ICU responds to receipt of the "Send Data" command by transmitting a command ("ICU command") back to the SCU. The ICU command includes from one to five bytes depending on the command being sent.

Each ICU command includes at one byte specifying the ICU status. The bit format of the first byte of an ICU command is shown in TABLE 4.

TABLE 4

| SCU-ICU Protocol, Byte #1 of ICU Command | | |
|---|---|---|
| 7 | 6–5 | 4–0 |
| 1 | STAT | Device Address |

Bit 7 is 1, indicating that the command is an ICU command. Bits 5 and 6 ("STAT") are used to indicate the ICU status. Bits 0 through 4 are used to specify the address of the ICU sending the command. TABLE 5 is a table of possible values of STAT.

TABLE 5

| SCU-ICU Protocol, ICU Status Bits | |
|---|---|
| STAT | Description |
| 00 | No New Data |
| 01 | Data Available |
| 10 | ICU Fault |
| 11 | Power Up |

If the ICU has no new data to send to the SCU (i.e., no additional data since the last interrogation by the SCU), then the STAT field indicates "No New Data" (STAT=00) and the ICU response consists of this byte only.

If the ICU has new data to transmit (i.e., additional data since the last interrogation by the SCU), then the STAT field indicates "Data Available" (STAT=01) and additional response bytes are necessary. The first three of these bytes are used to transmit information regarding the sensors being monitored by the ICU. The bit format of these three bytes is given in TABLE 6.

TABLE 6

| SCU-ICU Protocol, Bytes # 2, 3, 4 of ICU Command | | | | | |
|---|---|---|---|---|---|
| 7 | 6 | 5 | 4–3 | 2 | 1–0 |
| 1 | DAT | Sen0/2/4 Level | Sen0/2/4 Count | Sen1/3/5 Level | Sen1/3/5 Count |

Bit 7 is 1, indicating an ICU command. Bit 6 ("DAT") is used to indicate whether an additional byte follows the current byte: "1" indicates that an additional byte will follow the present byte and "0" indicates there is no additional byte. Bit 5 is used to indicate the logical status of sensor 0, 2 or 4 (sensors 0, 2 and 4 are reported on sequential bytes, i.e., sensor 0 is reported in byte #2, sensor 2 in byte #3 and sensor 4 in byte #4): "0" means CLOSED and "1" means OPEN. Bits 3 and 4 are used to indicate the number of sensor cycles (CLOSED-OPEN-CLOSED) that have occurred since the last SCU interrogation for sensor 0, 2 or 4 (again, sensors 0, 2 and 4 are reported on sequential bytes). Bit 2 is used to indicate the logical status of sensor 1, 3 or 5 (sensors 1, 3 and 5 are reported on sequential bytes, i.e., sensor 1 is reported in byte #2, sensor 3 in byte #3 and sensor 5 in byte #4): "0" means CLOSED and "1" means OPEN. Bits 0 and 1 are used to indicate the number of sensor cycles (CLOSED-OPEN-CLOSED) that have occurred since the last SCU interrogation for sensor 1, 3 or 5 (again, sensors 1, 3 and 5 are reported on sequential bytes). TABLE 7 indicates the sensor assignments according to one embodiment of the invention.

TABLE 7

| SCU-ICU Protocol, Sensor Assignments | |
|---|---|
| Sensor # | Descriptions |
| 0 | Front Service Door |
| 1 | Cash Vault Door |
| 2 | Machine Activator (e.g., Coin Mechanism) |
| 3 | Top Service Door |
| 4 | Unassigned |
| 5 | Unassigned |

A count of up to 3 cycles can be transmitted by each ICU command. Cycles in excess of 3 ("excess cycles") are not counted for each sensor except the Machine Activator sensor. For the Machine Activator sensor, the number of cycles counted are stored in a memory of the ICU. The number of cycles counted is decremented by up to three cycles, as appropriate, by each ICU command; thus, excess cycles are not ignored, but rather are transmitted with a subsequent ICU command. Failure to count excess cycles for other sensors generally is not a limitation, since those sensors monitor activities for which more than three cycles is extremely unlikely to occur during the period between SCU interrogations.

An ICU command can also include a fifth byte that is used to transmit information regarding the operational status of the machine being monitored by the ICU, i.e., whether the machine is out of order or not. The bit format of this fifth byte of an ICU command is given in TABLE 8.

TABLE 8

| SCU-ICU Protocol, Byte #5 of ICU Command | | | |
|---|---|---|---|
| 7 | 6 | 4–1 | 0 |
| 1 | DAT | Not Used | OOO |

Bit 7 is 1, indicating an ICU command. Bit 6 ("DAT") is used to indicate whether an additional byte follows the current byte, as described above with respect to TABLE 6. Bits 1 through 4 are not used and are set equal to zero to indicate that they are inactive. Bit 0 ("OOO") is used to indicate the logical status of the "Out-of-Order" switch on the machine: "1" indicates that the "Out-of-Order" switch is active, i.e., the machine is out of order.

If the ICU is experiencing a fault, then the STAT field of the first ICU command byte indicates "ICU Fault" (STAT=10) and an error byte is inserted between the first byte of the ICU command and the additional response bytes. The bit format of the error byte is given in TABLE 9.

TABLE 9

| SCU-ICU Protocol, Error Byte of ICU Command | | |
|---|---|---|
| 7 | 6 | 5–0 |
| 1 | DAT | Faulty Sensor Bits |

Bit 7 is 1, indicating an ICU command. Bit 6 ("DAT") is used to indicate whether an additional byte follows the current byte, as described above with respect to TABLE 6. Bits 0 through 5 are used to indicate the existence of faulty sensors (bit 0 corresponds to sensor 0, bit 1 corresponds to sensor 1, etc.): "1" indicates a faulty sensor.

If power to the ICU has been lost and recovered since the last interrogation by the ICU, then the STAT field of the first ICU command byte indicates "Power Up" (STAT=11). The ICU command also includes three additional bytes reporting the status of each sensor. If another data event (i.e., ICU fault or sensor cycle) has occurred between the "Power Up" condition and the SCU interrogation, then that data event takes precedence and is reported to the SCU.

As indicated in TABLE 3 above, the SCU can send commands other than the "Send Data" command.

The "Clear Counters" command is used to instruct the ICU to reset the ICU's sensor CYCLE counters. The ICU acknowledges receipt of this command by echoing the command back to the SCU.

The "Go Active" command is used to instruct the ICU to exit the "Inactive" mode (see "Go Inactive" command below) and begin scanning the sensors again. The ICU acknowledges receipt of this command by echoing the command back to the SCU.

The "Go Inactive" command is used to instruct the ICU to cease scanning the sensors. The ICU acknowledges receipt of this command by echoing the command back to the SCU. This command may be issued, for example, to stop acquisition of data from the sensors when one or more sensors are defective. When issued to the ICU of a smart machine, this command is used to disable the smart machine so that the smart machine can not be used.

The "Perform Self Test" command is used to instruct the ICU to perform the Built in Test (BIT), a program for testing operation of the ICU that is stored in the EEPROM that is part of the microcontroller 402. The ICU acknowledges receipt of this command by echoing the command back to the SCU. If the BIT fails, then the ICU reports an ICU Fault (STAT=10) in response to the next SCU interrogation.

The "Reset" command causes the ICU to perform a "hard reset" of all components of the ICU. For an ICU that is used with a smart machine (see ICU 450 in FIG. 4B below), the "Reset" command also resets the microprocessor of the smart machine (see smart machine CPU 410 in FIG. 4B below). Since this is a hardware reset, the ICU does not echo back the command to the SCU or respond in any other way if the "hard reset" is successful. However, if the ICU fails to execute the "hard reset", the ICU will echo back the command to the SCU.

The "Repeat Last Data" command is used to request the ICU to re-transmit the last data packet (stored in a memory of the ICU) previously sent by the ICU. The ICU re-transmits the data packet immediately upon receiving the "Repeat Last Data" command and does not wait for the next SCU "Send Data" command from the SCU. This is done to avoid sending additional data obtained since the first "Send Data" command.

The "Send Firmware Version" command is used to get the version number of the ICU's current firmware. The ICU responds with a command having a bit format as shown in TABLE 10.

TABLE 10

| SCU-ICU Protocol, ICU Firmware Version Command | | |
|---|---|---|
| 7 | 6 | 5–0 |
| 1 | 0 | Firmware Version |

Bit 7 is 1, indicating an ICU command. Bit 6, similar to the "DAT" bit described above with respect to TABLE 6, is always zero, indicating that no additional byte will follow. Bits 0 through 5 are used to indicate the version number of the ICU firmware: the version number is expressed as 1.xx, where "xx" is the number represented by bits 0 through 5.

As indicated above, the ICU response to many SCU commands is to echo back the command to the SCU. However, if an SCU command has been broadcasted to all ICUs on a string (i.e., the Command Broadcast bit is turned on), the ICUs do not echo back the command in order to prevent the data contention that would otherwise result.

Returning to FIG. 3, the I/O device 305 and the video interface device 306 are provided to enable a user interface device (console 308) to communicate on-site with the SCU 300. The I/O device 305 and the video interface device 306 are both conventional. In one embodiment, the I/O device 305 is a serial RS-232 interface available commercially from IBM in Armonk, N.Y. The video interface device 306 can be, for example, a monochrome video card interface such as is widely commercially available.

The housing of the SCU 300 is provided with interface connections that allow connection of the console 308. Typically, the console 308 includes both a monitor and a keyboard. Generally, the console 308 is portable and does not remain connected to the SCU 300.

The capability of connecting the console 308 allows a technician to perform diagnostic tests on the SCU 300 or any of the ICUs to verify proper operation or diagnose problems. This is particularly useful, for example, because it allows the technician, after replacement of a defective sensor or ICU, to verify proper operation of the sensor or ICU. Software for enabling the diagnostic tests to be performed is stored in the memory 307. The diagnostic tests can include, for example, testing a sensor to determine if the sensor is good or bad, testing the ICU firmware (described below) to verify proper operation, testing the integrity of the connection between a sensor and the firmware, and testing proper operation of the auxiliary power supply.

Though not shown in FIG. 3, an SCU can also be equipped with a card reader and corresponding circuitry within the SCU for accepting input information from the card reader. Such a card reader can be used, for example, as a time clock for employees working at the operating site. The card reader could also be used with conventional debit cards to allow customers to use the debit cards to activate the machines. Or, the card reader can be used with promotional cards, recording machine usage by a customer and awarding free machine usage based upon the paid machine usage or at random for a particular visit by a particular customer.

Though also not shown in FIG. 3, an SCU can also be equipped with a controller and associated circuitry that automatically operates equipment at the operating site such as automatic door locks, HVAC system and lights.

It is to be understood that the SCU can perform many more types of control and monitoring functions not discussed herein. Generally, the SCU can perform any such functions that can be implemented with computer control.

Figure 4A:
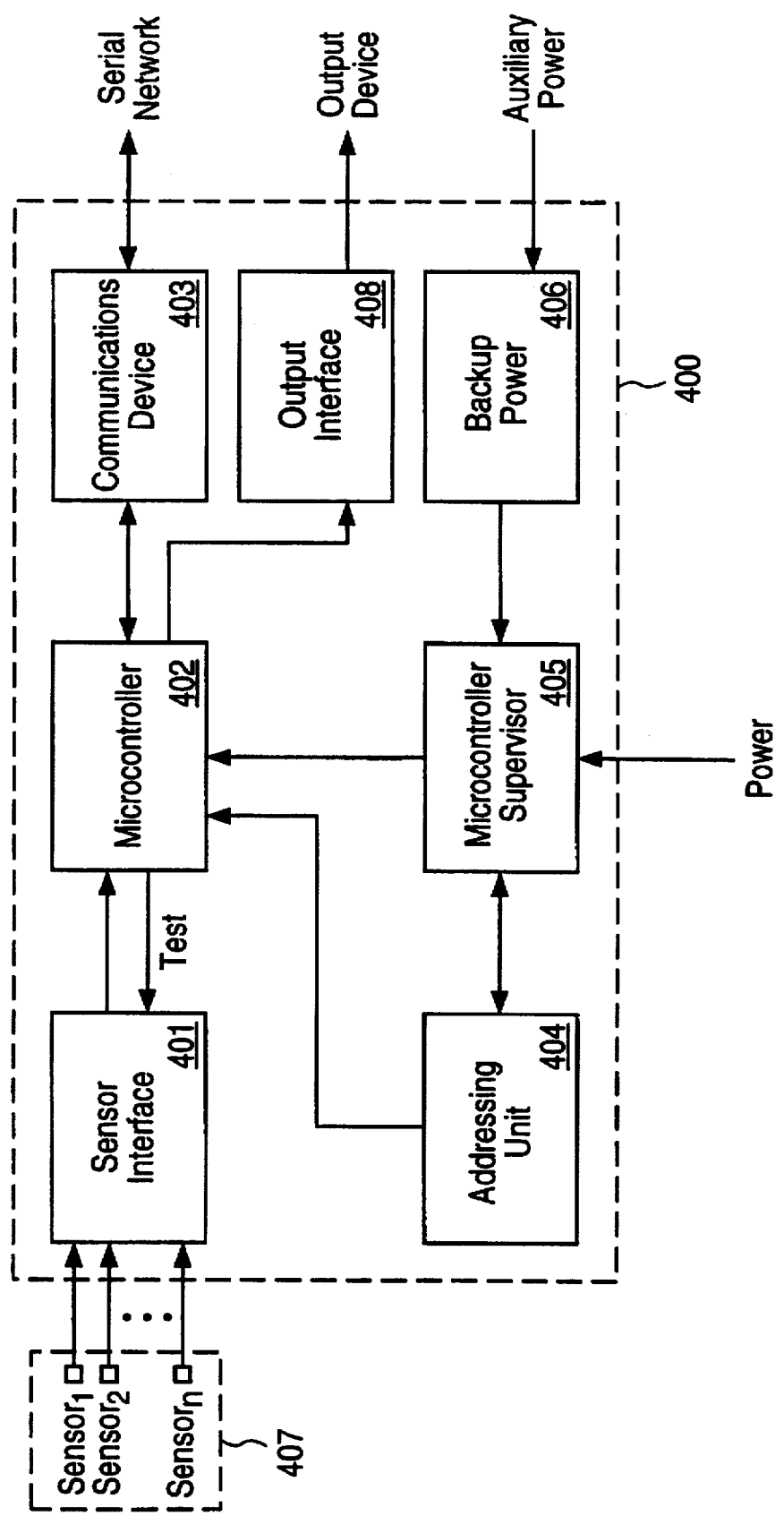
FIGS. 4A and 4B are block diagrams of internal control units for use with a monitoring system according to the invention such as the monitoring system of FIG. 1C.
Figure 4B:
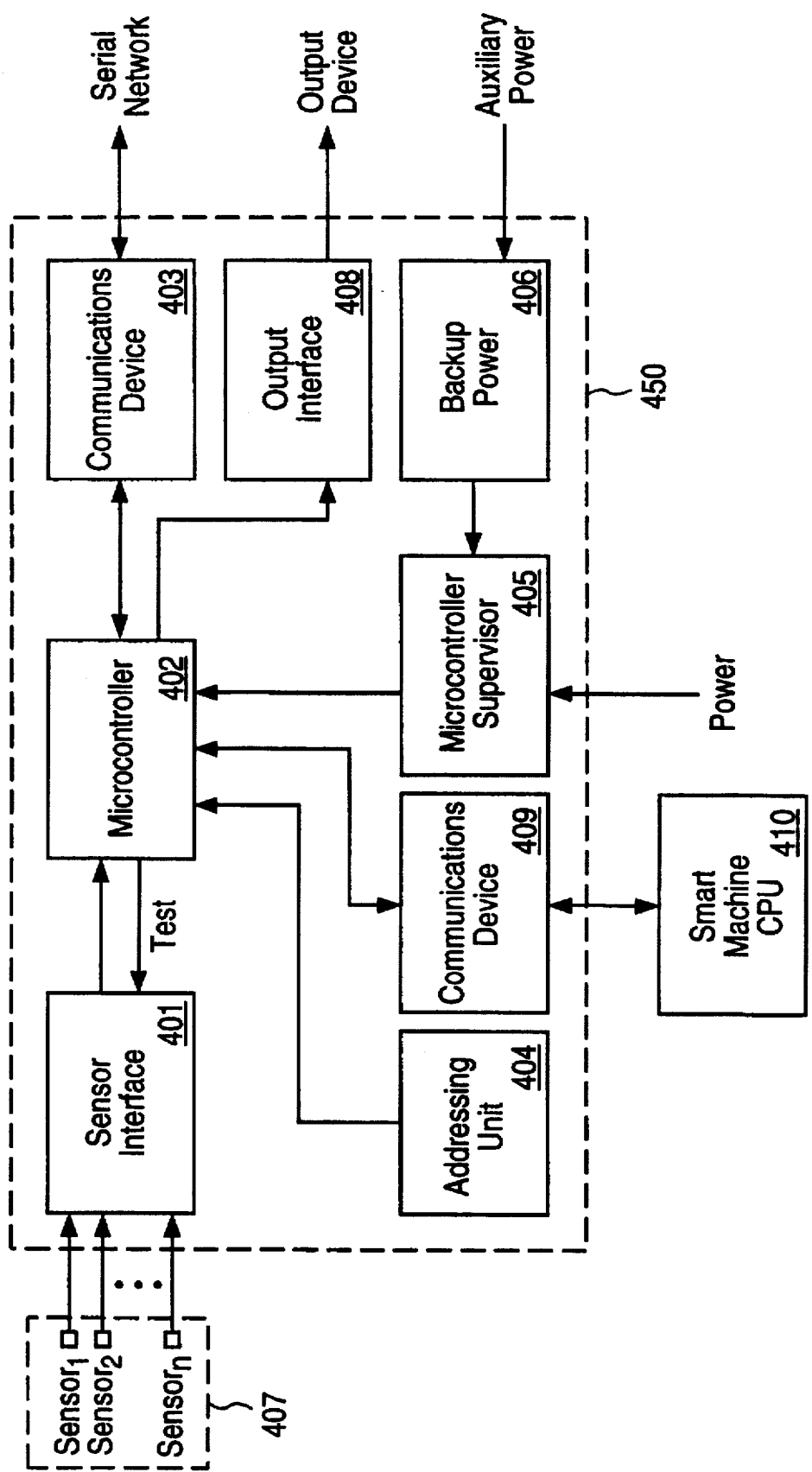

FIGS. 4A and 4B are simplified block diagrams of ICUs 400 and 450, respectively, for use with a monitoring system according to the invention, e.g., monitoring system 100 (FIG. 1C). The ICU 400 is for use with dumb machines (i.e., machines that do not include a microprocessor) and the ICU 450 is for smart machines (i.e., machines that do include a microprocessor). One of the ICUs 400 or 450 is mounted, in any convenient manner, on each machine that is to be monitored.

FIG. 4A is a simplified block diagram of an ICU 400 for use with a dumb machine that is monitored by the monitoring system according to the invention. ICU 400 includes a sensor interface device 401, a microcontroller 402, a communications device 403, an addressing unit 404, a microcontroller supervisor 405, a backup power source 406, and an output interface 408.

Each of n terminals on the sensor interface 401 of the ICU 400 are electrically connected to a corresponding one of a multiplicity of sensors 407 mounted on the machine to be monitored. In one embodiment, an electrically conductive twisted pair of wires is used to make connection between each sensor and the corresponding sensor interface terminal. The wires are bundled together and the connection between the wire bundle and the sensor interface is made using a male/female connector pair. This configuration makes it easy to replace and reconnect the sensor interface 401 if the interface becomes defective.

According to one embodiment of the invention, up to 6 sensors can be monitored. Various types of sensors can be used as the sensors 407: electrical, mechanical, optical and magnetic. For example, an electrical sensor available as Part No. PADP-110220-10-600 from Persyst, Inc. of Tustin, Calif. can be used with the invention. A magnetic sensor available as Model No. 1034-N from Sentrol, Inc. in Portland, Ore. can also be used with the invention. A mechanical sensor available as E13-50H from Cherry Electrical Products in Waukegan, Ill. can also be used with the invention.

Preferably, the sensors used with the invention are single pole, dual throw sensors, i.e., sensors which generate an electrical signal requiring power in either the "off" or "on" position. It is desirable to use such a sensor with the invention because, unlike a single throw switch, it is possible to detect that the sensor has been disconnected or is malfunctioning as opposed to simply not activated.

Information from the sensors 407 is transferred from the sensor interface 401 to the microcontroller 402. The microcontroller 402 controls all functions of the ICU 400. The microcontroller 402 operates according to firmware, i.e., the microcontroller 402 includes an electrically erasable programmable read only memory (EEPROM) that is programmed with the instructions for operating the microcontroller 402. For example, the firmware can test the sensor interface 401 or sensors 407 to verify proper operation, test proper functioning of the power supplies, and test correct operation of the firmware. As explained in more detail below, the firmware can be revised according to instructions received from by the ICU from the MCU. The microcontroller 402 can be, for example, one of the microcontrollers from the 8051 family of microcontrollers, such as the 89C51 or 89D52 microcontroller. However, any suitable microcontroller can be used.

The microcontroller supervisor 405 monitors the power supply to the microcontroller 402. When power is interrupted, the microcontroller supervisor 405 causes the backup power 406 (implemented using a PADP adapter or a super capacitor) resident on the ICU 400 to begin supplying power to the microcontroller 402 so that the ICU 400 will continue to function. The microcontroller supervisor 405 is conventional; any of a number of commercially available microcontroller supervisors can be used.

The addressing unit 404 supplies information to the microcontroller 402 that uniquely identifies the ICU 400 to enable information transferred between the ICU 400 and the SCU to be addressed. This is necessary to ensure proper attribution of information transferred along the string of ICUs of which ICU 400 is part. The address stored by the addressing unit 404 is specified using DIP switches. In the embodiment in which up to 32 ICUs can be included in each string, ICU 400 has an address within the range 0 to 31. The addressing unit 404 is a conventional 8-position DIP switch. Any of a number of commercially available 8-position DIP switches can be used.

The microcontroller 402 also communicates with the communications device 403. The communications device 403 enables communication between the ICU 400 and the SCU at the operating site. The communications device 403 must be capable of performing the same communications functions as the communications device 303 of the SCU 300 (FIG. 3). In one embodiment, the communications device 403 is, like the communications device 303, an RS-485 communications board. However, generally, the communications device 403 need not necessarily be the same as the communications device 303.

The microcontroller 402 also communicates with the output interface 408. The output interface 408 enables the ICU 450 to control an output device or devices associated with a smart machine. The output interface 408 can be used to, for example, control a relay to disconnect or connect power to the machine to place the machine out of service or in service, respectively. The output interface 408 can also be used to control a display or a printing mechanism associated with the machine. The output interface 408 is a conventional device driver or drivers, e.g., a relay driver, display driver, printer driver, as necessary for control of the output device or devices being used.

FIG. 4B is a simplified block diagram of an ICU 450 for use with a smart machine that is monitored by the monitoring system according to the invention. The ICU 450 is similar to the ICU 400 and similar components are denoted by the same numbers in FIGS. 4A and 4B. However, to enable communication with the microprocessor 410 of a smart machine, the ICU 450 also includes a second communications device 409.

The second communications device 409 enables the ICU 450 to obtain from the smart machine microprocessor 410 information regarding aspects of the operation of the smart machine. This information is in addition to the information obtained by the sensors 407, i.e., in addition to the information that is obtained by the ICU 400 for a dumb machine. Additionally, the second communications device 409 enables the ICU 450 to transmit instructions to the smart machine microprocessor 410 to control aspects of the operation of the smart machine. In one embodiment of the invention, the second communications device 409 is implemented as both a RS-232 and a Direct Link. The user can switch between the two implementations of the second communications device 409 using conventional jumper blocks. The following parameters may be set for communication over the second communications device 409: Baud Rate is set to 4800 bps, Parity is set to "None", Data Bits is set to 8, and Stop Bits is set to 1. The second communications device 409 is connected to a corresponding communications device on the smart machine with a 6 pin RJ-11 connector. The pinout for the RJ-11 connector is shown in TABLE 11 below.

TABLE 11

ICU-Machine Protocol, Interface Pinout

| Pin # | Pin Name | Description |
|---|---|---|
| 1 | TXD | ICU Transmit Data Line |
| 2 | RXD | ICU Receive Data Line |
| 3 | GPI | ICU General Purpose Input Line |
| 4 | GPO | ICU General Purpose Output Line |
| 5 | GND | Common Ground |
| 6 | NC | Not Connected |

A communications protocol (ICU-machine protocol) stored in the EEPROM of the microcontroller 402 and in a memory located in the smart machine governs the communication between the ICU 450 and the smart machine's microprocessor. In order for the smart machine microprocessor to communicate with the ICU 450, the microprocessor must implement this ICU-machine protocol; otherwise, the smart machine is treated like a dumb machine. However, any machine that does implement the ICU-machine protocol can communicate with the monitoring system according to the invention regardless of the manufacturer or model of the machine. Like the SCU-ICU protocol described above with respect to FIG. 3, the ICU-machine protocol governing communication between a smart machine microprocessor and the ICU 450 is a packet protocol. Further, the SCU-ICU protocol should work in Full-Duplex fashion. Details of one embodiment of the ICU-machine protocol for enabling communication between the ICU 450 and the microprocessor of a smart machine is given immediately below.

The ICU-machine protocol is an "Echo" type handshake protocol, i.e., any information byte transmitted by one device (either the smart machine microprocessor or the ICU) is echoed back (acknowledged) by the other device. Generally, information bytes transmitted according to the ICU-machine protocol conform to the bit format shown in TABLE 12.

TABLE 12

ICU-Machine Protocol, Information Byte Format

| 7 | 6 | 5–0 |
|---|---|---|
| SM/ICU* | DAT/CMD* | DATA |

Bit 7 ("SM/ICU*") indicates whether the information byte originates with the machine ("1") or the ICU ("0"). For communication from the ICU to the smart machine, bit 6 ("DAT/CMD*") indicates whether the information byte is a data byte ("1") or a command byte ("0"). For communication from the smart machine to the ICU, bit 6 indicates whether another information byte follows the current information byte ("1") or not ("0"). Bits 0 through 5 contain the actual information to be communicated, either data or a command.

The commands include a set of Universal Commands and a set of Manufacturer-Specific Commands. Preferably, the smart machine supports the Universal Command set though, strictly speaking, this is not necessary. If a Universal Command is not supported, then, instead of echoing the command, as would normally happen, the smart machine sends an information byte including the "Command Not Supported" command (see TABLE 13). The Manufacturer-Specific Commands enable implementation of commands that are specific to machines made by a particular manufacturer. These commands enable additional functionality to be added to the ICU-machine protocol easily.

TABLE 13 is a table of Universal Commands (in hexadecimal notation) according to one embodiment of the ICU-Machine protocol. These commands are discussed in more detail below.

TABLE 13

ICU-Machine Protocol Commands

| Command | Description | Code | Origin |
|---|---|---|---|
| SMFGID | Send Manufacturer ID Code | 00H | ICU |
| SMMODEL | Send Machine Model # | 01H | ICU |
| SSMVER | Send SM Firmware Version | 02H | ICU |
| SICUVER | Send ICU Firmware Version | 03H | SM |
| ACTPREQ | Activate Permission Request | 04H | SM |
| GOFF | Go inactive (pause cycle) | 05H | ICU |
| GON | Go active (continue cycle) | 06H | ICU |
| SRES | Perform a Soft Reset | 07H | ICU |
| HRES | Perform a Hard Reset | 08H | ICU |
| HELLO | Alive check | 09H | ICU |
| RCVPR | Receive Price Update | 0AH | ICU |
| SNDPR | Send Prices | 0BH | ICU |
| NEVENT | New Event | 0CH | SM |
| SNDLEV | Send SM Sensors level Info | 0DH | ICU |
| SNDSEN | Send ICU Sensors Info | 0EH | SM |
| SSMFLT | Send SM Fault Registers | 0FH | ICU |
| SICUFLT | Send ICU Fault Register | 10H | SM |
| PSELFT | Perform Self Test | 11H | |
| DSCNT | Activate Price Discount | 12H | ICU |
| DSCLEV | Report discount level | 13H | ICU |
| SNDSTAT | Send Machine Status | 14H | ICU |
| MFGCMD | Following is a manufacturer specific command structure | 15H | ICU |
| | Not Defined | 16H–3DH | |
| KILL | Abort Current Command | 3EH | ICU |
| NSP | Command not supported | 3FH | SM |

The "Send Manufacturer ID" (SMFGID) command is used by the ICU to request information identifying the manufacturer of the machine with which the ICU is associated. The machine responds with a first information byte that echoes the command (bit 7 is changed, of course, to reflect that the machine is now sending the information byte, rather than the ICU) and a second information byte that indicates the manufacturer of the machine. This second information byte conforms to the bit format given in TABLE 14.

TABLE 14

ICU-Machine Protocol, Manufacturer Data Byte

| 7 | 6 | 5–0 |
|---|---|---|
| 1 | 1 | Manufacturer Code |

Bits 6 and 7 conform to the format given above with respect to TABLE 12. Bits 0 through 5 ("Manufacturer Code") are used to represent the manufacturer name. In one embodiment of the invention, the bits specifying the Manufacturer Code conform to the hexadecimal designations given below in TABLE 15.

TABLE 15

ICU-Machine Protocol, Manufacturer Data Bits

| Code (H) | Manufacturer |
|---|---|
| 00 | Wascomat |
| 01 | GE |
| 02 | Maytag |
| 03 | Whirlpool |
| 04 | Dexter |
| 05 | Unimac |
| 06 | Speed Queen |
| 07 | Huebtch |
| 08 | Ipso |
| 09 | Milnor |
| 0A | Primus |
| 0B | American |
| 0C-3E | Undefined |
| 3F | Wrong Mfg. |

Upon receipt of the second information byte from the machine, as described above, the ICU echoes back that byte to the machine.

The "Send Machine Model Code" (SMODEL) command is used by the ICU to request information identifying the model of the machine with which the ICU is associated. After echoing the command, the machine responds with a second information byte that indicates the machine model. This second information byte conforms to the bit format given in TABLE 16.

TABLE 16

ICU-Machine Protocol, Model Data Byte

| 7 | 6 | 5-0 |
|---|---|---|
| 1 | 0 | Manufacturer Model |

Bits 6 and 7 conform to the format given above with respect to TABLE 12. Bits 0 through 5 ("Manufacturer Model") are used to represent the model name. The bits specifying the Manufacturer Model conform to a list (similar to the list of TABLE 15 above) specified by each manufacturer. Up to 64 different models can be specified. The ICU echoes back the second information byte.

The "Send SM Firmware Version" (SSMVER) command is used by the ICU to request information identifying the version of the firmware implemented in the machine. After echoing the command, the machine responds with second and third information bytes that indicate the firmware version. The second and third information bytes conform to the bit format given in TABLE 17 and TABLE 18, respectively.

TABLE 17

ICU-Machine Protocol, Byte #1 of Machine Firmware Data

| 7 | 6 | 5-0 |
|---|---|---|
| 1 | 1 | Version # Prefix |

TABLE 18

ICU-Machine Protocol, Byte #2 of Machine Firmware Data

| 7 | 6 | 5-0 |
|---|---|---|
| 1 | 1 | Version # Suffix |

Bits 6 and 7 conform to the format given above with respect to TABLE 12. Bits 0 through 5 ("Version # Prefix" or "Version # Suffix") are used to represent the prefix or suffix of the firmware version number. For example, to report that Version 1.01 is implemented, byte 2 is C1H and byte 3 is C1H (in hexadecimal notation). To report that Version 3.31 is implemented, byte 2 is C3H and byte 3 is DFH (in hexadecimal notation). Note that, due to the number of bits allocated for representation of the version number, the maximum version number that can be represented is Version 63.63. The ICU echoes back the second and third information bytes.

The "Send ICU Firmware Version" (SICUVER) command is used by the machine to request information identifying the versions of the firmware implemented in the ICU. After echoing the command, the ICU responds with second and third information bytes that indicate the firmware version. The second and third information bytes conform to the bit format given in TABLE 19 and TABLE 20, respectively.

TABLE 19

ICU-Machine Protocol, Byte #1 of ICU Firmware Data

| 7 | 6 | 5-0 |
|---|---|---|
| 0 | 1 | Version # Prefix |

TABLE 20

ICU-Machine Protocol, Byte #2 of ICU Firmware Data

| 7 | 6 | 5-0 |
|---|---|---|
| 0 | 1 | Version # Suffix |

Bits 6 and 7 conform to the format given above with respect to TABLE 12. Bits 0 through 5 ("Version # Prefix" or "Version # Suffix") are used to represent the prefix or suffix of the firmware version number. For example, to report that Version 1.01 is implemented, byte 2 is 41H and byte 3 is 41H (in hexadecimal notation). To report that Version 3.31 is implemented, byte 2 is 43H and byte 3 is 5FH (in hexadecimal notation). Again, the maximum version number that can be represented is Version 63.63. The machine echoes back the second and third information bytes. The "Activation Permission Request" (ACTPREQ) command is used by the machine to ask the ICU permission to begin an operating cycle after the appropriate payment has been received. This command is used to ensure that the rest of the monitoring system is operating properly before allowing a machine to begin an operating cycle. After echoing the command, the ICU responds with a second information byte that indicates whether or not the operating cycle is allowed to begin. This second information byte conforms to the bit format given in TABLE 21.

TABLE 21

ICU-Machine Protocol, Activation Permission Data Byte

| 7 | 6 | 5–1 | 0 |
|---|---|---|---|
| 0 | 1 | Not Used | PER* |

Bits 6 and 7 conform to the format given above with respect to TABLE 12. Bits 1 through 5 are not used and are set equal to to indicate that they are inactive. Bit 0 (PER*) indicates whether permission to activate the machine is granted ("0") or not granted ("1"). The machine echoes back the second information byte.

The "Inactive" (GOFF) command is used by the ICU to instruct the machine to immediately enter non-operational mode. After receiving an "Inactive" command, the machine cannot issue an "Activation Permission Request" command or perform operating cycles until the machine receives a "Go Active" command (see below). The machine acknowledges receipt of the command by echoing the command back to the ICU.

The "Go Active" (GON) command is used by the ICU to instruct the machine to enter operational mode. The "Go Active" command is used in conjunction with the "Inactive" command, i.e., after the "Inactive" command, and instructs the machine to commence normal operation. The machine acknowledges receipt of the command by echoing the command back to the ICU.

The "Soft RESET" (SRES) command is used by the ICU to instruct the machine to perform a Soft Reset; i.e., to jump to the first address ("base address") used by the software implemented by the machine microprocessor. The machine echoes the command, then waits an appropriate amount of time (e.g., 4 milliseconds) before jumping to the base address so that the echo can be transmitted before the reset.

The "Hardware RESET" (HRES) command is used by the ICU to instruct the machine to perform a Hardware Reset; i.e., toggle the actual CPU RESET line of the machine microprocessor. The machine echoes the command, then, as above, waits an appropriate amount of time (e.g., 4 milliseconds) before executing the reset.

The "Hello" (HELLO) command is used by the ICU to confirm the existence of communication with the machine. Normally, the machine informs the ICU of new events (e.g., machine activations) on a regular basis. However, in some circumstances, the machine may not have any events to report (e.g., a long period with no activations). To verify that there is no problem with the communication between the ICU and machine, and that the lack of communication is only due to an unusual absence of events to report, the ICU issues the "Hello" command. The machine acknowledges receipt of the command by echoing the command back to the ICU.

The "Receive Price Updates" (RCVPR) command is used by the ICU to update the machine prices for different types of operational cycles. The ICU transmits a series of command bytes according to the structure shown in TABLE 22.

TABLE 22

ICU-Machine Protocol, Transmit Prices Data Bytes

| Command Byte # | 7 | 6 | 5–0 | Price |
|---|---|---|---|---|
| 1 | 0 | 0 | 001010 | Command |
| 2 | 0 | 1 | 0000BB | 1 |
| 3 | 0 | 1 | AAAAAA | 1 |
| 4 | 0 | 1 | 0000BB | 2 |
| 5 | 0 | 1 | AAAAAA | 2 |
| * | * | * | * | * |
| 2*n | 0 | 1 | 0000BB | n |
| 2*n + 1 | 0 | 1 | AAAAAA | n |

The first byte of each series is the "Receive Price Updates" (RCVPR) command. The remaining bytes ("price bytes") are used to specify prices for each of n operational cycles. The price bytes are transmitted in groups of two, each group of two corresponding to one of the operational cycles. The sequence of operational cycles is established according to specifications established by the manufacturer of the machine. Groups of price bytes need only be sent up to the last operational cycle for which a price is being established. Bit 7 of each price byte is 0, indicating the information is sent from the ICU to the machine. Bit 6 of each price byte is 1, indicating that the information is data. Bits 1 through 5 in each pair of price bytes are used to represent a price in increments of 5 cents. Though 12 bits are available for specifying a price, only the least significant 8 bits are used, i.e., the two least significant bits ("BB") of the first byte of the pair and all six bits ("AAAAAA") of the second byte of the pair.

Since only 8 bits are used, the maximum price that can be specified is $12.75. For example, a price of $3.50, represented in hexadecimal notation as 46 and in binary notation as 01000110, is transmitted as "01" in bits 0 and 1 of the first byte and "000110" in bits 0 through 5 of the second byte. The machine echoes back each of the price bytes.

The "Send Cycle Prices" (SNDPR) command is used by the ICU to request the machine prices for different types of operational cycles. The ICU issues the "Send Cycle Prices" command. The machine echoes the command, then sends a series of price bytes (bytes 2 through 2*n+1) according to the structure shown above in TABLE 22. The ICU echoes back each of the price bytes transmitted by the machine.

The "New Event Report" (NEVENT) command is used by the machine to report to the ICU any time an event (i.e., change in a sensor) has occurred. After sending the "New Event Report" command, the machine sends two additional information bytes that indicate the type of event being reported. The second and third information bytes conform to the bit format given in TABLE 23 and TABLE 24, respectively.

TABLE 23

ICU-Machine Protocol, Byte #1 of New Event Report Data

| 7 | 6 | 5–4 | 3 | 2 | 1 | 0 |
|---|---|---|---|---|---|---|
| 1 | 1 | Not Used | Service #2 | Not Used | Vault | Service #1 |

TABLE 24

| ICU-Machine Protocol, Byte #2 of New Event Report Data | | | |
|---|---|---|---|
| 7 | 6 | 5 | 4–0 |
| 1 | 1 | Activation | Cycle Type |

Bits 6 and 7 conform to the format given above with respect to TABLE 12. Bits 2 and 5 of the second information byte are not used and are set equal to 0. Bits 0, 1, and 3 of the second information byte, and bit 5 of the third information byte indicate whether the corresponding sensor has been activated, i.e., the sensors for service door #1, the cash vault door, service door #2, and the machine activation mechanism, respectively. A "1" in a sensor bit location indicates that the sensor has been activated, while a "0" means the sensor has been inactive. For example, if Service #1 is "1," it means that service door #1 is open. A "1" in Activation means that the machine commenced a cycle (wash, dry, etc.). Bits 0 through 4 of the third information byte are used to indicate the type of cycle, e.g., cold wash, warm wash, permanent press, etc. Up to 32 different types of cycles can be specified (one may be used to indicate whether the machine is out of order).

The "Send SM Sensors Info" (SNDLEV) command is used by the ICU to inquire from the machine as to whether an event has occurred. After echoing the command, the machine responds with second and third information bytes that indicate the type of event being reported. The second and third information bytes conform to the bit format given in TABLE 23 and TABLE 24, respectively (discussed above). The cycle type started is encoded as indicated above. The ICU echoes back the second, third and fourth information bytes.

The "Send ICU Sensors Info" (SNDSEN) command is used by the machine to request information regarding sensors (e.g., sensors 407) monitored by the ICU. After echoing the command, the ICU responds with second, third and fourth information bytes that indicate the state of the sensors being monitored by the ICU. The second, third and fourth information bytes conform to the bit format given in TABLE 25, TABLE 26, and TABLE 27, respectively.

TABLE 25

| ICU-Machine Protocol, Byte #1 of Sensor Data | | | | | |
|---|---|---|---|---|---|
| 7 | 6 | 5 | 4–3 | 2 | 1–0 |
| 0 | 1 | Sensor #1 Level | Sensor #1 Count | Sensor #2 Level | Sensor #2 Count |

TABLE 26

| ICU-Machine Protocol, Byte #2 of Sensor Data | | | | | |
|---|---|---|---|---|---|
| 7 | 6 | 5 | 4–3 | 2 | 1–0 |
| 0 | 1 | Sensor #3 Level | Sensor #3 Count | Sensor #4 Level | Sensor #4 Count |

TABLE 27

| ICU-Machine Protocol, Byte #3 of Sensor Data | | | | | |
|---|---|---|---|---|---|
| 7 | 6 | 5 | 4–3 | 2 | 1–0 |
| 0 | 1 | Sensor #5 Level | Sensor #5 Count | Sensor #6 Level | Sensor #6 Count |

Bits 6 and 7 conform to the format given above with respect to TABLE 12. Bits 2 and 5 of each of the second, third, and fourth information bytes indicate whether a sensor is active: "0" means INACTIVE and "1" means ACTIVE. Bits 3 and 4, and bits 0 and 1 are each used to indicate the number of sensor cycles (CLOSED-OPEN-CLOSED) that have occurred since the last machine interrogation. These counters are necessary in case the machine requests this information infrequently enough for complete sensor cycles to occur. Generally, the counters will increase to a maximum of 3 and will remain there until read by the machine. The sensor for sensing machine activations will continue to count above 3 activations; the excess activations are reported as explained above. The counters are reset after each time that the "Send ICU Sensors Info" command is issued. In this embodiment, the ICU can monitor up to 6 sensors. The machine echoes back the second, third and fourth information bytes.

The "Send SM Fault Registers" (SSMFLT) command is used by the ICU to ascertain the state of the fault registers of the machine. After echoing the command, the machine responds with second and third information bytes that indicate the state of the machine fault registers. The second and third information bytes conform to the bit format given in TABLE 28 and TABLE 29, respectively.

TABLE 28

| ICU-Machine Protocol, Byte #1 of Fault Registers Data | | | | | | | |
|---|---|---|---|---|---|---|---|
| 7 | 6 | 5 | 4 | 3 | 2 | 1 | 0 |
| 1 | 1 | SEN6 | SEN5 | SEN4 | SEN3 | SEN2 | SEN1 |

TABLE 29

| ICU-Machine Protocol, Byte #2 of Fault Registers Data | | | | | | | |
|---|---|---|---|---|---|---|---|
| 7 | 6 | 5 | 4 | 3 | 2 | 1 | 0 |
| 1 | 1 | SEN12 | SEN11 | SEN10 | SEN9 | SEN8 | SEN7 |

Bits 6 and 7 conform to the format given above with respect to TABLE 12. Bit 0 through 5 of each of the second and third information bytes indicate whether a particular sensor is faulty or not: "1" indicates a fault and "0" indicates no fault. The machine resets the bits 0 through 5 after responding to the "Send SM Fault Registers" command. The sensors are defined as shown in TABLE 30 ("TBD" refers to undefined sensors). Other sensor definitions can be used.

TABLE 30

| ICU-Machine Protocol, Machine Sensor Definition | |
|---|---|
| Sensor # | Description |
| SEN1 | Water Pump |
| SEN2 | Water Valve |

TABLE 30-continued

ICU-Machine Protocol, Machine Sensor Definition

| Sensor # | Description |
|---|---|
| SEN3 | Heating Element |
| SEN4 | TBD |
| SEN5 | TBD |
| SEN6 | TBD |
| SEN7 | TBD |
| SEN8 | TBD |
| SEN9 | TBD |
| SEN10 | TBD |
| SEN11 | TBD |
| SEN12 | TBD |

The ICU echoes back the second and third information bytes.

The "Send ICU Fault Registers" (SICUFLT) command is used by the machine to obtain information regarding malfunctioning of the sensors monitored by the ICU. After echoing the command, the ICU responds with a second information byte that indicates which, if any, of the ICU sensors are malfunctioning. The second information byte conforms to the bit format given in TABLE 31.

TABLE 31

ICU-Machine Protocol, Faulty Sensor Data

| 7 | 6 | 5 | 4 | 3 | 2 | 1 | 0 |
|---|---|---|---|---|---|---|---|
| 0 | 1 | SEN6 | SEN5 | SEN4 | SEN3 | SEN2 | SEN1 |

Bits 6 and 7 conform to the format given above with respect to TABLE 12. Bits 0 through 5 of the second information byte indicate whether a particular sensor is faulty or not: "1" indicates a fault and "0" indicates no fault. The ICU resets the bits 0 through 5 after responding to the "Send ICU Fault Registers" command. The sensors are defined in any manner that is appropriate for the particular machine being monitored. For example, for smart machines that do not themselves monitor any of the sensors associated with monitoring of dumb machines, bits 0 through 5 are defined to correspond to appropriate ones of those sensors. Other sensor definitions can be used. After the ICU responds with the second information byte, the machine echoes back the second information byte.

The "Perform Self Test" (PSELFT) command is used by the ICU to instruct the machine to perform a self test. After echoing the command, the machine responds with second, third, and fourth information bytes. The second information byte indicates the results of the self test and conforms to the bit format given in TABLE 32.

TABLE 32

ICU-Machine Protocol, Byte #2 of Machine Self Test Data

| 7 | 6 | 5-3 | 2-0 |
|---|---|---|---|
| 1 | 1 | Not Used | Result Code |

TABLE 33

ICU-Machine Protocol, Machine Test Result Codes

| Result Code | Description |
|---|---|
| 000 | Pass |
| 001 | TBD |
| 010 | TBD |
| 011 | TBD |
| 100 | TBD |
| 101 | TBD |
| 110 | TBD |
| 111 | Fail |

The third and fourth bytes indicate the state of the machine fault registers, as discussed above, and conform to the bit format given in TABLES 30 and 31. The ICU echoes back the second, third and fourth information bytes.

The "Activate Price Discount" (DSCNT) command is used by the ICU to instruct the machine to activate one of three different price discounts or use the regular price. The ICU sends the "Activate Price Discount" command, followed by a second information byte having the bit format shown in TABLE 34.

TABLE 34

ICU-Machine Protocol, Price Discount Data Byte

| 7 | 6 | 5-2 | 1-0 |
|---|---|---|---|
| 0 | 1 | Not Used | Discount Code |

The "Discount Code" bits are interpreted as indicated in TABLE 35.

TABLE 35

ICU-Machine Protocol, Discount Codes

| Discount Code | Description |
|---|---|
| 00 | Regular Price Discount |
| 01 | Price Discount 1 |
| 10 | Price Discount 2 |
| 11 | Price Discount 3 |

The machine responds by echoing back the two information bytes sent by the ICU.

The "Report Price Discount" (DSCNT) command is used by the ICU to retrieve the current price discount from the machine. After echoing the command, the machine responds with a second information byte that indicates the discount in effect. The second information byte conforms to the bit format given in TABLE 34 and the Discount Codes in TABLE 35. The ICU echoes back the second information byte.

The "Send Machine Status" (SNDSTAT) command is used by the ICU to retrieve the current machine status (i.e. operating, idle, etc.) from the machine. After echoing the command, the machine responds with a second information byte that indicates the machine status. The second information byte conforms to the bit format given in TABLE 36.

TABLE 36

| ICU-Machine Protocol, Machine Status Byte | | | |
|---|---|---|---|
| 7 | 6 | 5 | 4–0 |
| 1 | 1 | Operating | Cycle Type |

Bits 6 and 7 conform to the format given above with respect to TABLE 12. Bit 5 indicates whether the machine is in the middle of an operating cycle or not: "1" means that the machine is in the middle of a cycle and "0" means that the machine is off. Bits 0 through 4 ("Cycle Type") indicate the type of machine cycle as discussed above. The ICU echoes back the second information byte.

The "Manufacturer Specific" (MFGCMD) command is used by the ICU to issue manufacturer-specific commands not included in the Universal Command Set. The capability to issue manufacturer-specific commands allows new features to be added to the monitoring system of the invention as such features become available, without the need to modify the ICU-machine protocol. After sending the "Manufacturer Specific" command, the ICU sends a second information byte that identifies the particular manufacturer to whom the command pertains. The second information byte conforms to the bit format given in TABLE 37.

TABLE 37

| ICU-Machine Protocol, Manufacturer Identification Byte | | |
|---|---|---|
| 7 | 6 | 5–0 |
| 0 | 1 | Manufacturer Code |

The "Manufacturer Code" bits are interpreted as indicated in TABLE 15 above.

Following the second information byte, the ICU sends additional command bytes corresponding to the manufacturer-specific command. The bit format of these bytes is specified to convey desired information in a manner similar to that of the information bytes described above. The particular bit format depends upon the particular manufacturer-specific command.

The "Abort Current" (KILL) command is used by the ICU when the machine has responded to a previously sent command by echoing back an incorrect command. The "Abort Current" command instructs the machine to ignore the previously sent command. The machine responds by echoing back the command.

The "Not Supported" (NSP) command is returned by the machine after receiving a command from the ICU that is not supported or understood by the machine. The ICU echoes back the "Not Supported" command.

As mentioned above, the MCU of a system according to the invention (e.g., MCU 102 of FIG. 1C or MCU 200 of FIG. 2) can be embodied as a computer. When embodied as a computer, the MCU can be controlled by one or more computer programs. In one embodiment of the invention, the MCU is an IBM-compatible computer using the Windows 3.1 operating system (other versions of Windows can also be used) available from Microsoft of Redmond, Wash. An application computer program (described in more detail below) that is compatible with the Windows 3.1 operating system is used to implement various aspects of the invention. A database is used to store information describing the operation being monitored. As will be apparent from the description below, the application program uses menus, mouse and keyboard functions, and file and print windows that are similar to those implemented by Windows 3.1. Below, aspects of the invention are described as implemented in a Windows 3.1 applications program that operates in conjunction with a relational database to effect monitoring of an operation. However, it is to be understood that this description is only illustrative and that, generally, the invention can be implemented on any type of computer using any operating system with an application program and database that achieve the same monitoring capabilities.

The application program enables control of many aspects of a monitoring system according to the invention. The application program controls communication between the monitoring site and the operating sites, i.e., retrieval of information regarding operations at the operating sites and sending of instructions to the operating sites. In addition, the application program controls processing of the information retrieved from the operating site and stores information regarding the operations at the operating sites. The application program also generates reports regarding operations at the operating sites.

Generally, the application program accepts input from the user interface device of the MCU, e.g., user interface device 205 of MCU 200 (FIG. 2), interprets the type of input, and engages in an appropriate action. For example, the user input may be an instruction to update information describing the operation (i.e., update information in the relational database) such as the amount of money collected from particular machines or a description of the types of machines located at an operating site. The application program interprets the instruction to determine which information needs to be updated, then updates the relational database as appropriate. In another example, the user input is an instruction to produce a report regarding a particular aspect of the operation being monitored. The application program determines the type of report to be generated, and generates the report using the appropriate information from the relational database. Additionally, the application program can engage in an action other than as a result of an instruction provided by the user. For example, as explained below, the user can specify that data is to be automatically acquired from an operating site at a particular time. The application program monitors an internal clock in the MCU and, when the designated time arrives, the application program issues an instruction to the SCU at the operating site to begin transferring data to the MCU that has been acquired from the ICUs on the machines. The application program then uses the acquired data to update the appropriate portions of the relational database.

In one embodiment of the invention, the application program is accessed by selecting a predefined icon in the Program Manager window of Windows 3.1. In the following description, reference is sometimes made to selecting an icon, an option or an entry. In such a context, generally, "selecting" refers to clicking a mouse, pressing the "Tab" key or "Enter" key on a keyboard, or performing any other predefined user input operation when an item on the display (such as a menu option, an icon or an entry in a list) is highlighted. An item is highlighted by moving a cursor to the appropriate location on the display, as is well known. The cursor can be moved from item to item or field to field by using a mouse or the "Tab" key or cursor keys on a keyboard.

At this point, the user is prompted for login information: user name and user password. More than one user can be logged into the application program at one time. Associated with each user name is a password and a security level that define the type of access that a particular user can have to the application program. In one embodiment of the invention, described in more detail below, the application program has three security levels: System Administrator, General User and Data Entry User. The System Administrator has access to all aspects of the application program and is typically the owner of the business for which the monitoring system according to the invention is being used. General Users have more limited access to the program and may be, for example, a manager of one or more of the operating sites. Data Entry Users have the most limited access to the program. The multiple security levels are an important deterrent to teaming up by people other than the business owner to manipulate the monitoring system to enable stealing from the operation or other undesirable conduct.

Figure 5:
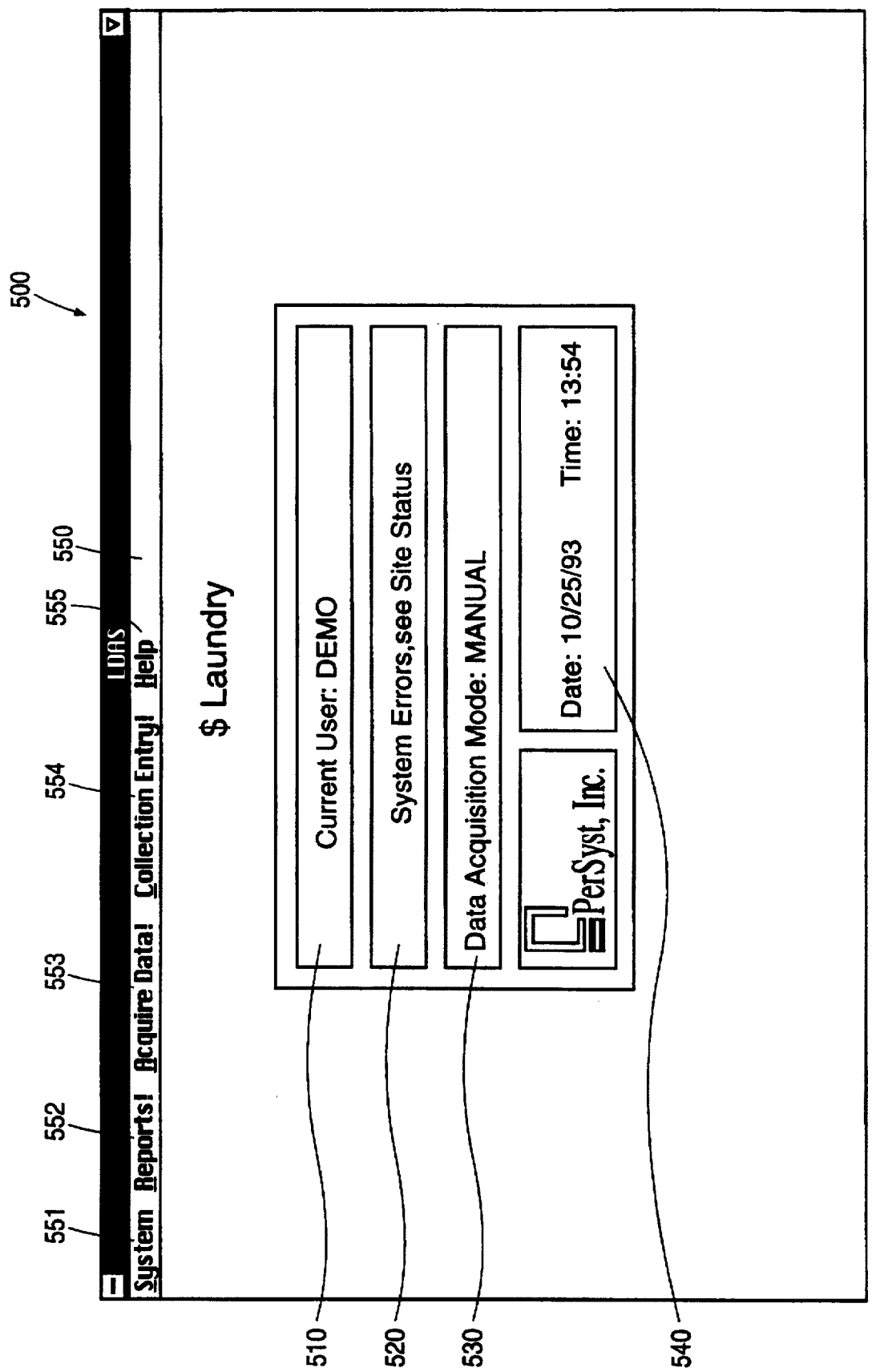
FIG. 5 illustrates a Main window of an application program of a monitoring system according to the invention.

After the user name and password are correctly entered, the MCU display shows a Main window 500, as shown in FIG. 5. The Main window 500 is divided into four sections which provide a quick overview of the state of the monitoring system. The Current User section 510 displays the user name of the person who is currently using the application program. The System Health section 520 indicates whether or not any problems with operation of the monitoring system have been detected (as explained in more detail below). If no problems have been detected, "OK" will appear in the System Health section 520. If errors have been detected, "Errors, see Site Status" will appear, as shown in FIG. 5. The Data Acquisition Mode section 530 indicates whether or not data is being retrieved automatically from each operating site. If data is being retrieved automatically, "Automatic" will appear in the Data Acquisition Mode section 530. If data is not being retrieved automatically, "Manual" will appear. The Date and Time section 540 indicates the current date and time.

The Main window 500 also includes a menu bar 550 located at the top of the Main window 500. The menu bar 550 includes a System menu 551, a Reports! option 552, an Acquire Data! option 553 and a Collection Entry! option 554 and a Help option 555. Each of these choices in the menu bar 550 are described in more detail below.

The System menu 551 includes seven options (not shown): Site Status, Site Information, Data Collection Parameters, User List, Business Information, Logout and Exit. Each of these options is described in more detail below.

Figure 6:
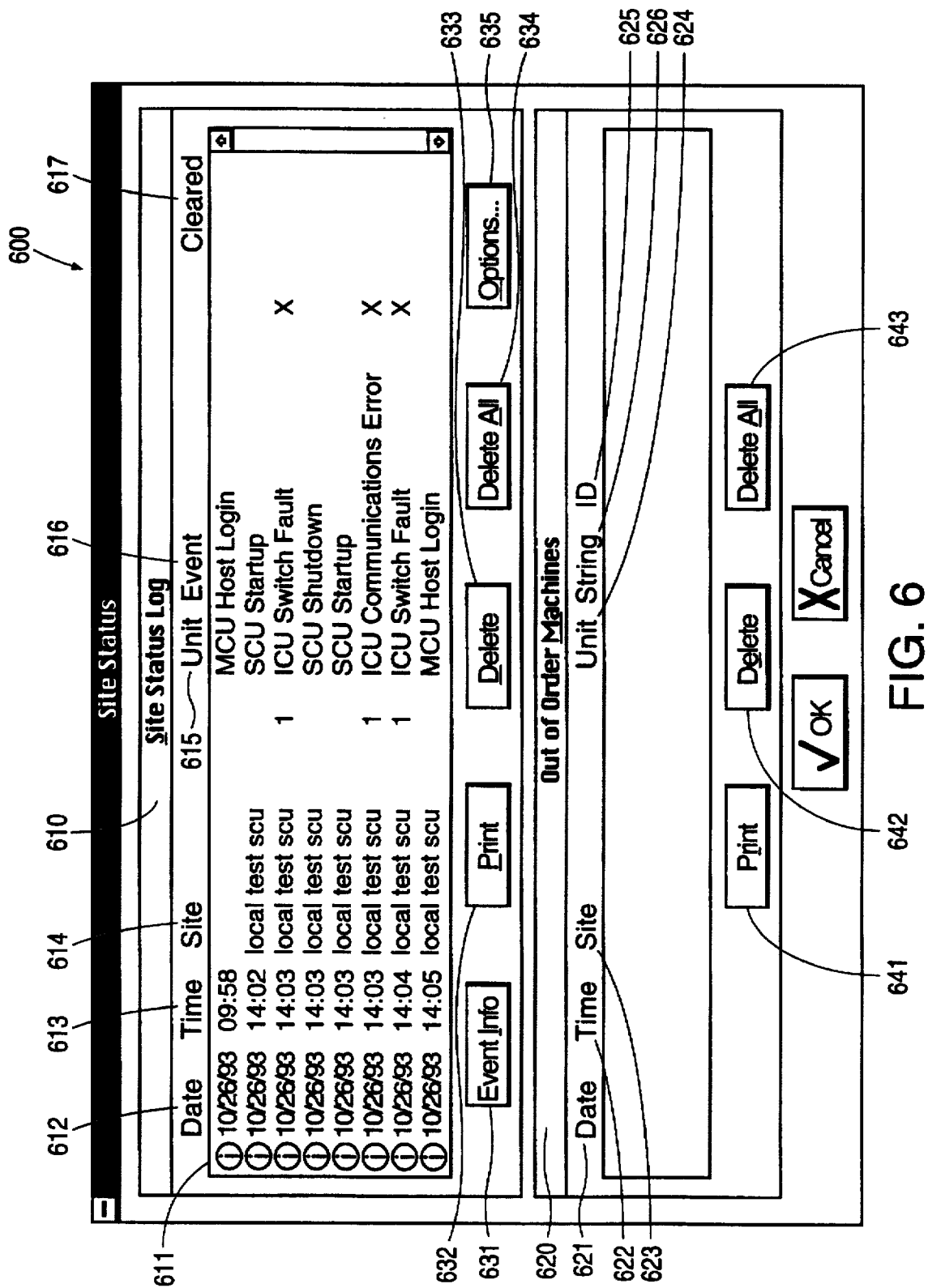
FIG. 6 illustrates a Site Status window of an application program of a monitoring system according to the invention.

The first option in the System Menu 551 is Site Status. Choosing Site Status causes a Site Status window 600 to be displayed, as shown in FIG. 6. The Site Status window 600 is divided into two sections: the Site Status Log 610 and the Out of Order Machines list 620. The Site Status Log 610 shows a record of all successful communications, communication problems and communication errors ("communication conditions") resulting from attempted communications between the MCU and an SCU or between an SCU and an ICU. The Out of Order Machines list 620 is a list of all machines that are currently out of order.

The Site Status Log 610 provides a detailed account of the communications between components of a monitoring system according to the invention. The Site Status Log 610 includes an entry for each communication condition. Each entry includes information in each of seven columns.

In the first column 611, one of three logos appears, indicating the type of communication condition described by the entry. The first logo, a red stop sign, indicates a communication error. Communication errors include: the malfunction of a service door sensor, cash vault sensor, or machine activation sensor; the failure of the ICU to respond to an SCU interrogation; and the failure of the MCU to connect to an SCU via the telephone line. The second logo, a yellow circle with an exclamation point, indicates a communication problem. A communication problem occurs when there is a discrepancy between the data sent by a machine and the data received by the SCU or the MCU. This differs from a communication error in which the machine simply fails to transmit requested data. The third logo, a blue circle with an exclamation point, indicates the occurrence of a benign event. Benign events include MCU login and logout, MCU data acquisition from the SCU, SCU data transfer to the MCU, MCU download of information to the SCU, manual shutdown of the SCU at the operating site, and manual start-up of the SCU at the operating site.

The microcontroller 402 enables communication conditions to be recognized. The application program instructs the software stored in the memory 307 of the SCU 300 to obtain information from the microcontroller 402 regarding the communication conditions. The obtained information is sent by the SCU to the MCU (i.e., to the application program) for use in the Site Status window 600.

The second column 612 (designated by the header "Date") indicates the date that the communication condition first occurred.

The third column 613 (designated by the header "Time") indicates the time that the communication condition first occurred.

The fourth column 614 (designated by the header "Site") indicates the operating site with which the communication condition is associated.

The fifth column 615 (designated by the header "Unit") indicates the number of the machine (or "unit") with which the communication condition is associated.

The sixth column 616 (designated by the header "Event") gives a description of the communication condition. This description corresponds to one of the particular types of successful communications, communications problems, and communications errors described above with respect to the logos displayed in the first column.

The seventh column 617 (designated by the header "Cleared") indicates that a communication error or communication problem has been cleared (i.e., corrected). The application program recognizes that a communication error or communication problem has been cleared if the communication error or communication problem does not occur during the next attempt of the type of communication that gave rise to the problem or error. No entry ever appears in the seventh column 617 for a successful communication.

For example, the ICU of a machine may fail to respond to an inquiry from the SCU. The first time this occurs, an entry would be added to the Site Status Log 610 including a red stop sign logo, the date and time of occurrence, the operating site and unit number associated with the attempted communication, and a description of the communication problem. Nothing, however, would appear at that time in the Cleared column of that entry. Each subsequent occurrence of a failure of that particular ICU to respond to an inquiry from that particular SCU would not result in the generation of an additional entry in the Site Status Log 610. When the ICU finally does respond to an inquiry from the SCU, an "X" appears in the Cleared column to indicate that the communication problem has been resolved and no longer exists. If the same communication problem occurs again after having been cleared, a new entry is added to the Site Status Log 610 as described above.

At the bottom of the Site Status Log 610 are five options relating to the information contained in the Site Status Log 610: the Event Info option 631, the Print option 632, the Delete option 633, the Delete All option 634, and the Options option 635.

Figure 7:
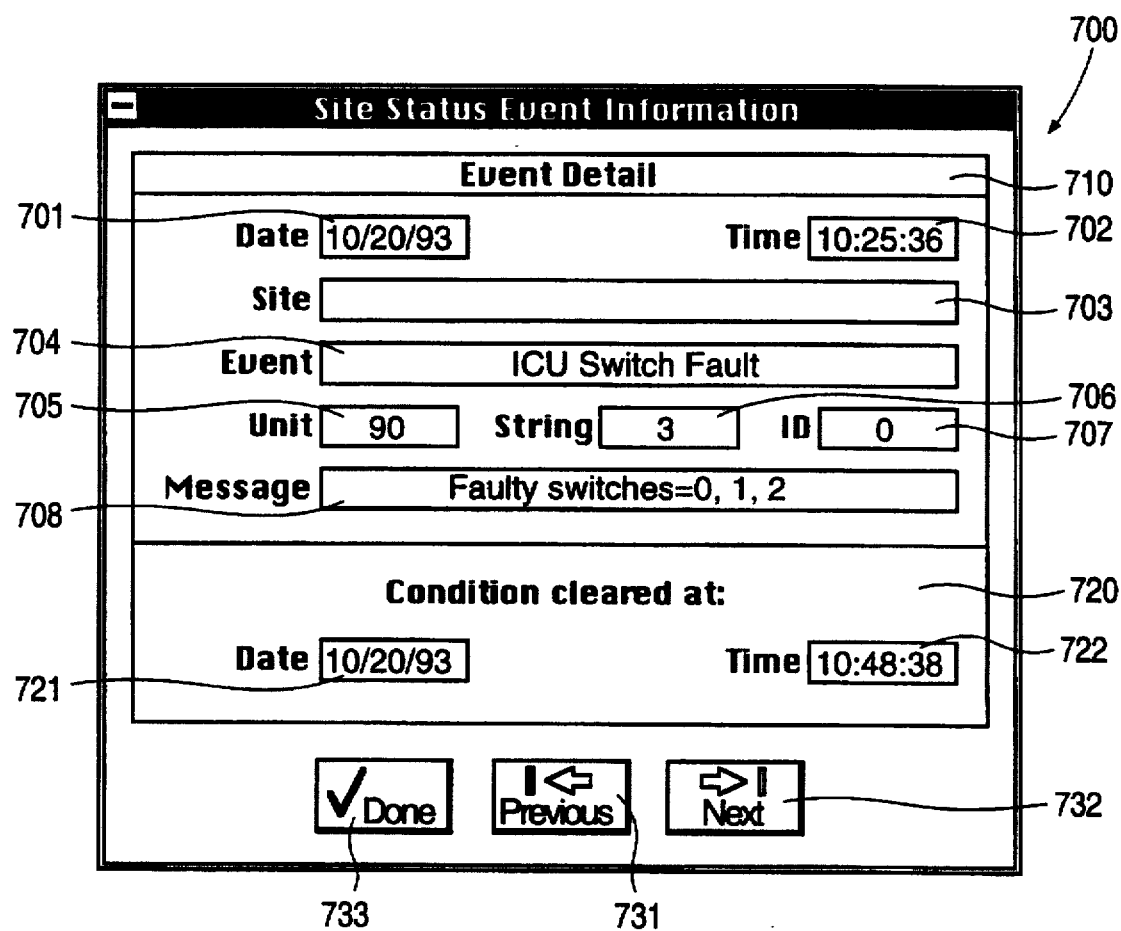
FIG. 7 illustrates a Site Status Event Information window of an application program of a monitoring system according to the invention.

The Event Info option 631 enables the user to obtain even more detailed description of each communication condition listed in the Site Status Log 610. The particular communication condition of interest is highlighted and then the Event Info option is selected 631. Selecting the Event Info option 631 causes a Site Status Event Information window 700 to appear, as shown in FIG. 7. The Site Status Event Information window 700 includes an Event Detail box 710 and Condition Cleared At box 720. The Event Detail box 710 includes additional information about the nature of the communication condition. The Condition Cleared At box 720 includes additional information about clearance of the communication condition, if appropriate.

In addition to the information contained in the Site Status Log 610, the Event Detail box 710 includes a Message 708, a String number 706 and an ID number 707. The Message 708 provides further information regarding the nature of the communication condition. The String number 706 corresponds to the communication string (as explained above with respect to FIG. 1C) of machines of which the machine associated with the communication condition is part. The ID number 707 is the identification number of the machine associated with the communication condition. The Date 701, Time 702, Site 703, Event 704 and Unit 705 display the same information as found in the corresponding columns of the Site Status Log 610.

For dumb machines, the Message 708 indicates which sensor is faulty. For smart machines, the Message 708 gives specific information regarding the exact nature of the communication condition, the information being limited only by the capabilities of the microprocessor of the smart machine and the room allotted on the display for the Message 708.

The Site Status Event Information window 700 also includes a Condition Cleared At box 720 which indicates the Date 721 and Time 722 that the communication condition was cleared, if appropriate. For example, if the communication condition is a machine malfunction, the Condition Cleared At box 720 indicates the date and time that the machine was repaired.

The Site Status Event Information window 700 also includes several options for manipulating the information in the Site Status Event Information window 700 without leaving the Site Status Event Information window 700. A Previous option 731 allows the user to see, in the Site Status Event Information window 700, the information for the communication condition in the Site Status Log 610 (see FIG. 6) that is immediately previous to the communication condition currently being examined. In like manner, a Next option 732 allows the user to see the information for the communication condition in the Site Status Log 610 that is immediately after the communication condition currently being examined.

When the user no longer desires to examine detailed information regarding a communication condition, the user selects the Done option 733 to exit the Site Status Event Information window 700.

Returning to the Site Status window 600 (FIG. 6), the Print option 632 at the bottom of the Site Status Log 610 allows the user to print the Site Status Log 610, using the printing options available in Windows 3.1.

The Delete option 633 at the bottom of the Site Status Log 610 allows the user to delete a Site Status Log entry. Entries are deleted one at a time by first highlighting the entry to be deleted, then selecting the Delete option 633.

The Delete All option 634 allows the user to delete all of the Site Status Log 610 entries at once by selecting that option.

Figure 8:
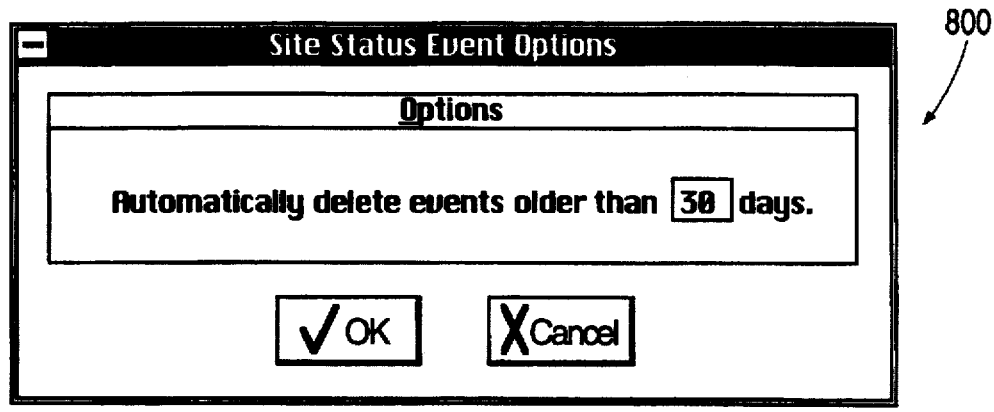
FIG. 8 illustrates a Site Status Event Options window of an application program of a monitoring system according to the invention.

The Options option 635 allows the user to define a time period for which Site Status Log entries are to be shown. Selecting the Options option 635 causes a Site Status Event Options window 800 to appear, as shown in FIG. 8. The user specifies the number of days prior to the current date for which entries should be included in the Site Status Log 610. The user confirms the entry by selecting "OK" and cancels the entry by selecting "Cancel"

Returning to the Site Status window 600 (FIG. 6), the Out of Order Machines list 620 appears at the bottom of the Site Status window 600. The Out of Order Machines list 620 enables the user to ascertain which machines at all locations are currently out of order. As part of the monitoring system of the invention, each machine is equipped with an "Out-of-Order" switch that can be used, in the event of a malfunction in the operation of a machine, to indicate that the machine is out of order. Pushing the "Out-of-Order" switch for a machine sends a message to the corresponding SCU that the machine is not working. The SCU then stops attempting to collect data from the machine and information identifying the malfunctioning machine appears in the Out of Order Machines list 620.

The information in the Out of Order Machines list 620 is arranged in six columns. The first and second columns 621 and 622, respectively, give the date and time that the "Out-of-Order" switch was activated. The third column 623 indicates the operating site at which the out-of-order machine is located. The fourth column 624 indicates the unit (number of the machine) that is out of order. The fifth column 625 indicates the number of the string of which the out-of-order machine is part. The sixth column 626 indicates the ID number of the out-of-order machine.

At the bottom of the Out of Order Machines list 620 are three options relating to the information contained in the Out of Order Machines list 620: the Print option 641, the Delete option 642, and the Delete All option 643. These options provide capabilities similar to those of the like-named options at the bottom of the Site Status Log 610, i.e., the Print option 641 allows the user to print the Out of Order Machines list 620, the Delete option 642 allows the user to delete an Out of Order Machines list entry, and the Delete All option 643 allows the user to delete all of the Out of Order Machines list entries at once.

To save any changes made while operating in the Site Status window 600, "OK" is selected. To reject the changes made, "Cancel" is selected. Selection of either "OK" or "Cancel" causes the application program to exit the Site Status window 600 and return to the Main window 500 (FIG. 5).

Figure 9:
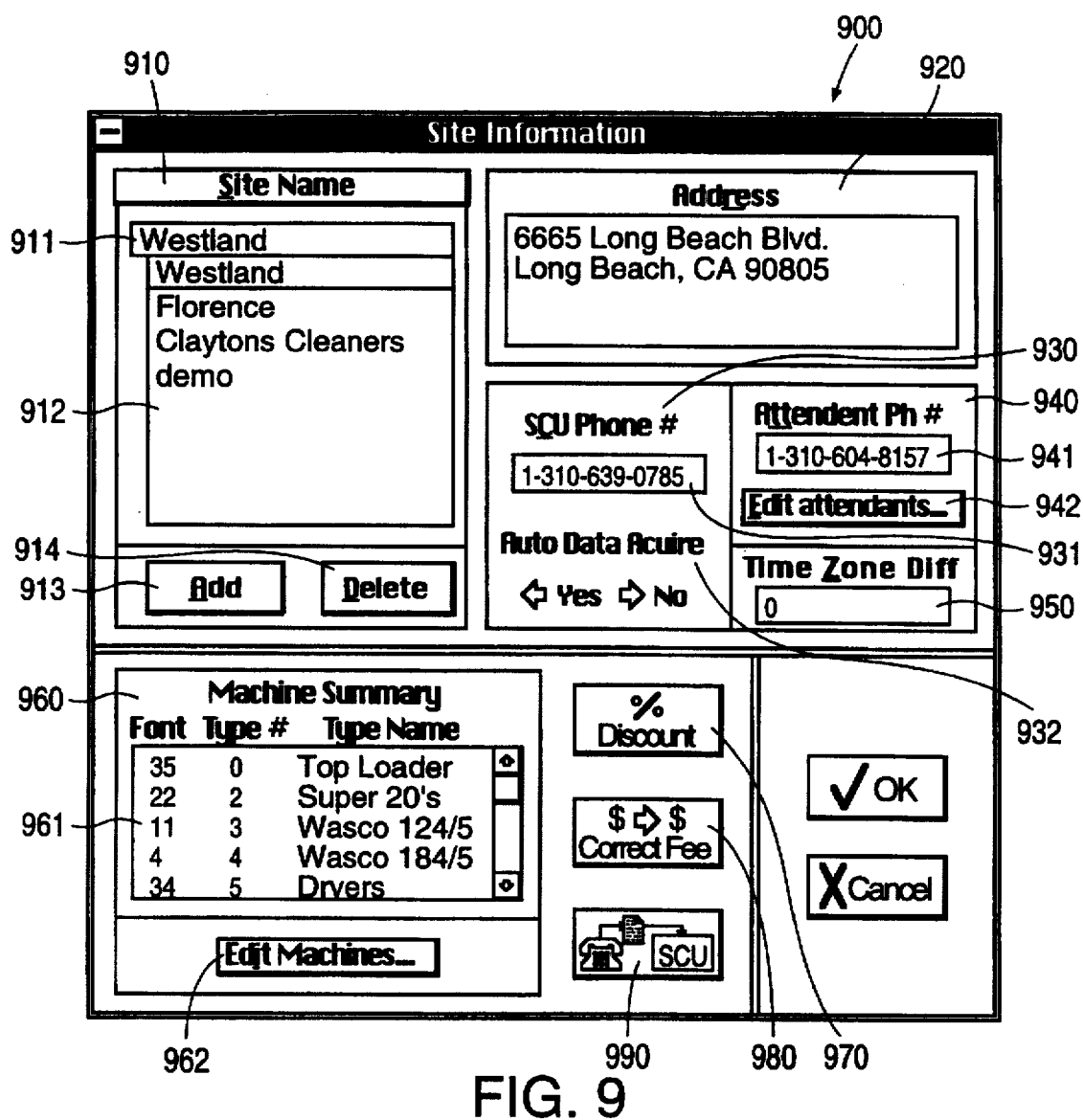
FIG. 9 illustrates a Site Information window of an application program of a monitoring system according to the invention.

Returning to the System menu 551 included in the menu bar 550 at the top of the Main window 500, the second option in the System menu 551 is Site Information. Selecting Site Information causes a Site Information window 900 to appear, as shown in FIG. 9. The Site Information window 900 is used to record and display various information regarding each operating site. The Site Information window 900 is also used to access other windows in which detailed information regarding particular aspects of the operation at each operating site is specified, recorded and displayed. The Site Information window 900 is divided into several boxes including the Site Name box 910, the Address box 920, the SCU Communication box 930, the Attendant Communication box 940, the Time Zone Difference box 950 and the Machine Summary box 960. The Site Information window 900 also includes several options that can be chosen by the user: the % Discount option 970, the Correct Fee option 980 and the Telephone-SCU option 990.

At the top left of the Site Information window 900 is the Site Name box 910. The Site Name box 910 is used to maintain a list of the operating sites being monitored by the system according to the invention. The Site Name box 910 includes a site name entry section 911, a site list 912, an Add option 913 and a Delete option 914.

A cursor automatically appears in the site name entry section 911 when the Site Information window 900 first appears. The site list 912 includes the names of all of the operating sites that have been identified to the application program as operating sites being monitored by the system according to the invention. The user can use the cursor to scroll through the site list 912, highlighting each site name in the site list 912 in succession. As each site name is highlighted, the information in other boxes of the Site Information window 900 changes so that the information corresponding to the highlighted site name appears. This characteristic of the application program is enabled by storing in the relational database the data regarding the operation being monitored.

To add an operating site to the site list 912, the user enters the name of the operating site in the site name entry section 911, then selects the Add option 913 to add that operating site. If the user wants to change the name of an operating site or replace the name of an operating site with the name of another operating site, the user highlights the existing operating site name in the site list 912, types the new description, then selects the Add option 913. If the user wants to change other information about an operating site, as described below, the user highlights the name of the operating site and selects the Add option 913. If the user wants to delete an operating site name from the site list 912, the user highlights the operating site name in the site list 912 and selects the Delete option 914.

Selecting the Add option 913 causes the cursor to automatically move to the Address box 920 so that the user can add or update the address of the operating site that was highlighted or added just prior to selection of the Add option 913. Any previously existing information in the Address box 920 is replaced by the newly entered information once "OK" is selected (as described below).

Once the address has been entered in the Address box 920 (or if no change to the existing address is required), the user can move the cursor to the SCU phone # entry section 931 of the SCU Communication box 930. The phone number that is dialed to establish a communication connection to the SCU at the operating site is entered into the SCU phone # entry section 931.

As previously mentioned, the user can instruct the application program to automatically obtain information at established intervals (the establishment of which is explained in more detail below) from the operating sites, regardless of whether the user is logged in to the application program. Alternatively, the user can configure the application program so that information is obtained only when the user is logged in and accesses the operating site information. This aspect of the application program is controlled with the Auto Data Acquire option 932 of the SCU Communication box 930: if automatic data acquisition is desired, the user selects "Yes"; otherwise, the user selects "No" Selection of the Auto Data Acquire option 932 causes data to be automatically collected for all machines at the operating site.

Once the user finishes with the SCU Communication box 930, the user can move the cursor to the attendant phone entry section 941 of the Attendant Communication box 940. The user can enter the phone number of a phone at the operating site that can be used to contact the attendant working at the operating site. The user can also select the Edit Attendants option 942.

Figure 10:
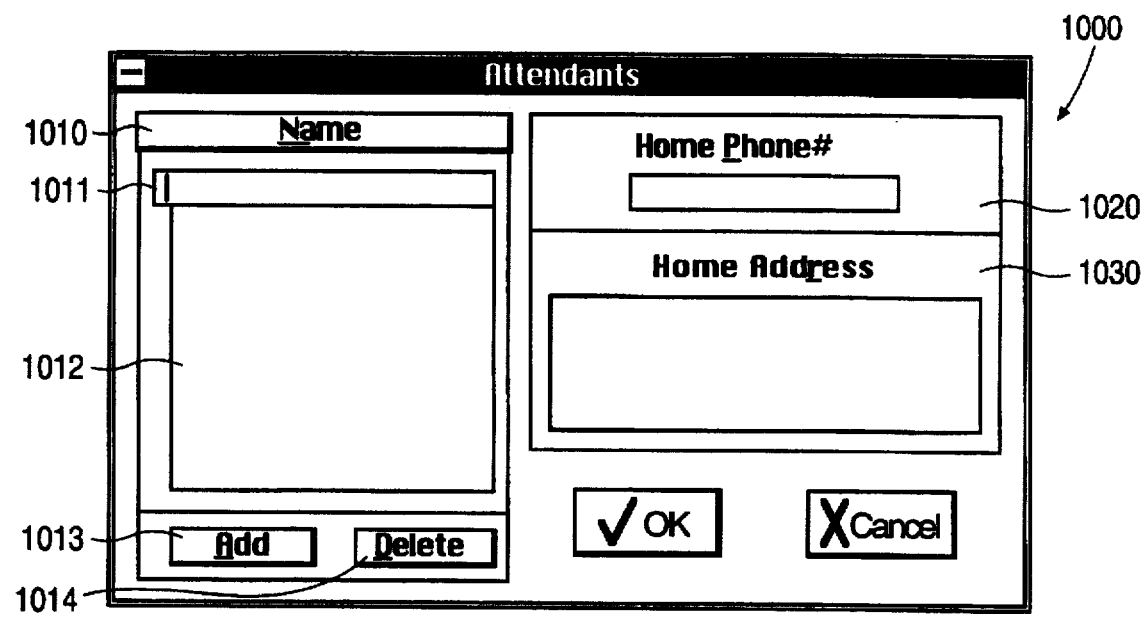
FIG. 10 illustrates a Attendants window of an application program of a monitoring system according to the invention.

Selection of the Edit Attendants option 942 causes an Attendants window 1000 to appear, as shown in FIG. 10. The Attendants window 1000 is used to maintain a list of attendants working at the operating site. The Attendants window 1000 includes the Name box 1010, the Home Phone # box 1020, and the Home Address box 1030.

The Name box 1010 includes an attendant name entry section 1011, an attendant list 1012, an Add option 1013 and a Delete option 1014. The attendant list 1012 includes the names of all of the attendants that have been identified to the application program as working at the operating site for which information is being entered in the Site Information window 900. Generally, the attendant name entry section 1011 and attendant list 1012 operate in a manner analogous to that described elsewhere with respect to similar sections of other windows of the application program.

When the Attendants window 1000 first appears, the cursor is automatically positioned in the attendant name entry section 1011. If one or more attendants have already been added to the attendant list 1012, the Delete option 1014 is highlighted and the name of the first attendant in the attendant list 1012 appears in the attendant name entry section 1011. If the user desires to delete that attendant from the list, the user simply selects the Delete option 1014. That attendant's name, address, and phone number are then deleted from the attendant list 1012 and "Deleted" appears in place of the attendant's name in the attendant list 1012. Other attendants can be deleted by moving the cursor to the desired attendant's name in the attendant list 1012, then selecting the Delete option 1014.

If no attendants are listed in the attendant list 1012, or if the user wants to add another name to the attendant list 1012, the user simply types the name of the new attendant into the attendant name entry section 1011 and selects the Add option 1013. An existing attendant's name can be revised, or an existing attendant's name replaced with the name of a new attendant by highlighting the existing attendant name, entering the new attendant name in the attendant name entry section 1011, and selecting the Add option 1013. A Confirm message appears, asking the user to confirm (select "Yes" in the Confirm message) or cancel (select "No" in the Confirm message) the addition or revision to the attendant list 1012.

If the addition or revision is confirmed, the cursor automatically moves to the Home Phone # box 1020. The user can enter the home phone number of the attendant if not already entered or revise an existing home phone number. Once finished with the Home Phone # box 1020, the user can move the cursor to the Home Address box 1030 and add or revise the home address of the attendant. Though not shown in FIG. 10, in another embodiment of the invention, a Shift Time box is also included in the Attendants Window 1000 and shows the working hours of the attendant.

If all entered information for all attendants is correct, the users selects "OK" to save any changes made in the Attendant window 100 and return to the Site Information window 900 (FIG. 9). The information for each attendant can be checked by successively highlighting attendant names in the attendant list 1012: as each attendant's name is highlighted, the corresponding information appears in the Home Phone # box 1020 and Home Address box 1030. If any information needs to be corrected, the user can change the information as described above.

The user may also exit the Attendants window 1000 at any time and return to the Site Information window 900 by selecting "Cancel". Selecting "Cancel" causes any newly entered information or modifications to existing information in the Attendants window 1000 to be ignored.

Returning to the Site Information window 900, once the user finishes with the Attendant Communication box 940, the user can move the cursor to the Time Zone Difference box 950. In this box, the user can specify the time zone difference between the location of the monitoring site and the location of each operating site so that the user can plan to make any calls to the operating site during appropriate hours.

The user can then move the cursor to the Machine Summary box 960. The Machine Summary box 960 includes a machine summary section 961 and an Edit Machines option 962. The machine summary section 961 lists the quantity of each type of machine that is present at the operating site highlighted in the site list 912. If the user wants to add to or edit the information in the Machine Summary box 960, or if the user wants to see more detailed information about the machines at the operating site, then the user selects the Edit Machines option 962.

Figure 11:
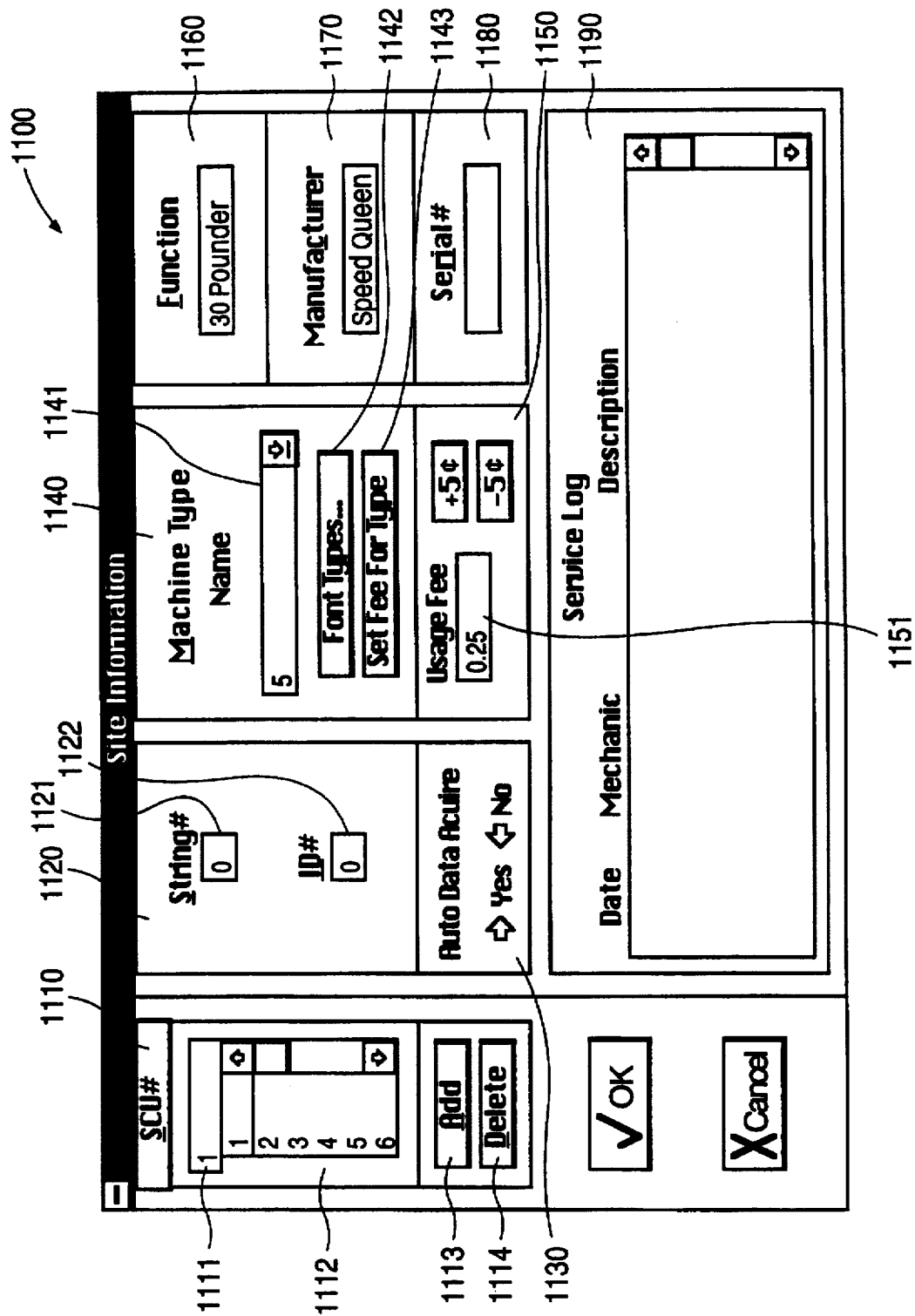
FIG. 11 illustrates a Machine Information window of an application program of a monitoring system according to the invention.

Selection of the Edit Machines option 962 causes a Machine Information window 1100 to appear, as shown in FIG. 11. The Machine Information window 1100 is used to maintain a list of machines located at the operating site. The Machine Information window 1100 includes the Unit # box 1110, the String and ID # box 1120, Auto Acquire Data box 1130, the Machine Type box 1140, the Usage Fee box 1150, the Function box 1160, the Manufacturer box 1170, the Serial # box 1180, and the Service Log box 1190.

The Unit # box 1110 includes a unit number entry section 1111, a unit number list 1112, an Add option 1113 and a Delete option 1114. The unit number list 1112 is a list of all the machines that have been identified to the application program as operating at the operating site for which information is being entered in the Site Information window 900. Generally, the unit number entry section 1111 and unit number list 1112 operate in a manner analogous to that described elsewhere with respect to similar sections of other windows of the application program.

When the Machine Information window 1100 first appears, the cursor is automatically positioned in the unit number entry section 1111. If one or more machines have been previously added to the unit number list 1112, the machine with the lowest unit number will automatically be highlighted in the unit number list 1112 and appear in the unit number entry section 1111. This machine can be deleted by selecting the Delete option 1114. Other machines can be deleted by first highlighting the appropriate unit number in the unit number list 1112, then selecting the Delete option 1114. When a machine is deleted from the Unit # box 1110, all other information for this machine appearing in other boxes of the Machine Information window 1100 is deleted also.

If one or more machines have been previously entered and the user desires to add a machine to the unit number list 1112, the user selects the Add option 1113. Selection of the Add option 1113 automatically adds the next sequential number to the end of the unit number list 1112. This number also appears in the unit number entry section 1111. If no machines have been previously entered, then selecting the Add option 1113 causes the number 1 to appear in both the unit number entry section 1111 and unit number list 1112.

When the Add option 1113 is selected, the cursor automatically moves to the String and ID # box 1120. As explained above with respect to FIG. 1C, the string number designates the communications line to which the machine is connected. A number automatically appears in the string section 1121 of the String and ID # box 1120. If the machine being added is the first for this operating site, the number in the string section 1121 is "0". If one or more machines have been previously for this operating site, the number in the string section 1121 is the last string number selected when previously entering information in the Machine Information window 1100. To designate that the machine being added is part of a different string, the user types the appropriate string number in the string section 1121. The string number may take on any value between "0" and one less than the total number of strings allowed by the monitoring system.

After the string number is entered in the string section 1121, the cursor automatically moves to the ID section 1122 of the String and ID # box 1120. If the user is adding the first machine for this operating site, the number in the ID section 1122 is "0". If one or more machines have been previously added for this operating site, the number in the ID section 1122 is one more than the last ID number selected when previously entering information in the Machine Information window 1100. If, for example, "10" was the last previous ID number selected, then "11" would automatically be put in the ID section 1122. The user may specify an ID number other than the one displayed automatically. Generally, the ID number can take on any value between "0" and one less than the total number of machines allowed on each string of the monitoring system. Further, since a unique ID number must be used for each machine of a string, the ID number must be one that has not been previously specified for that string. If the user attempts to specify an ID number of 32 or greater, the string number will automatically increase by one.

Once the ID number is entered into the ID section 1122, the cursor automatically moves to the Auto Acquire Data box 1130. The Auto Acquire Data box 1130 is used to tell the application program whether or not to automatically collect data from the machine highlighted in the unit number list 1112 (and appearing in the unit number entry section 1111). In contrast to the Auto Data Acquire option 932 of the Site Information window 900 (FIG. 9), the Auto Acquire Data box 1130 is used to specify whether data be automatically acquired or not for a single machine rather than all machines at the operating site. If the user is adding a machine for the first time, the application program specifies "No" by default. If one or more machines have been previously added, the application program defaults to the selection made for the last machine for which information was entered in the Machine Information window 1100.

Once "Yes" or "No" is selected in the Auto Acquire Data box 1130, the cursor automatically moves to the Machine Type box 1140. The Machine Type box 1140 includes a machine type identification section 1141, an Edit Types option 1142, and a Set Fee for Type option 1143. The machine type identification section 1141 includes two columns: a "#" column and a "Name" column. The type of machine is identified under "Name" and the associated number is identified under "#". The user selects the Edit Types option 1142 to add machine types to the list. If one or more machines have previously been added, the number and type of the first machine added appear by default. The arrow at the right of the machine type identification section 1141 can be repeatedly selected to scroll through the entire list of machine types. If the machine type of the machine appears in the list, the user can select that machine type. If the machine type of the machine does not appear on the list, the user must select the Edit Types option 1142 to add a new machine type to the list or revise the existing list entries.

Figure 12:
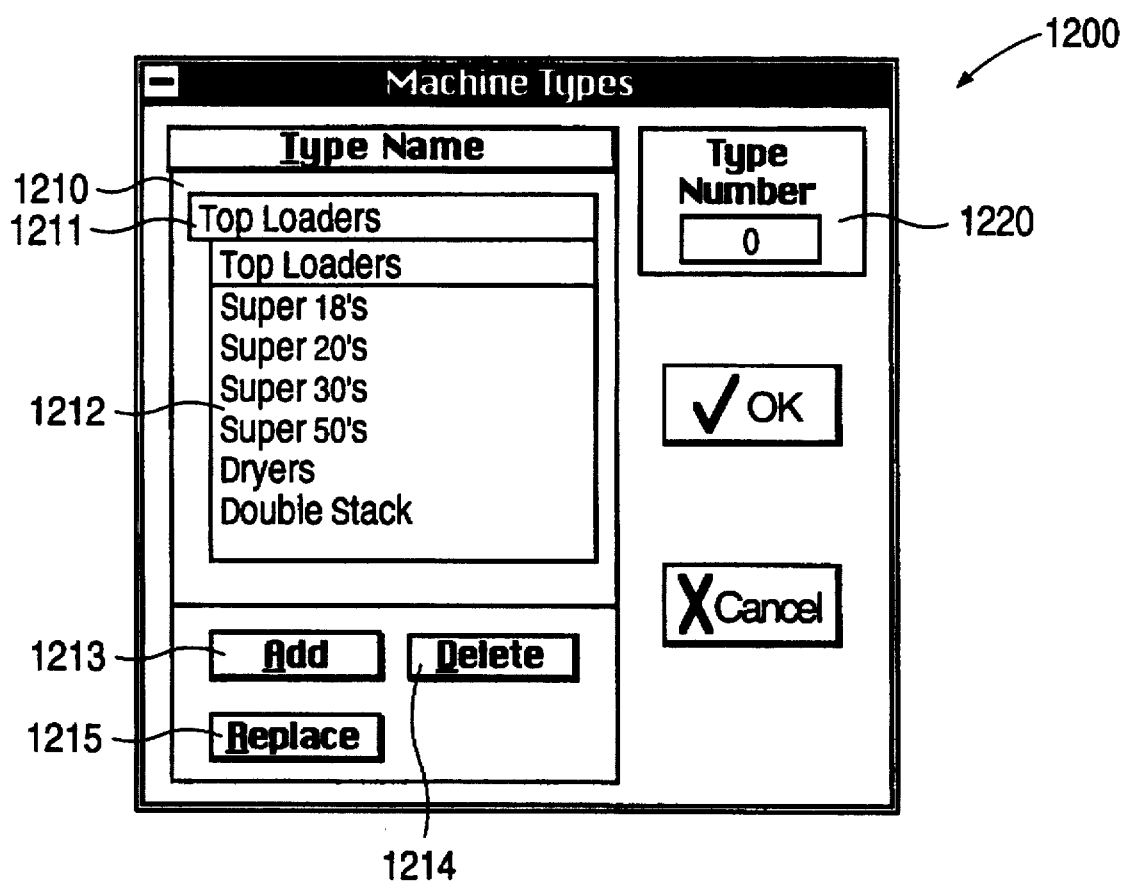
FIG. 12 illustrates a Machine Types window of an application program of a monitoring system according to the invention.

The Edit Types option 1142 enables the user to add, delete, or replace a machine type and number. Selecting the Edit Types option 1142 causes a Machine Types window 1200 to appear, as shown in FIG. 12. The Machine Types window 1200 includes the Type Name box 1210 and the Type Number box 1220.

The Type Name box 1210 includes a type name entry section 1211, a type name list 1212, an Add option 1213, a Delete option 1214, and a Replace option 1215. The type name list 1212 is a list of all the machines that have been identified to the application program as operating at the operating site for which information is being entered in the Site Information window 900. (This is the same list that is shown entry by entry in the machine type identification section 1141 of the Machine Type box 1140 of the Machine Information window 1100 of FIG. 11.) Generally, the type name entry section 1211 and type name list 1212 operate in a manner analogous to that described elsewhere with respect to similar sections of other windows of the application program.

When the Machine Types window 1200 first appears, the cursor is automatically positioned in the type name entry section 1211 of the Type Name box 1210. A new machine type can be entered by typing the new machine type into the type name entry section 1211 and selecting the Add option 1213. The new machine type then appears both in the type name entry section 1211 and at the end of the list in the type name list 1212. The application program automatically assigns a new number to the new machine type and displays the number automatically in the Type Number box 1220 at the top right corner of the Machine Types window 1200. The new number is the next consecutive number after the highest numbered existing machine type.

An existing machine type can be deleted by using the cursor to highlight the name of the machine type in the type name list 1212, then selecting the Delete option 1214. Additional machines can be deleted by successively highlighting the machine type name and selecting the Delete option 1214. The application program does not automatically renumber the machine types when machine types are deleted; each machine type retains the number with which it was previously associated.

An existing machine type can be replaced with the name of a new machine type. The cursor is used to highlight the name of the existing machine type in the type name list 1212. The name of the new machine type is entered into the type name entry section 1211 and the Replace option 1215 is selected. The application program automatically assigns the old machine type number to the new machine type.

If the list of machine types in the Machine Types window 1200 is correct, selecting "OK" causes the application program to return to the Machine Information window 1100, saving any changes made while in the Machine Types window 1200. Selecting "Cancel" exits the Machine Types window 1200 without saving changes.

The Machine Types box 1140 also includes the Set Fee for Type option 1143. Selecting the Set Fee for Type option 1143 causes the entered fee to be specified for all machines of the type appearing in the machine type identification section 1141 of the Machine Type box 1140.

The Usage Fee box 1150 of the Machine Information window 1100 shows the customer cost to operate the machine that is highlighted in the unit number list 1112 and displayed in the unit number entry section 1111 of the Unit # box 1110. An amount can be entered directly into the usage fee display 1151 of the Usage Fee box 1150. Alternatively, a displayed amount can be increased or decreased in 5 cent increments by pressing the "Tab" key to move to the +5¢ or −5¢ options and pressing the "Enter" key the necessary number of times to reach the desired amount. For the dumb machines, the usage fee must be established manually at the operating site and the set fee can only be displayed in the Usage Fee box 1150. However, for the smart machines, the usage fee in the Usage Fee box 1150 can be transferred to the machine remotely from the monitoring site.

The Function box 1160 of the Machine Information window 1100 describes more specifically the kind of machine that is displayed in the unit number entry section 1111 of the Unit # box 1110, e.g., the capacity of the machine. The Manufacturer box 1170 contains the name of the manufacturer of the machine that is displayed in the unit number entry section 1111. The Serial # box 1180 contains the serial number of the machine that is displayed in the unit number entry section 1111. For each of the boxes 1160, 1170 and 1180, a new description can be entered into the box 1160, or an existing description edited, by moving the cursor to the box and typing the desired description.

The Service Log box 1190 of the Machine Information window 1100 contains a record of repairs for the machine displayed in the unit number entry section 1111. The Service Log box 1190 includes an entry for each repair. For the dumb machines, each repair entry must be entered manually into the Service Log box 1190. For the smart machines, a repair person can cause a repair entry to be entered into the Service Log box 1190 automatically by entering the appropriate code on a keypad that accompanies the microprocessor of the smart machine. The codes are specified as part of the ICU-machine protocol, described above with respect to FIG. 4B, that governs communication between the smart machine microprocessor and the ICU mounted on the machine. Codes are also specified for identification of various repair people.

Each entry in the Service Log box 1190 includes three pieces of information. In the first column, the date of the repair is entered. In the second column, the name of the mechanic who performed the repair is entered. In the third column, a description of the work performed is entered. If more repairs have been entered than are visible in the Service Log box 1190, a mouse can be used in conjunction with the scroll bar at the right of the Service Log box 1190 to scroll down the list of repairs.

To retain any changes made since entering the Machine Information window 1100, the "OK" button is selected. To cancel the changes, the "Cancel" button is selected. Selection of either of these buttons returns the application program to the Site Information window 900.

The % Discount option 970 of the Site Information window 900 can be selected to specify discounts for one or more machines at an operating site. Selecting the % Discount option 970 causes a Machine Activation Fee Discounts window 1300 to appear, as shown in FIG. 13A.

The Machine Activation Fee Discounts window 1300 includes the Machine Type box 1310 and the Fee and Discounts box 1320. The type of machine at the operating site for which a discount is to be specified is selected from the list of machine types in the Machine Type box 1310. The percentage discount to be offered (specified in the Discount #1 and Discount #2 sections 1322 and 1323, respectively) are specified in the Fee and Discounts box 1320. The Fee and Discounts box 1320 enables two discounts to be specified for each machine type. Further, for each discount, a unique time period during which the discount is effective can be established for each day of the week (specified in the Start and End sections, e.g., End section 1324).

Selecting "OK" saves any changes entered into the Machine Activation Fee Discounts window 1300. Selecting "Cancel" cancels any changes entered into the Machine Activation Fee Discounts window 1300. Either selection causes the application program to transfer back to the Site Information window 900.

The Correct Fee option 980 of the Site Information window 900 can be selected to correct information regarding fees and discounts specified for one or more machine types at an operating site. This option can only be selected by a System Administrator. Selecting the Correct Fee option 980 causes a Correct Machine Activation Fee Discounts window 1350 to appear, as shown in FIG. 13B. The Correct Machine Activation Fee Discounts window 1350 adds the Range to Correct box 1330 to the Machine Activation Fee Discounts window 1300, as well as the Fee section 1321 to the Fee and Discounts box 1320.

The Range to Correct box 1330 can be used to specify a date and time range for which it is desired to correct the information stored by the application program regarding fees (Fee section 1321) and discounts (Discount #1 and Discount #2 sections 1322 and 1323). Correcting fee and discount information with the Correct Machine Activation Fee Discounts window 1350 may be necessary, for example, if incorrect fees are established for dumb machines (either at the machine or in the application program). Such correction may also be necessary, for example, if communication breakdown between the monitoring site and an operating site prevents establishing fees properly for smart machines at the operating site (in such a situation, the application includes the correct information, while the machines are operating with incorrect information).

Figure 14A:
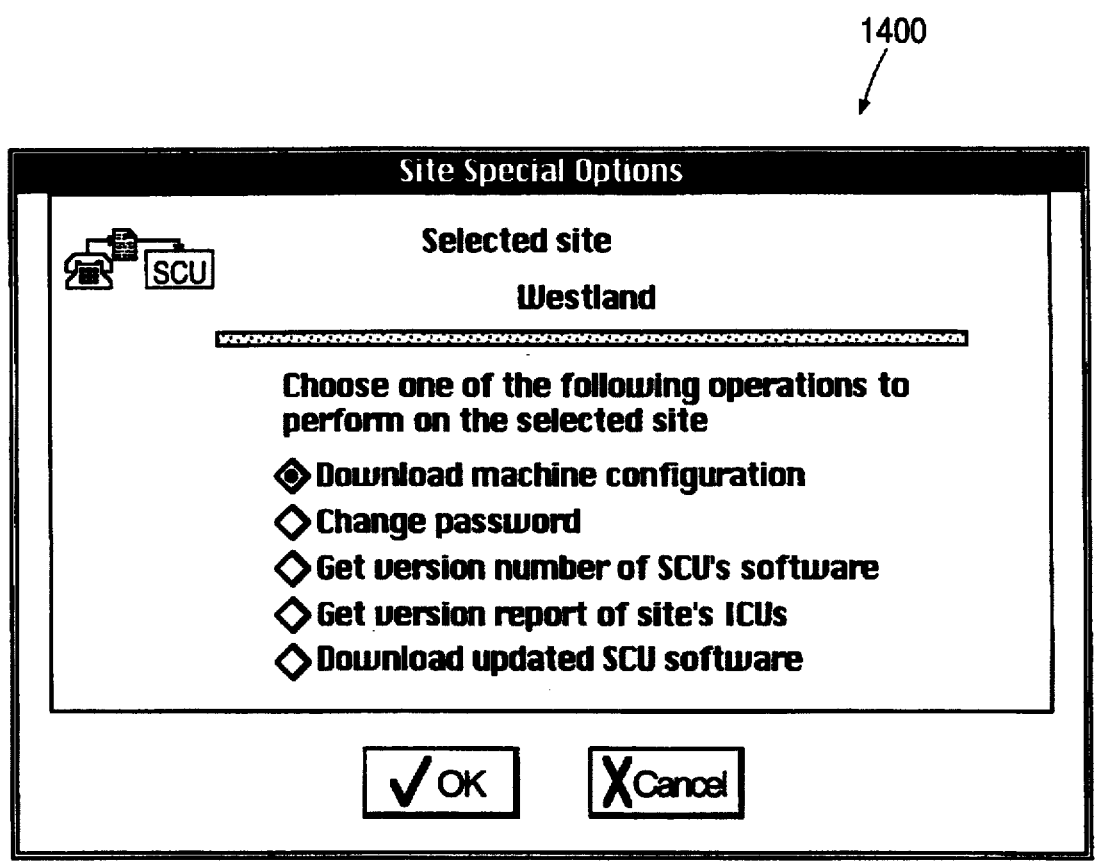
FIG. 14A illustrates a Site Special Operations window of an application program of a monitoring system according to the invention.

Selecting the Telephone-SCU option 990 of the Site Information window 900 causes a Site Special Operations window 1400 to appear, as shown in FIG. 14A. The name of the operating site that appeared in the site name entry section 911 and the site list 912 of the Site Information window 900 appears at the top of the Site Special Operations window 1400. The Site Special Operations window 1400 includes a list of operations that can be performed for the selected operating site. In the embodiment of the invention shown in FIG. 14A, the Site Special Operations window 1400 includes a list of five operations: "Download machine configuration," "Change password," "Get version number of site's software," "Get version report of site's ICUs," and "Download updated site software". Each operation can be selected by highlighting the operation and selecting "OK".

Figure 14B:
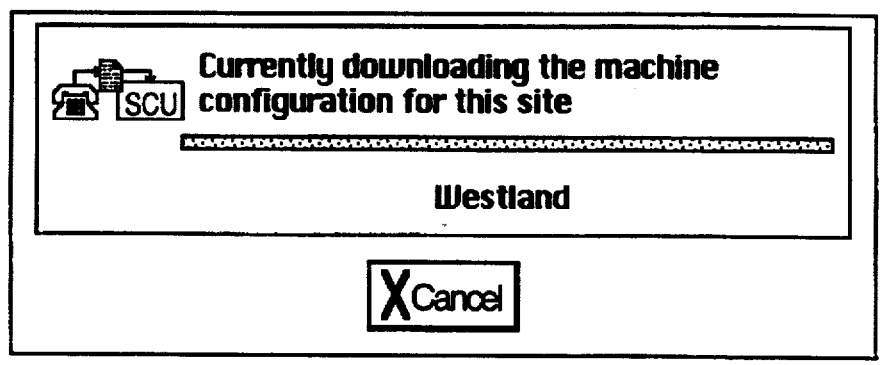
FIG. 14B illustrates a Download Site Configuration window of an application program of a monitoring system according to the invention.

The "Download machine configuration" operation causes the SCU at the operating site to be informed of certain changes or additions to the configuration of machines at the operating site that were made via the Site Information window 900 and related subsidiary windows such as the Machine Information window 1100. The current state of Unit #, String #, ID #, and the Auto Acquire Data specification for each machine are transmitted to the SCU so that the SCU will control the operation at the operating site accordingly. The SCU is not informed of other changes or additions that were made in the Site Information window 900. When "Download machine configuration" is selected from the Site Special Operations window 1400, the Download Site Configuration window 1410 appears, as shown in FIG. 14B, and the application program automatically communicates with the operating site and downloads the new configuration. This operation can be stopped before completion by selecting "Cancel" in the Download Site Configuration window 1410. If the operation is stopped before completion, none of the information regarding the changes is transferred to the SCU. When the operation is complete, the application program automatically returns to the Site Information window 900.

Figure 14C:
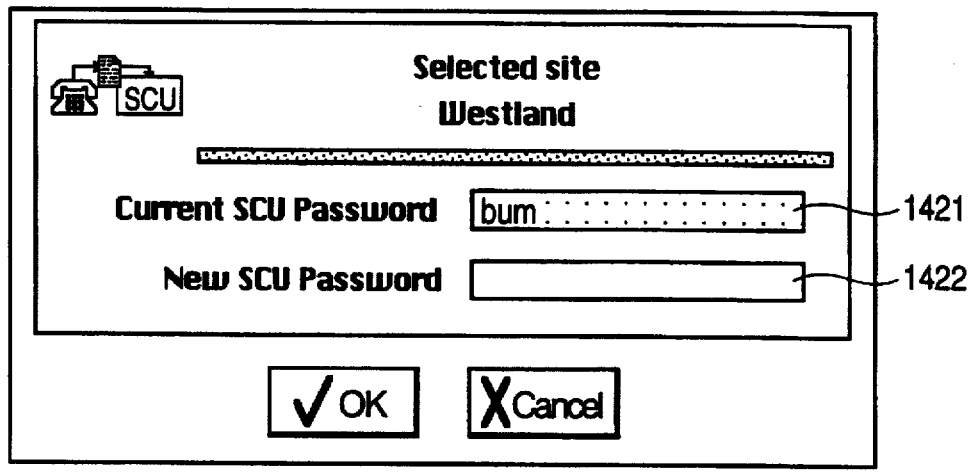
FIG. 14C illustrates a Change Password window of an application program of a monitoring system according to the invention.

The "Change password" operation allows changing of the password that is necessary to get access to the application program. Use of a password to control access to the application program ensures that no competitor or unauthorized employee will be able to gather data from the SCU at an operating site. For example, where the communication line to the operating site is a conventional telephone line, this password protection prevents access to the site information by someone who obtains and calls the telephone number that accesses the SCU at the operating site. When "Change password" is selected from the Site Special Operations window 1400, the Change Site Password window 1420 appears, as shown in FIG. 14C. The current password is shown in the Current SCU Password box 1421. The user enters a new password in the "New SCU Password" box 1422 and selects "OK" to approve the new password or "Cancel" to reject the new password and retain the old password. If the new password is approved, the application program exits the Change Site Password window 1420 and returns to the Site Information window 900. If the old password is retained, the application program returns to the Site Special Operations window 1400 so that the user has another opportunity to change the password if desired.

Figure 14D:
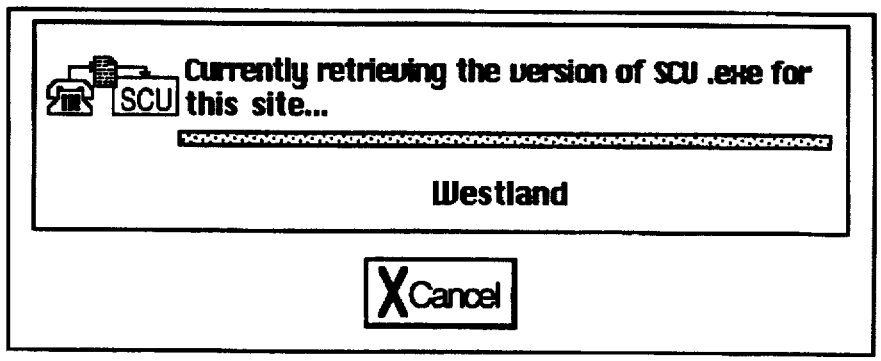
FIG. 14D illustrates a Get Version Number Of Site's Software window of an application program of a monitoring system according to the invention.

The "Get version number of site's software" operation determines which version of the SCU software is currently in use at the operating site. When this operation is selected, the Get Site Software Version window 1430 appears, as shown in FIG. 14D, and the application program automatically communicates with the operating site and retrieves the version number of the SCU software. This operation can be interrupted by selecting "Cancel" in the Get Site Software Version window 1430. If the operation proceeds to completion, the version number appears in a Success window (not shown in the Figures) that replaces the Get Site Software Version window 1430. Selecting "OK" in the Success window causes the application program to return to the Site Information window 900.

Figure 14E:
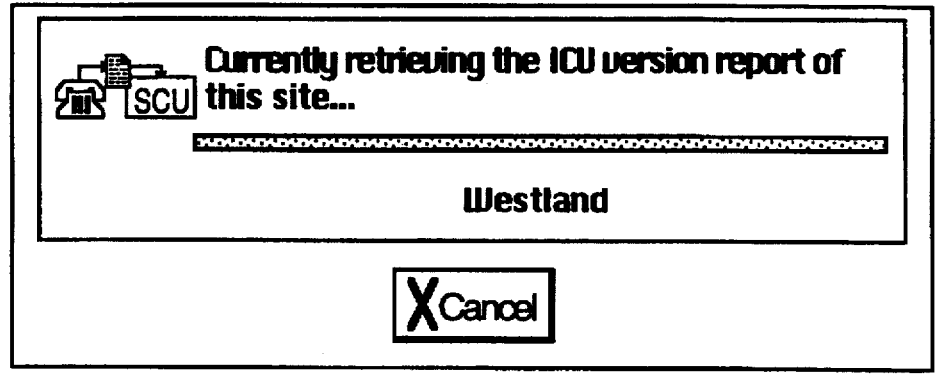
FIG. 14E illustrates a Get Version Report Of Site's ICUs window of an application program of a monitoring system according to the invention.

The "Get version report of site's ICUs" operation determines which version of the ICU software is currently in use for each ICU at the operating site. When this operation is selected, the Get Version Report of Site's ICUs window 1440 appears, as shown in FIG. 14E, and the application program automatically communicates with the operating site and retrieves the version number of the ICU software for each ICU. This operation can be interrupted by selecting "Cancel" in the Get Version Report of Site's ICUs window 1440. If the operation proceeds to completion, a list of ICU ID #'s with corresponding ICU software version numbers appears in a Success window (not shown in the Figures) that replaces the Get Version Report of Site's ICUs window 1440. Selecting "OK" in the Success window causes the application program to return to the Site Information window 900.

Figure 14F:
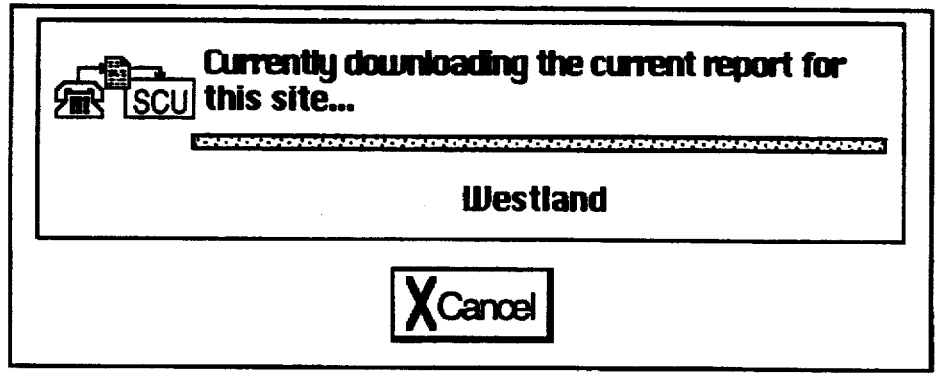
FIG. 14F illustrates a Download Updated Site Software window of an application program of a monitoring system according to the invention.

The "Download updated site software" operation transfers an updated version of the SCU software to the SCU. When this operation is selected, the Download Updated Site Software window 1450 appears, as shown in FIG. 14F, and the application program automatically communicates with the operating site and downloads the software. This operation can be stopped before completion by selecting "Cancel" in the Updated Site Software window 1450. If the operation is stopped before completion, the old version of the SCU software is retained. When the operation is complete, the application program automatically returns to the Site Information window 900.

Returning to the Site Information window 900 (FIG. 9), selecting either "OK" or "Cancel" causes the application program to exit from the Site Information window 900 and the Main window 500 (FIG. 5) to reappear. If the Site Information window 900 is exited by selecting "OK", then all changes made since first entering the Site Information window 900 are saved. If the Site Information window 900 is exited by selecting "Cancel", then none of the changes made directly in the Site Information window 900 are saved; however, changes made in other windows entered since first entering the Site Information window 900 may have been saved, depending upon how those windows were exited.

Figure 15:
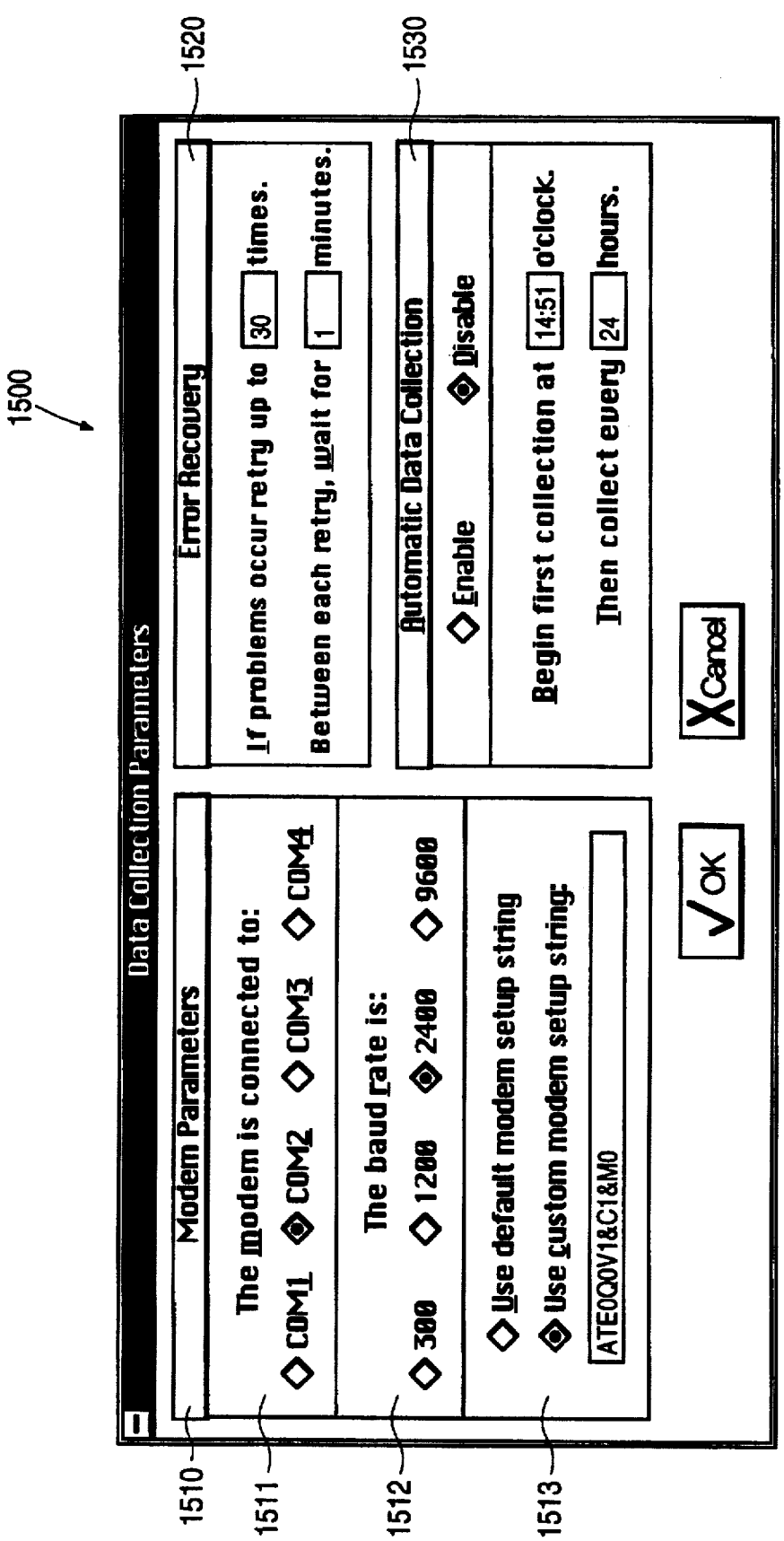
FIG. 15 illustrates a Data Collection Parameters window of an application program of a monitoring system according to the invention.

Returning to the System menu 551 included in the menu bar 550 at the top of the Main window 500 (FIG. 5), the third option in the System menu 551 is Data Collection Parameters. Selection of this option causes a Data Collection Parameters window 1500 to appear, as shown in FIG. 15.

The Data Collection Parameters window 1500 determines the manner and frequency of communication between the MCU and the SCU. The Data Collection Parameters window 1500 includes the Modem Parameters box 1510, the Error Recovery box 1520 and the Automatic Data Collection Recovery box 1530.

The Modem Parameters box 1510 determines the manner of communication between the MCU and the SCUs. The Modem Parameters box 1510 includes the modem connection section 1511, the baud rate section 1512 and the modem setup string section 1513.

The modem connection section 1511 determines the physical communication port to which the modem is connected. Fewer or greater communication port selections than those shown in FIG. 15 can be displayed.

The baud rate section 1512 determines the speed (baud rate) at which data is transferred between the MCU and the SCU. The baud rate section 1512 includes several possible baud rate selections expressed in bytes per second (bps). The baud rate chosen must not exceed the capacity of the modems used by the MCU and the SCUs. Baud rates other than those shown in FIG. 15, e.g., 14400 bps, can also be displayed if desired.

The modem setup string section 1513 determines the particular setup string used by the modem. A built-in initializing string specified as part of the application program can be chosen by selecting "Use default modem setup string" or a customized initializing string can be specified by selecting "Use custom modem setup string" In the latter case, the modem manufacturer's setup string is entered in the setup string entry box at the bottom of the modem setup string section 1513.

The Error Recovery section 1520 of the Data Collection Parameters window 1500 determines the frequency with which the modem will call an SCU after a communication problem occurs that prevents establishment of a communication connection between the MCU and the SCU. Such communication problems include disconnection of the modem, receipt of a busy signal from the SCU, or a noisy communication line. The number of times the modem should call the SCU after a communication problem occurs is entered in the upper data entry box of the Error Recovery box 1520. The number of minutes the modem should wait between calls is entered in the lower data entry box of the Error Recovery box 1520.

The Automatic Data Collection box 1530 of the Data Collection Parameters window 1500 determines if and when the MCU will automatically retrieve data from the SCU. "Enable" is selected if automatic data retrieval is desired; "Disable" is selected if automatic data retrieval is not desired. If "Enable" is selected, then the time at which data retrieval is to occur is entered in a first data entry box of the Automatic Data Collection box 1530. As elsewhere in the application program, time is specified using the military time format (e.g., 23:00 for 11:00 PM). Often, the automatic data collection time will be specified to be in the middle of the night, when the operating site is not open, so that all of the most recent operating data can be obtained. In a second data entry box of the Automatic Data Collection box 1530, the frequency with which data should be retrieved is entered.

Selecting "OK" in the Data Collection Parameters window 1500 saves any changes entered. Selecting "Cancel" cancels any changes. Either selection causes the application program to transfer back to the Main window 500 (FIG. 5).

Figure 16:
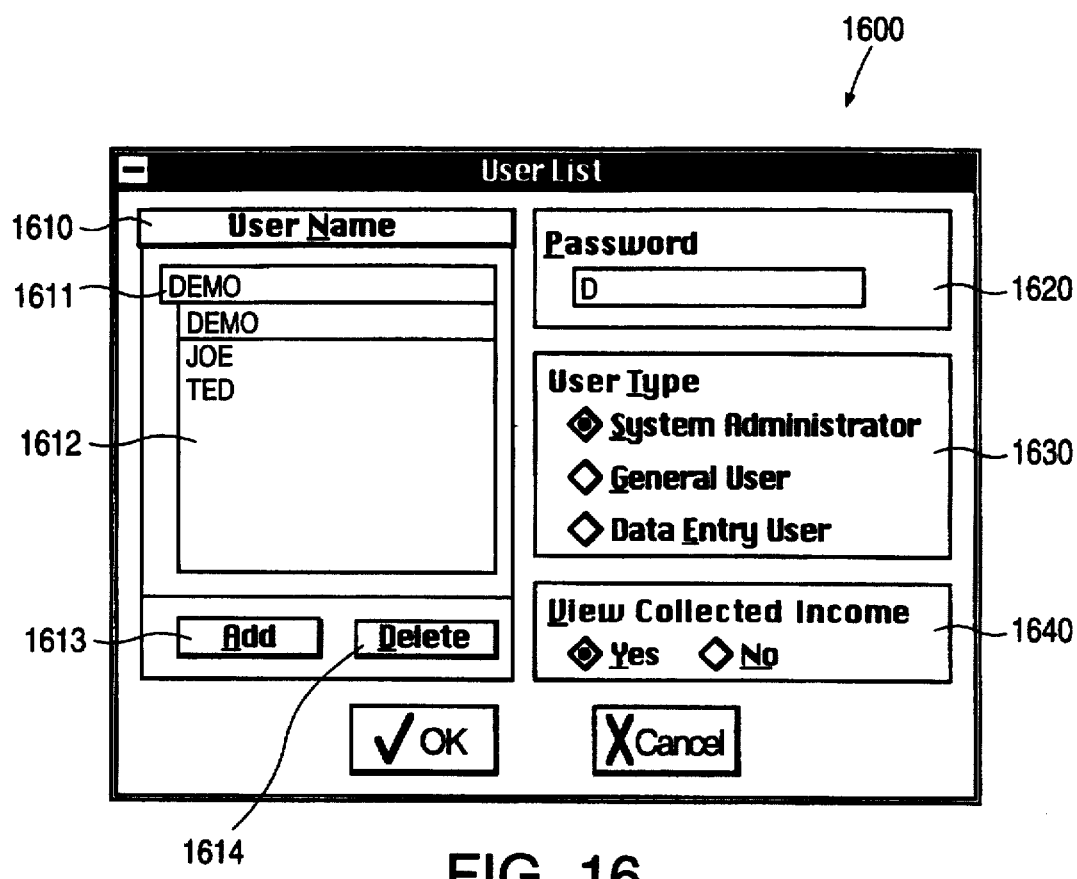
FIG. 16 illustrates a User List window of an application program of a monitoring system according to the invention.

Returning to the System menu 551 included in the menu bar 550 at the top of the Main window 500, the fourth option in the System menu 551 is User List. Selection of this option causes a User List window 1600 to appear, as shown in FIG. 16. The User List window 1600 is used to specify and display information regarding access privileges of various users to the application program. The User List window 1600 includes a User Name box 1610, a Password box 1620, a User Type box 1630 and a View Collected Income box 1640.

The User Name box 1610 is used to maintain a list of the users of the application program and includes a user name entry section 1611 and a user list 1612. Generally, the user name entry section 1611 and user list 1612 operate in a manner analogous to that described above with respect to similar sections of other windows of the application program.

A user name is added to the user list 1612 by typing the name in the user name entry section 1611 and selecting the Add option 1613. A user name can be deleted from the user list 1612 by highlighting the name in the user list 1612 and selecting the Delete option 1614. After the Add option is selected, a Confirm box appears asking whether the user name is to be entered. If "No" is selected in the Confirm box, the Confirm box disappears and the cursor is located in the user name entry section 1610. If "Yes" is selected in the Confirm box, confirming the entry of the new user name, the cursor moves automatically to the Password box 1620. A password of up to thirteen characters is entered. (Note that the passwords are visible only to the System Administrator.) Once a password is entered, the cursor moves automatically to the User Type box 1630. The User Type box 1630 lists the defined types of users of the application program. After a user type is selected, the cursor moves automatically to the View Collected Income box 1640. Either "Yes" or "No" is selected to indicate whether this particular user can view collections.

In the embodiment shown in FIG. 16, three types of users are listed in the User Type box 1630: System Administrator, General User and Data Entry User. The user type specified defines the type of access that a particular user has to the application program.

A System Administrator has access to all data and all aspects of the application program. For example, only a System Administrator can assign passwords and security levels to other users. Only a System Administrator can disable certain machines from operating. Only a System Administrator can correct data once it has been entered into the application program. Typically, the System Administrator is the owner of the business for which the monitoring system according to the invention is being used. Frequently there is only one System Administrator, though this need not necessarily be the case.

A General User has access to a defined portion of the data used and produced by the application program. A General User may be, for example, a manager of one or more of the operating sites. The manager (General User) is typically allowed access to data regarding the status of machines at the operating sites which the manager oversees and is allowed to generate reports regarding any data except data on collected income. The General User may be allowed access to data regarding income collection; however, in that event, the General User would be prevented from entering collection data. The General User may be prevented from viewing the passwords of other users or modifying parameters of the application program (such as, for example, the information entered into the User List). The data access privileges of General User would be defined to allow this limited access.

A Data Entry User has the most limited access to the application program data. The Data Entry User is allowed only to enter data into the application program regarding actual collections.

Selecting "OK" in the User List window 1600 saves any changes entered. Selecting "Cancel" cancels any changes. Either selection causes the application program to transfer back to the Main window 500 (FIG. 5).

Figure 17:
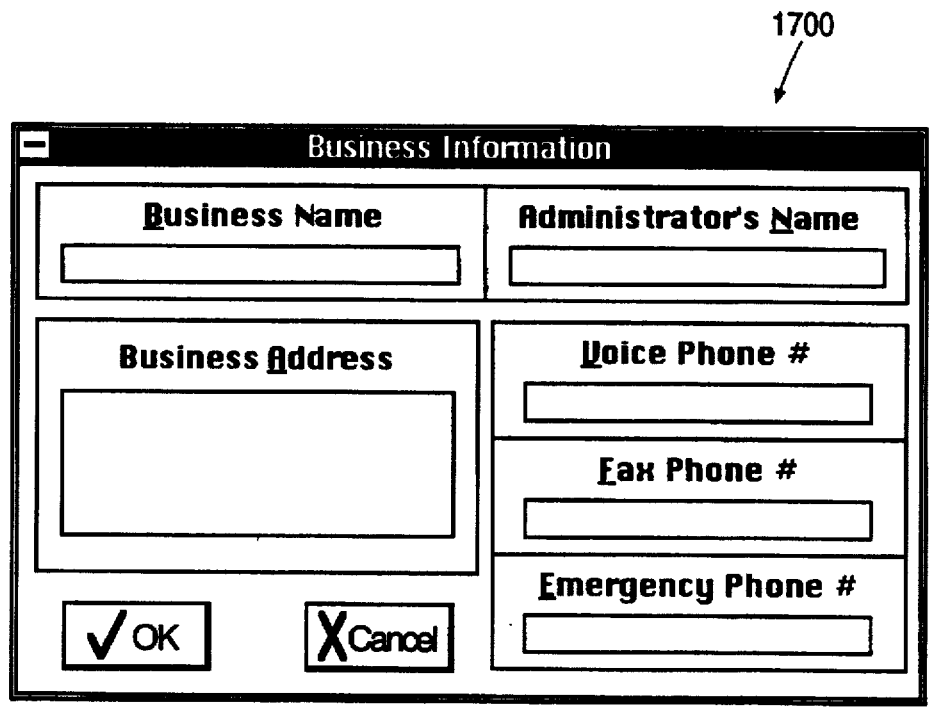
FIG. 17 illustrates a Business Information window of an application program of a monitoring system according to the invention.

Returning to the System menu 551 included in the menu bar 550 at the top of the Main window 500, the fourth option in the System menu 551 is Business Information. Selection of this option causes a Business Information window 1700 to appear, as shown in FIG. 17.

The Business Information window 1700 contains various data entry boxes for entering data ("business information") regarding the organization for which the monitoring system according to the invention is being used. The business information entered into the Business Information 1700 includes: i) the name of the business, ii) the address of the business, iii) the name of the System Administrator, iv) the phone number of the business, v) the fax number of the business, and vi) an emergency phone number for the business. The business information is also used to generate a unique registration code without which the application program cannot be used. The registration code can be generated from the business information using any desired formula. After all business information is entered into the Business Information window 1700, "OK" is selected to save the information or "Cancel" is selected to ignore the information entered. In either case, the application program then returns to the Main window 500 (FIG. 5).

Figure 18:
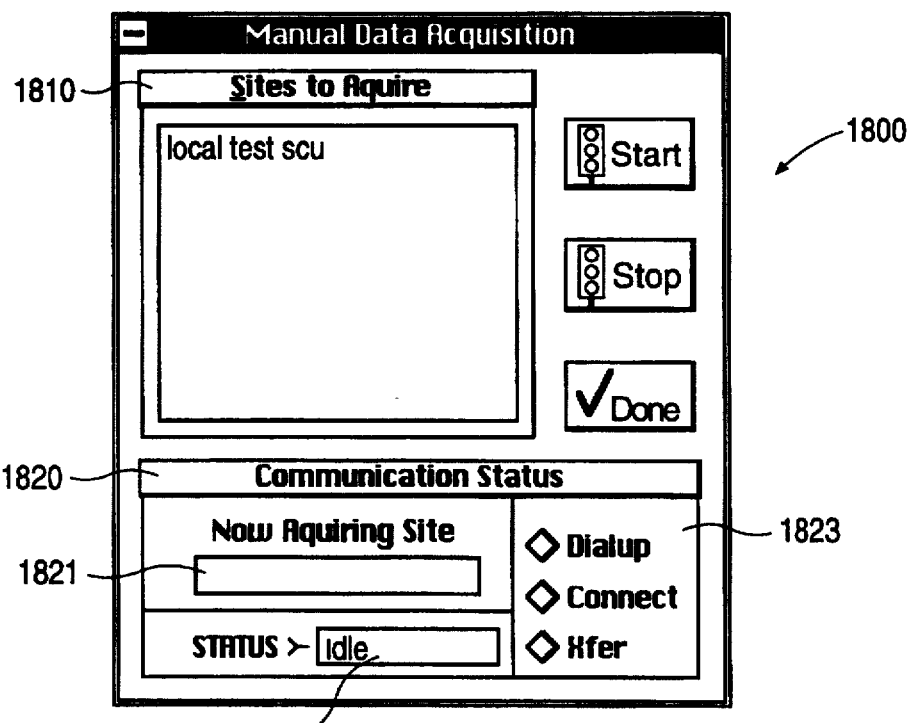
FIG. 18 illustrates a Manual Data Acquisition window of an application program of a monitoring system according to the invention.

In addition to the System menu 551, the menu bar 550 of the Main window 500 includes the Acquire Data! option 553. Selection of the Acquire Data! option 553 causes a Manual Data Acquisition window 1800 to appear, as shown in FIG. 18. The Manual Data Acquisition window 1800 includes a Sites to Acquire box 1810 and a Communication Status box 1820.

As explained above, the Data Collection Parameters window 1500 (FIG. 15) enables automatic retrieval of data at regular specified intervals. The Manual Data Acquisition window 1800, on the other hand, is used to manually (i.e., non-automatically) retrieve data that is current as of the time of retrieval.

The Sites to Acquire box 1810 lists all operating sites being monitored by the monitoring system according to the invention. The user highlights the operating site for which data is to be acquired. Selecting "Start" begins the data acquisition. Selecting "Stop" causes data acquisition to be interrupted. When data acquisition is stopped, none of the data is retained.

The Communication Status box 1820 displays information regarding the status of the communication with the operating site. The name of the operating site from which data is being acquired is displayed in the Now Acquiring Site section 1821 of the Communication Status box 1820. The status of the communication link to the operating site is displayed in the Status section 1822. The stage of the data acquisition process is displayed in the Data Acquisition Stage section 1823. When the Manual Data Acquisition window 1800 first appears and data is not being acquired, the Status section 1822 displays "Idle". When data acquisition begins, the application program indicates that the MCU is attempting to communicate with the operating site by displaying a bullet mark next to "Dialup" in the Data Acquisition Stage section 1823. The Status section 1822 displays "Accessing". When communication is established, the bullet mark in the Data Acquisition Stage section 1823 moves from "Dialup" to "Connect". When data is being retrieved, i.e., passed from the SCU over the communication line to the MCU, the bullet mark in the Data Acquisition Stage section 1823 moves from "Connect" to "Xfer". When data transmission is completed, the Status section 1822 displays "Done". When data acquisition is interrupted by selecting "Stop," the Status section 1822 displays "Stopping . . . " followed by "Stopped".

If a communication problem occurs while attempting to retrieve data or during data retrieval, the application program automatically goes into retry mode. As described above, the application program will attempt to connect with the operating site a specified number of times at a fixed interval as indicated in the Data Collection Parameters window 1500 (FIG. 15).

The Manual Data Acquisition window 1800 is exited by selecting "Done". The application program then returns to the Main window 500 (FIG. 5).

Figure 19:
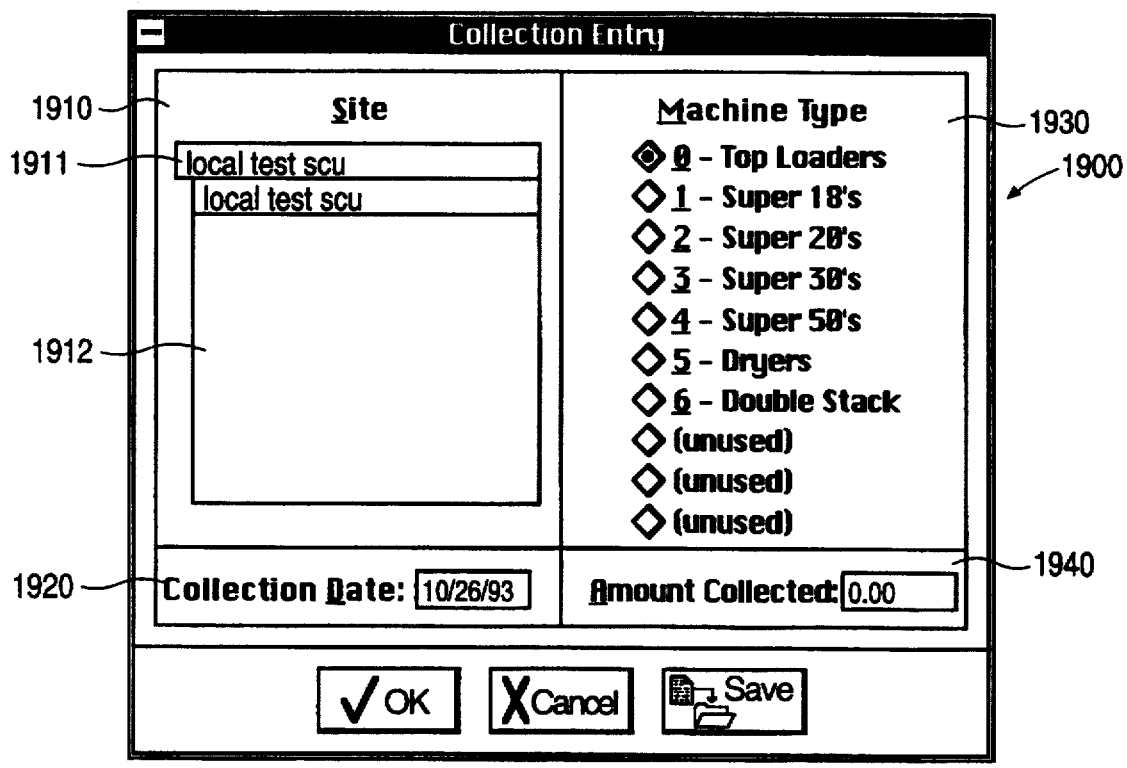
FIG. 19 illustrates a Collection Entry window of an application program of a monitoring system according to the invention.

The menu bar 550 of the Main window 500 also includes the Collection Entry! option 554. Selection of this option causes a Collection Entry window 1900 to appear, as shown in FIG. 19. The Collection Entry window 1900 includes a Site box 1910, a Collection Date box 1920, a Machine Type box 1930, and an Amount Collected box 1940.

Most data regarding the operation being monitored is obtained automatically by the monitoring system according to the invention. However, data regarding the amount of money collected from machines at various operating sites over various times is entered using the Collection Entry! option.

The Site box 1910 is used to specify the operating site from which the collection has been made. The Site box 1910 includes a site name entry section 1911 and a site list 1912. Generally, the site name entry section 1911 and site list 1912 operate in a manner analogous to that described elsewhere with respect to similar sections of other windows of the application program. Site names are added to the site list 1912 by typing the name into the site name entry section 1911. The site name appearing in the site name entry section 1911 (and highlighted in the site list 1912) is the operating site for which collection data are to be entered.

After an operating site is specified in the Site box 1910, the cursor is moved to the Collection Date box 1920. The date on which the money was collected from the operating site is entered in the Collection Date box 1920. The date is entered in the following format: mm/dd/yy. For example, Sep. 10, 1994, would be entered as 09/10/94.

Next, the cursor is moved to the Machine Type box 1930. Only those types of machines actually present at the operating site (i.e., the machine types previously entered in the Machine Information window 1100) can be highlighted in the Machine Type box 1930. The machine type from which coins have been collected is selected.

Finally, the cursor is moved to the Amount Collected box 1940. The amount collected from the operating site for the designated machine type is entered in the Amount Collected box 1940.

The above process is repeated for each machine type for which collection data is to be entered, i.e., the machine type is specified and the amount collected entered. The process is also repeated for each operating site and/or for each collection date, i.e., the operating site is selected, the collection date is specified, the machine types are specified and the amount collected entered.

Since, typically, a lot of collection data will be entered at one time, it is usually a good idea to periodically save collection data as it is being entered. Entries can be saved without leaving the Collection Entry window 1900 by selecting "Save".

Once entered, data cannot be corrected by any user other than a System Administrator. The System Administrator can change data by typing over the previously entered data.

Once all the collection data is entered, the Collection Entry window 1900 is exited by selecting "OK". Selecting "OK" automatically saves all entered collection data. Entered data can also be canceled by selecting "Cancel". Selecting either "OK" or "Cancel" causes the application program to return to the Main window 500 (FIG. 5).

Figure 20:
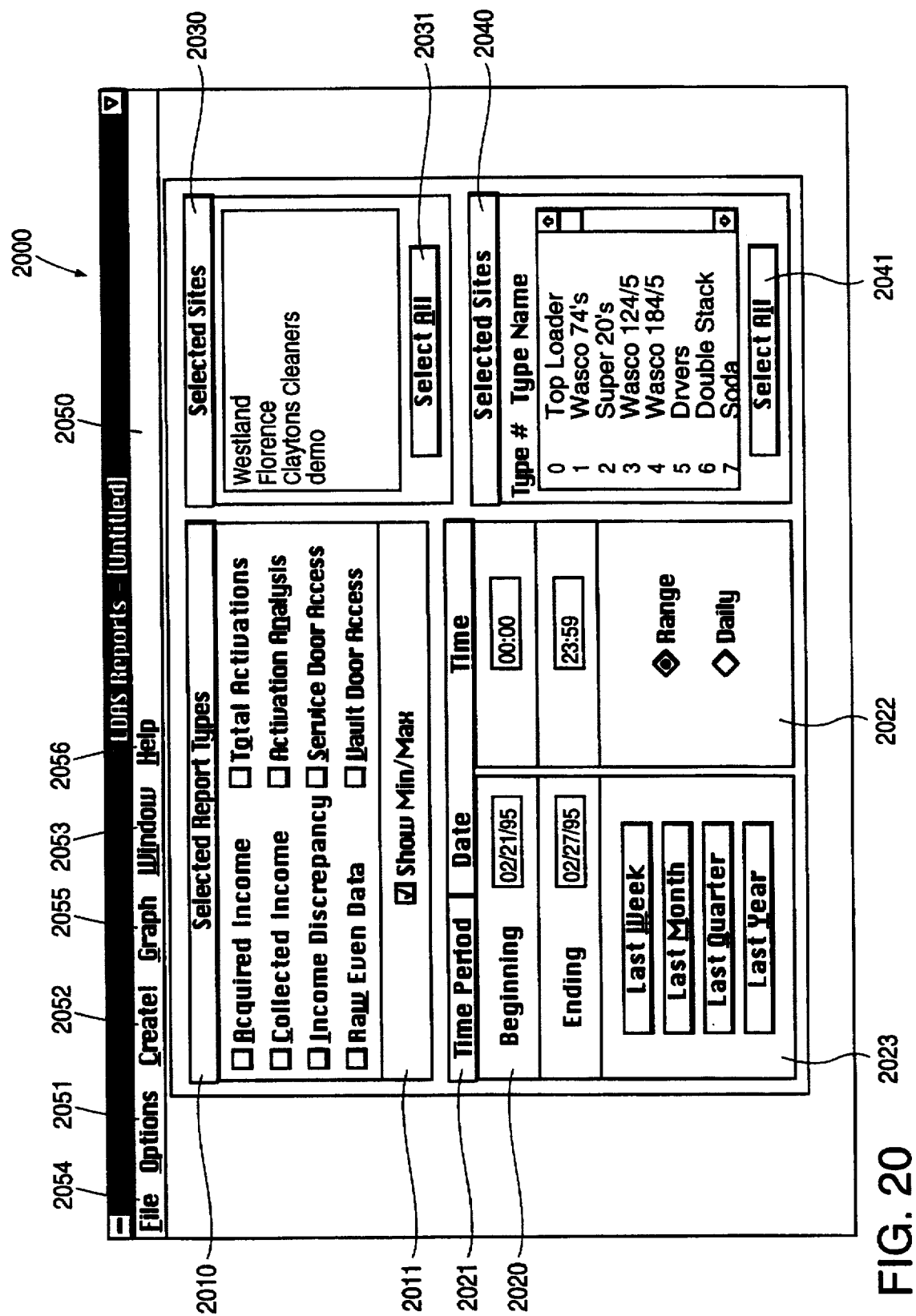
FIG. 20 illustrates a Reports window of an application program of a monitoring system according to the invention.

The menu bar 550 of the Main window 500 also includes the Reports! option 552. Selection of this option causes a Reports window 2000 to appear, as shown in FIG. 20. The Reports window 2000 includes the Selected Report Types box 2010, the Time Period box 2020, the Selected Sites box 2030, and the Selected Machine Types box 2040.

The Reports window 2000 enables the user to control the generation of reports regarding the application program data. The user can select the type of report to be generated, the time period to be covered by the report, the operating site or sites to be included in the report, and the machine type or types to be covered by the report.

The Selected Report Types box 2010 lists the types of reports that can be generated. In one embodiment of the invention, the following reports can be generated: the Acquired Income report, the Collected Income report, the Income Discrepancy report, the Raw Event Data report, the Activation Analysis report, the Total Activations report, the Service Door Access report, and the Vault Door Access report. One of the above reports can be selected or any combination of the reports can be selected.

The Acquired Income report indicates the amount of money that should have been deposited, based upon the number of activations counted and the usage fee, into each type of machine at a specified operating site during the specified time period.

The Collected Income report indicates the amount of money collected from each machine type. These are the amounts that were entered in the Collection Entry window 1900.

The Income Discrepancy report indicates any discrepancy between the amount of money that should have been deposited into each machine and the amount of money actually collected from each machine, i.e., the amounts reported in the Collected Income report and the Acquired Income report are compared.

The Raw Event Data report indicates the number of times the front door, top door, vault, and coin mechanism are used for each machine at each designated operating site. This report gives raw data that is useful for debugging problems with the application program.

The Activation Analysis report indicates the number of times the service door to each machine is opened and the machine turned on ("service activations") and the total number of times the machine is turned on ("total activations"). The ratio of service activations to total activations is designated by a percentage in the Activation Analysis report. A relatively high percentage may indicate that someone is using the machine without paying by opening the service door and activating the machine. This report also indicates if the service door is opened and the machine is activated more than twice on any single day. Such multiple service activations are reported as "violations" and suggest that the activations are made by someone opening the service door and activating the machine for usage without paying, rather than by a repair person who is working on the machine. The Activation Analysis report indicates all activations and violations per operating site, all activations and violations per machine type, and all activations and violations per machine.

The Total Activations report indicates the number of times each machine type is activated, the ratio of the activations for each machine type to the total machine activations at the operating site. This report also provides the same information for each individual machine, as well as the time and date of each machine activation.

The Service Door Access report indicates the amount of service time (i.e., the time between opening and closing of any service door on a machine) spent on all machines at each given location, the amount of service time spent on each machine type at each given location, and the amount of service time spent on each machine at each given location. This report is useful in monitoring the amount of time that a repair person reported spending working on machines. The Service Door Access report further specifies the exact time at which any service door on any machine was opened and closed. If a service door is opened and closed within a predetermined period, the report identifies this as a "cycle" rather than as an opening and closing. A cycle (i.e., a short period between opening and closing of the service door) is likely to indicate an unauthorized opening of the service door such as may occur if the service door is opened to manually activate the machine instead of depositing money to activate the machine. The length of the period defining a cycle is selected by the user and programmed into the SCU at installation at the operating site. The Service Door Access report also identifies each time a machine is turned off and on and reports these as "Power-Ups" A Power-up combined with loss of income from a machine suggests that the machine was turned off, money removed, and the machine turned on again, so that money could be removed from the cash vault without detection by the monitoring system. As with the Activation Analysis report, the Service Door Access report indicates the number of violations that have occurred for each day, i.e., the number of times more than two that a service door is open and the machine activated.

The Vault Door Access report summarizes the amount of time spent collecting money from all machine vaults at each operating site, the number of times all vaults have been opened at each operating site, the amount collected from all vaults at each operating site, and the percentage of total collections represented by the collections from each operating site. This report is useful for determining if the cash vault is being opened at unexpected times (perhaps indicating stealing) or if the collection personnel forgot to close the cash vault. The Vault Door Access report also breaks down the information by machine type, specifying the amount of time spent collecting money from all vaults of each machine type at each operating site, the number of times all vaults of each machine type have been opened at each operating site, the amount collected from all vaults of each machine type at each operating site, and the percentage of total collections at each operating site represented by the collections from each machine type at that operating site. The Vault Door Access report further specifies the vault activity for each machine at each operating site, indicating the exact time and date each vault is opened and closed, the amount of time between each opening and closing, the amount collected, the percentage of total collections for each machine represented by each collection, and whether or not the machine was powered-up (i.e., turned off and on). If the vault was opened and closed within a designated period, the Vault Door Access report identifies this as a cycle rather than as an opening and closing, as explained above with respect to the Service Door Access report.

At the bottom of the Select Report Types box 2010 is a Show Min/Max option 2011. Selecting this option causes the minimum and maximum values in each category of each report to be marked with down and up arrows, respectively, enhancing the readability of the reports.

The Time Period box 2020 of the Reports window 2000 enables selection of the time period covered by each report. The Date and Time Range section 2021 of the Time Period box 2020 includes data entry boxes for a beginning date and time ("Beginning") and an ending date and time ("Ending"). The dates are specified in the following format: mm/dd/yy. For example, to generate a report covering the period from Oct. 1, 1993 through Oct. 5, 1993, the user enters 10/01/93 in the Beginning data entry box and 10/05/93 in the Ending data entry box. The times are designated in military time format. For example, to generate a report covering the period from 11:00 AM to 10:00 PM, the user enters 11:00 in the Beginning data entry box and 22:00 in the Ending data entry box.

A Range or Daily Option section 2022 of the Time Period box 2020 allows the user to further tailor the time period for which data is reported. Specifying "Range" causes information to be gathered for the entire time period from the specified beginning time and date to the specified ending time and date. If, for example, "Range" is specified, 10/01/93 and 11:00 are entered in the Beginning date and time data entry boxes, and 10/05/93 and 22:00 are entered in the Ending date and time data entry boxes, data would be collected for the entire period between 11:00 AM on Oct. 1, 1993 and 10:00 PM on Oct. 5, 1993. Specifying "Daily" enables gathering of information for the same period each day over a number of days. If, for example, "Daily" is selected, 10/01/93 and 11:00 are entered in the Beginning date and time data entry boxes, and 10/05/93 and 22:00 are entered in the Ending date and time data entry boxes, data would be collected between 11:00 AM and 10:00 PM for each day from Oct. 1, 1993 through Oct. 5, 1993. Data would not be collected from 10:00 PM of one day through 11:00 AM of the next day for any of those days.

The Predefined Time Period section 2023 of the Time Period box 2020 enables selection of an option that automatically collects data for a predetermined time period defined by the option. In the embodiment of the invention shown in FIG. 20, the Predefined Time Period section 2023 includes the following options: Last Week, Last Month, Last Quarter and Last Year. The Last Week option enables collection of data for the seven days immediately prior to the current week. The Last Month option enables collection of data for the calendar month immediately prior to the current calendar month. The Last Quarter option enables collection of data for the calendar quarter immediately prior to the current calendar quarter. The Last Year option enables collection of data for the calendar year immediately prior to the current calendar year. When one of these options is selected, the Beginning and Ending date data entry boxes of the Date and Time Range section 2021 are automatically set to the appropriate values to define the appropriate time period. For example, if the Last Week option is selected on Oct. 12, 1993, the Beginning date is set to 10/5/93 and the Ending date is set to 10/11/93. The Beginning and Ending time data entry boxes are not affected by selection of one of these options; they remain set to whatever values already existed. The choice of "Range" or "Daily" is also not affected by selection of one of these options.

The Selected Sites box 2030 of the Reports window 2000 enables selection of the operating sites for which data is to be gathered. All operating sites are listed in the Selected Sites box 2030. An operating site is selected by highlighting the name of the operating site in the list. Any combination of operating sites can be selected. If data is to be gathered for all operating sites, the Select All option 2031 at the bottom of the Selected Sites box 2030 is selected.

The Selected Machine Types box 2040 enables selection of the machine types for which data is to be gathered. All machine types that have been previously specified in the Machine Information window 1100 are listed in the Selected Machine Types box 2040. The Type # column indicates the number assigned to each type of machine. The Type Name specifies the name of each type of machine. A machine type is selected by highlighting the machine type in the list. Any combination of machine types can be selected. If data is to be gathered for all machine types, the Select All option 2041 at the bottom of the Selected Machine Types box 2040 is selected.

In addition to the above-described boxes 2010 through 2040, a menu bar 2050 is located at the top of the Reports window 2000. The menu bar 2050 includes an Options menu 2051, a Create! option 2052, a Window menu 2053, a File menu 2054, a Graph utility 2055, and a Help utility 2056.

As in other windows of the application program described herein, the user can move around the Reports window 2000 by using the mouse or the "Tab" key. In addition, however, in the Reports window 2000, the user can use the Options menu 2051 to select one of a group of options that can be used to move the cursor to a desired box of the Reports window 2000. The "Report Types" option (not shown) in the Options menu 2051 moves the cursor to the Selected Report Types box 2010. The "Time Period" option (not shown) moves the cursor to the Time Period box 2020. The "Sites" option (not shown) moves the cursor to the Selected Sites box 2030. The "Machine Types" option (not shown) moves the cursor to the Selected Machine Types box 2040. Within each box, of course, the user can move the cursor using a mouse or the "Tab" key.

The Options menu 2051 can also be used to establish the level of detail produced in a given report (the report type is selected in the Select Report Types box 2010 as explained above). Selection of the "Detail Level" option (not shown) in the Options menu 2051 causes a menu to be displayed that includes four choices for specifying the level of detail for a report.

The "Summary" option (not shown) from the "Detail Level" option produces the most general report. Summary reports total the reported information for each operating site and indicate the percentage of the total for the entire operation represented by each operating site total. For example, if an Acquired Income report is generated with a summary level of detail, the report indicates the amount of income acquired at each operating site and the corresponding percentage of total income represented by each operating site amount. All reports, i.e., the reports listed in the Selected Report Types box 2010, can be generated with a summary level of detail.

The "Level 2" option (not shown) from the "Detail Level" option can be selected only for the Collected Income report, the Income Discrepancy report, and the Raw Event Data report. "Level 2" reports include the same information included in summary reports. Additionally, in "Level 2" reports, the information for each operating site is broken down by date, i.e., totals of the reported information are given for each date at each operating site. For example, if the Collected Income report is generated with a "Level 2" level of detail, the amount of income collected at each operating site on each selected date can be determined. Or, generation of a Raw Event Data report with a "Level 2" level of detail enables determination of the time and date at which the front door, top door, vault, and coin mechanism were used for each machine at each designated operating site.

The "Level 3" option (not shown) from the "Detail Level" option can be selected for all reports except the Raw Event Data report. "Level 3" reports include the same information included in summary reports. For the Collected Income and Income Discrepancy reports, "Level 3" reports also include the additional information provided in a "Level 2" report. Additionally, all "Level 3" reports include a breakdown of the reported information by machine type. For example, if an Acquired Income report is produced with a "Level 3" level of detail, the report indicates the amount of income acquired at each operating site, the percentage of total income each operating site amount represents, and a breakdown of income by machine type at each operating site.

The "Level 4" option (not shown) from the "Detail Level" option can be selected for all reports except the Raw Event Data report. "Level 4" reports include the same information included in summary reports and "Level 3" reports. For the Collected Income and Income Discrepancy reports, "Level 4" reports also include the additional information provided in a "Level 2" report. Additionally, all "Level 4" reports include a breakdown of the reported information by particular machine. For example, if an Acquired Income report is produced with a "Level 4" level of detail, the report indicates the amount of income acquired at each operating site, the percentage of total income each operating site amount represents, a breakdown of income by machine type at each operating site, and a breakdown of income by particular machine.

The menu bar 2050 at the top of the Reports window 2000 also includes a Create! option 2052. Selection of the Create! Option 2052 causes the selected report to be generated and displayed on a computer display screen.

Multiple reports can be simultaneously generated and displayed on the display screen by selecting the desired reports (each selected report is marked by a bullet next to the report name in the Selected Report Types box 2010) before selecting the Create! option 2052. Multiple reports can be viewed in several ways. When the reports are generated they appear on the display screen in a "stack," each report being offset slightly from the other reports so that, though only the first report is fully visible, the other reports beneath the first report are partially visible. Any report can be displayed, i.e., moved to the top of the stack, by using a mouse to click on the top or bottom margin (whichever is visible) of the report. When the user is finished viewing a report, the report can be closed by using the mouse to click on a designated rectangle in the top or bottom margin of the report.

Alternatively, all reports can be closed at once by selecting "Close All" from a Window menu 2053 that is part of the menu bar 2050. The Window menu 2053 can also be used to display reports. Selection of the Window menu 2053 causes the name of each generated report to appear in bold below the Window menu 2053. Any report can be displayed by highlighting and selecting the report from the list. When the user is finished viewing the reports, "Close All" is selected from the Window menu 2053.

Finally, reports can be opened and closed using two triangles, one pointing up and the other pointing down, that are displayed in a corner of each report. Using a mouse to click on the upward pointing triangle causes the report to be displayed over the entire display screen. Using the mouse to click on the downward pointing triangle causes the report to be reduced to a logo and report name. The report can be retrieved again by using the mouse to double click on the logo. When the user is finished viewing the reports, the reports can be closed individually as described above or together by selecting "Close All" from the Window menu 2053.

Once a report has been generated, the report can be printed using normal Windows 3.1 printing commands.

Figure 21:
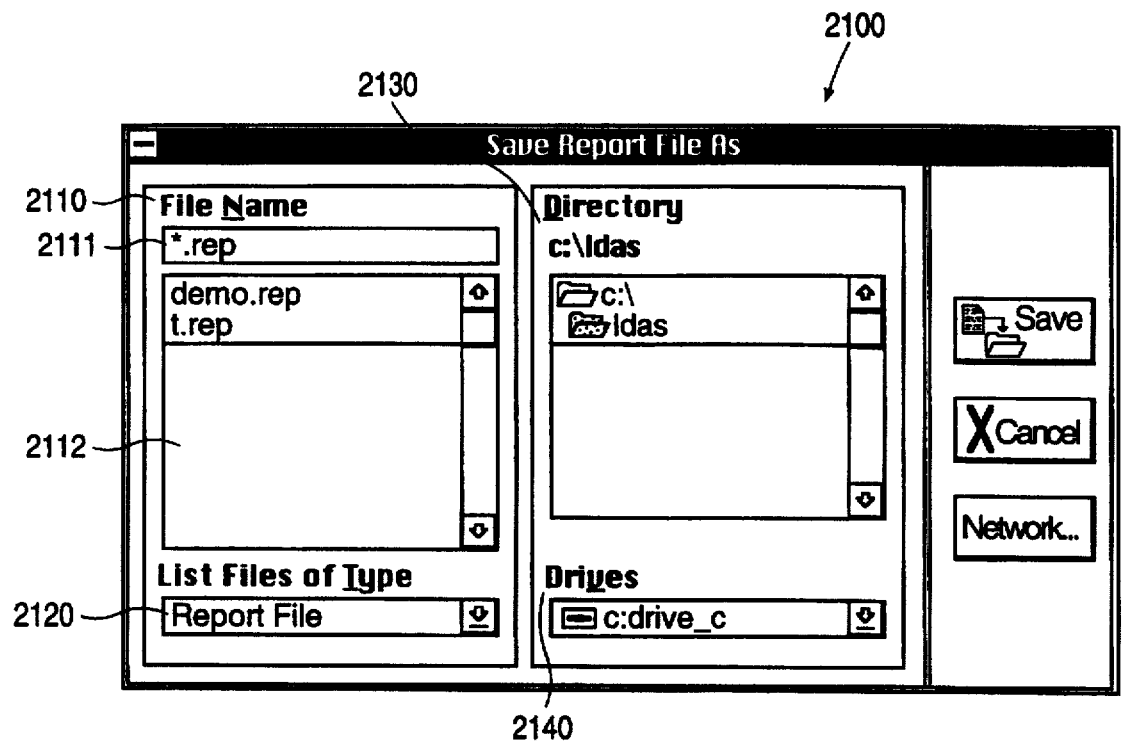
FIG. 21 illustrates a Save Report File As window of an application program of a monitoring system according to the invention.

The menu bar 2050 also includes a File menu 2054 that can be used to save the parameters (i.e., configuration) that govern the generation and display of a report. Selecting "Save" from the File menu 2054 causes a Save Report File As window 2100 to appear, as shown in FIG. 21. The Save Report File As window 2100 includes the File Name box 2110, the List Files box 2120, the Directories box 2130 and the Drives box 2140.

The File Name box 2110 includes a file name entry section 2111 and a file name list 2112. The file name list 2112 includes the names of all of the files in the default directory. Generally, the file name entry section 2111 and file name list 2112 operate in a manner analogous to that described above with respect to similar sections of other windows of the application program.

Initially, the default file name *.rep (report files are identified by the extension "rep") appears in the file name entry section 2111. The name of the file to be saved is entered in the file name entry section 2111. The extension "rep" need not be entered; the application program does this automatically.

Report files can be saved to a specific drive and directory using the Drives box 2140 and the Directories box 2130. Using a mouse to click on the downward pointing arrow in the Drives box 2140 produces a menu of drives. The desired drive is highlighted and selected; this drive appears in the Drives box 2140 and at the top of the Directories box 2130. A directory is selected by using the mouse to double click on the drive name at the top of the Directories box 2130 causing a menu of directories to appear below the drive name. The desired directory is highlighted and selected.

The list of existing files in the selected directory can be viewed using the mouse to click on the downward pointing arrow in the List Files box 2120. A menu appears in the List Files box 2120 that includes a Report File option and an All Files option. To see the list of report files (i.e., *.rep files) that exist in the selected directory the Report Files option is selected. To see the entire list of files that exist in the selected directory the All Files option is selected. The list of files are displayed in the file name list 2112.

Selecting "Save" in the Save Report File As window 2100 saves the configuration of the report to the specified drive and directory and causes the application program to return to the Reports window 2000. The name of the just-saved report appears in the file name entry section 2111 and at the top of the file name list 2112. If the user decides not to save the report, "Cancel" is selected in the Save Report File As window 2100; again the application program returns to the Reports window 2000.

Once saved, a report configuration can be recalled and used to regenerate the report. The Open option (not shown) is selected from the File menu 2054 in the menu bar 2050 to accomplish this. Selecting the Open option causes the Open Report File window (not shown in the Figures) to appear. The Open Report File window is similar to the Save Report File As window 2100 (FIG. 21) and is used in the same manner. A drive and directory are specified, then the desired report is selected from the list of reports saved in that drive and directory. The desired report can be opened by selecting an "Open" option in the Open Report File window or by double clicking on the report name. The Reports window 2000 appears and displays the configuration of the report that was selected. To regenerate the report, the Create! option 2052 is selected from the menu bar 2050. If the user decides not to retrieve a report configuration, the "Cancel" option is selected in the Open Report File window.

A saved report configuration can also be used as the basis for other reports. The saved report configuration is opened as described above. The report configuration is changed as desired using the Reports window 2000. The "Save As" option is selected from the File menu 2054 causing the Save Report File As window 2100 to appear. The new report configuration is saved as described above.

When the Reports! option 552 (FIG. 5) is selected to create a new report after having previously saved at least one report configuration during the current login to the application program, the configuration of the last report saved appears. (If no report configurations have been saved during the current login, no configuration appears.) The previous configuration can be cleared by selecting the "New" option (not shown) from the File menu 2054.

Report configurations can be deleted. The Reports! option 552 is selected to make the Reports window 2000 appear. The "Delete" option (not shown) is selected from the File menu 2054, causing the Delete File window (not shown in the Figures) to appear. The Delete File window is similar to the Save Report File As window 2100 and the Open Report File window, discussed above, and is used in the same manner. A drive and directory are specified, then the report to be deleted is selected from the list of reports saved in that drive and directory. The "Delete" option is selected to delete the report configuration.

Figure 22:
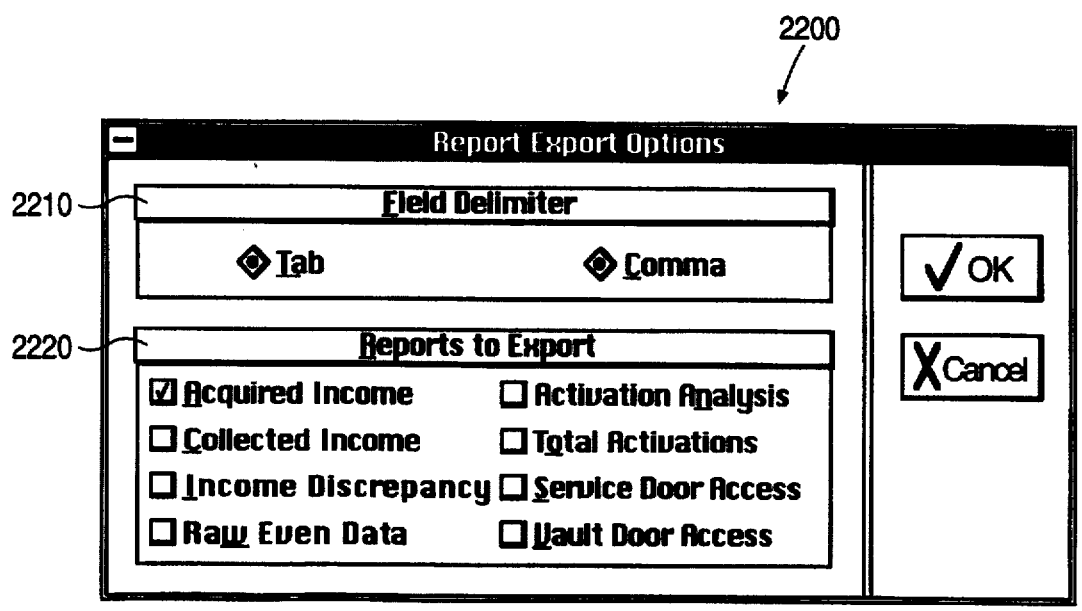
FIG. 22 illustrates a Report Export Options window of an application program of a monitoring system according to the invention.

Data can also be transferred from a report to an ASCII file to enable the ASCII file to be transferred to a different software application. The "Export" option (not shown) is selected from the File menu 2054, causing a Report Export Options window 2200 to appear, as shown in FIG. 22. The Report Export Options window 2200 includes the Field Delimiter box 2210 and the Reports to Export box 2220. Either "Tab" or "Comma" is selected in the Field Delimiter box 2210 to correspond with the delimitation of the software to which the data is being exported. The reports to be exported are selected in the Reports to Export box 2220. "OK" is selected to export the data or "Cancel" is selected to end the export procedure. After either selection, the application program returns to the Reports window 2000.

After working with reports, the Main window 500 (FIG. 5) can be accessed again from the Reports window 2000 by selecting the "Main menu" option (not shown) from the File menu 2054.

When the user is finished working with the application program, the application program can be exited by selecting the Logout option (the sixth option) from the System menu 551 in the Main window 500 (FIG. 5). This causes the login screen (with prompts for user name and user password) to appear. The application program can only be used again by successfully entering a user name and password. While the application program can be exited using the Logout option, the Windows 3.1 main screen does not reappear. Further, selection of the Logout option does not affect automatic data acquisition by the monitoring system; data is still automatically collected.

Alternatively, the System Administrator (and only the System Administrator) can exit the application program and return to the Windows 3.1 main screen by selecting the Exit option (the seventh option) from the System menu 551 in the menu bar 550 of the Main window 500. Selection of the Exit option causes the monitoring system to cease automatic data acquisition.

Various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A system for automatically monitoring the conduct a cash-basis operation that takes place at an operating site, comprising:

means for automatically determining the amount of cash that should have been deposited in at least one machine located at the operating site during a specified period of time;

means for maintaining information regarding the amount of cash collected from each of the at least one machines during the specified period of time; and means for comparing the amount of cash collected to the amount of cash that should have been deposited.

2. A system as in claim 1, wherein the determining means further comprises means for sensing each activation of each of the at least one machines during the specified period of time.

3. A system as in claim 1, further comprising means for uniquely identifying each of the at least one machines, so that the means for determining, maintaining and comparing enable comparison of the amount of cash collected to the amount of cash that should have been deposited for each of the at least one machines.

4. A system as in claim 3, further comprising means for identifying the type of each of the at least one machines, so that the means for determining, maintaining and comparing enable comparison of the amount of cash collected to the amount of cash that should have been deposited for each type of machine.

5. A system as in claim 1 further comprising means for monitoring the operation of one or more machines at the operating site.

6. A system as in claim 5, wherein the machine operation monitoring means further comprises means for sensing an opening or closing of a service door on each of the one or more machines.

7. A system as in claim 5, wherein the machine operation monitoring means further comprises means for monitoring each repair made to one or more of the machines.

8. A system as in claim 7, wherein the repair monitoring means further comprises:

means for recording the date of the repair;

means for recording the name of the person who performed the repair; and means for recording a description of the repair.

9. A system as in claim 5, wherein the machine operation monitoring means further comprises means for determining when one of the machines is out of order.

10. A system as in claim 9, wherein the out-of-order machine determining means further comprises means for sensing each activation of each of the one or more machines.

11. A system as in claim 9, wherein the out-of-order machine determining means further comprises means for monitoring an out-of-order switch located on each of the one or more machines.

12. A system as in claim 9, wherein the machine operation monitoring means further comprises:

means for determining the date that a machine becomes out of order;

means for determining the time of day that a machine becomes out of order;

means for determining the operating site at which each out-of-order machine is located; and means for determining identifying information regarding each out-of-order machine.

13. A system for managing the operation of a plurality of laundromats, comprising:

means for remotely monitoring from a monitoring site a first set of predefined aspects of the operation of the plurality of laundromats; and means for remotely controlling from the monitoring site a second set of predefined aspects of the operation of the plurality of laundromats.

14. A system as in claim 13, wherein the remote monitoring means further comprises:

means for monitoring cash receipts at each laundromat; and means for monitoring the operation of one or more machines at each laundromat.

15. A system as in claim 13, wherein:

one or more machines includes a display; and the remote controlling means further comprises means for controlling the contents of the display.

16. A system as in claim 13, wherein the remote controlling means further comprises means for establishing an activation price of one or more machines at each laundromat.

17. A system as in claim 16, wherein the price establishing means further comprises means for establishing different prices for different time periods during the day.

18. A system as in claim 13, wherein:

a plurality of machines are located at each laundromat; and the remote controlling means further comprises means for testing the operation of one or more machines at each laundromat.

19. A system as in claim 18, wherein the remote controlling means further comprises means for placing a machine out of service when the machine does not perform acceptably well during the testing.

20. A system for acquiring data regarding the operation of a cash-basis operation that takes place at an operating site, comprising:

means for automatically acquiring data regarding cash receipts at the cash-basis operation;

means for automatically acquiring data regarding the operation of one or more machines at the cash-basis operation; and means for automatically transferring the acquired data from the operating site to a remote monitoring site for use in monitoring the cash-basis operation.

21. A system as in claim 20, wherein the data is acquired automatically at each of a plurality of predetermined times according to a single instruction by a user.

22. A system as in claim 21, wherein the data can also be acquired automatically a single time at the instruction of a user, the data acquisition beginning immediately after the user instruction.

23. A system for monitoring from a monitoring site the conduct of a cash-basis operation that takes place at an operating site, comprising:

means for automatically determining, for a machine at the operating site, the amount of cash that should have been deposited in the machine during a specified period of time; and means for monitoring the operation of a machine at the operating site.

24. A system as in claim 23, wherein the operation takes place at a plurality of operating sites.

25. A system as in claim 23, wherein the monitoring site is geographically remote from the operating site.

26. A system as in claim 23, wherein the determining means further comprises means for sensing each activation of the machine during the specified period of time.

27. A system as in claim 23, wherein the monitoring means further comprises means for sensing openings or closings of a service door on the machine.

28. A system as in claim 23, wherein the operation is a self-service operation.

29. A system for monitoring the conduct of an operation that takes place at an operating site, a plurality of devices to be monitored being located at the operating site, comprising:

a plurality of sensors, at least one sensor being mounted on each device, each sensor adapted to acquire data regarding the operation of the device on which the sensor is mounted;

a plurality of internal control units, at least one internal control unit being mounted on each device, each internal control unit adapted to receive data from at least one sensor;

a site controller unit located at the operating site;

a plurality of communications devices for transferring data between each of the internal control units and the site controller unit;

a main controller unit located at a monitoring site; and a communications device for transferring data between the site controller unit and the main controller unit.

30. A system as in claim 29, further comprising means for monitoring communications between the main controller unit and the site controller unit and communications between the site controller unit and the internal control units.

31. A system as in claim 29, wherein the monitoring site is geographically remote from the operating site, the system further comprising means for synchronizing the time of day at the location of the monitoring site to the time of day at the location of the operating site.

32. A system as in claim 29, wherein the communications device for transferring data between the site controller unit and the main controller unit comprises:

a modem; and a telephone line.

33. A system as in claim 29, wherein the plurality of communications devices for transferring data between each of the internal control units and the site controller unit comprises a second plurality of communications devices, one of the second plurality of communications devices transferring data between the site controller unit and one of the internal control units, each of the remainder of the second plurality of communications devices transferring data between a pair of internal control units, such that less than all of the internal control units are directly connected to the site controller unit by a communications device.

34. A system as in claim 29, wherein the communication monitoring means further comprises:

means for detecting communication conditions, the types of communication conditions including a successful communication, a communication problem and a communication error; and means for recording communication conditions.

35. A system as in claim 34, wherein the communication condition detecting means further comprises:

means for determining the type of a detected communication condition;

means for determining the date of occurrence of a detected communication condition;

means for determining the time of day of a detected communication condition;

means for identifying the operating site with which a detected communication condition is associated;

means for identifying the device with which a detected communication condition is associated;

means for obtaining a description of a detected communication condition; and means for determining, if a communication condition is a communication error or communication problem, when the communication condition has been corrected.

36. A method for automatically monitoring the conduct a cash-basis operation that takes place at an operating site, comprising:

automatically determining the amount of cash that should have been deposited in at least one machine located at the operating site during a specified period of time;

maintaining information regarding the amount of cash collected from each of the at least one machines during the specified period of time; and comparing the amount of cash collected to the amount of cash that should have been deposited.

* * * * *